US008715618B2

(12) United States Patent
Trukhan et al.

(10) Patent No.: US 8,715,618 B2
(45) Date of Patent: May 6, 2014

(54) PROCESS FOR THE DIRECT SYNTHESIS OF CU CONTAINING ZEOLITES HAVING CHA STRUCTURE

(75) Inventors: Natalia Trukhan, Ludwigshafen (DE); Ulrich Mueller, Neustadt (DE); Ivor Bull, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 548 days.

(21) Appl. No.: 12/994,058

(22) PCT Filed: May 19, 2009

(86) PCT No.: PCT/EP2009/056036
§ 371 (c)(1),
(2), (4) Date: Nov. 22, 2010

(87) PCT Pub. No.: WO2009/141324
PCT Pub. Date: Nov. 26, 2009

(65) Prior Publication Data
US 2011/0076229 A1    Mar. 31, 2011

(30) Foreign Application Priority Data

May 21, 2008 (EP) ..................................... 08156625

(51) Int. Cl.
*C01B 39/48* (2006.01)
*B01J 29/76* (2006.01)
*B01J 29/70* (2006.01)

(52) U.S. Cl.
CPC .............. *C01B 39/48* (2013.01); *B01J 29/763* (2013.01); *B01J 29/7065* (2013.01)
USPC .......................................... 423/703; 423/713

(58) Field of Classification Search
USPC ................................. 423/703, 713
See application file for complete search history.

(56) References Cited

U.S. PATENT DOCUMENTS

| | | | |
|---|---|---|---|
| 4,544,538 A | 10/1985 | Zones | |
| 4,735,927 A * | 4/1988 | Gerdes et al. | 502/64 |
| 4,996,322 A | 2/1991 | Pierantozzi et al. | |
| 5,254,515 A | 10/1993 | Imai | |
| 6,056,928 A | 5/2000 | Fetzer et al. | |
| 6,180,836 B1 | 1/2001 | Cheng et al. | |
| 6,709,644 B2 | 3/2004 | Zones et al. | |
| 6,974,889 B1 | 12/2005 | Verduijn et al. | |
| 7,067,108 B2 | 6/2006 | Mertens et al. | |
| 7,264,789 B1 | 9/2007 | Verdiuinj et al. | |
| 8,007,763 B2 | 8/2011 | Zones | |
| 2003/0176751 A1 | 9/2003 | Strohmaier et al. | |
| 2005/0197520 A1 | 9/2005 | Mertens et al. | |
| 2008/0241060 A1 * | 10/2008 | Li et al. | 423/700 |
| 2008/0292519 A1 | 11/2008 | Caudle et al. | |
| 2010/0092361 A1 | 4/2010 | Li et al. | |
| 2010/0288728 A1 | 11/2010 | Han et al. | |
| 2010/0310440 A1 * | 12/2010 | Bull et al. | 423/239.1 |
| 2011/0020204 A1 | 1/2011 | Bull et al. | |
| 2012/0301381 A1 | 11/2012 | Fedeyko et al. | |

FOREIGN PATENT DOCUMENTS

| | | |
|---|---|---|
| CN | 101065321 | 10/2007 |
| JP | H-01219013 | 9/1989 |
| JP | H-03143547 | 6/1991 |
| JP | 2002521303 | 7/2002 |
| JP | 2002521304 | 7/2002 |
| JP | 2005-520763 | 7/2005 |
| JP | 2007-534582 | 11/2007 |
| JP | 2010-504275 | 2/2010 |
| JP | 2010-522688 | 7/2010 |
| JP | 2010-524677 | 7/2010 |
| JP | 2011-512021 | 4/2011 |
| JP | 2012-508096 | 4/2012 |
| WO | WO-2006/057760 | 6/2006 |
| WO | 2008 106523 | 9/2008 |
| WO | WO-2008/106519 | 9/2008 |
| WO | WO-2008/106523 | 9/2008 |
| WO | 2008 132452 | 11/2008 |
| WO | WO-2008/132452 | 11/2008 |

OTHER PUBLICATIONS

U.S. Appl. No. 12/794,280, filed Jun. 4, 2010, Bull, et al.
International Search Report issued Sep. 17, 2009 in PCT/EP09/56036 filed May 19, 2009.

* cited by examiner

*Primary Examiner* — David M Brunsman
(74) *Attorney, Agent, or Firm* — Servilla Whitney LLC

(57) ABSTRACT

A process for the preparation of a copper containing zeolitic material having CHA framework structure and a composition comprising the molar ratio (n YO2):X2O3 wherein X is a trivalent element, preferably Al, Y is a tetravalent element, preferably Si, and wherein n is preferably at least 20. The process comprising the preparation of an phosphor-free aqueous solution containing at least one source for X2O3 and at least one source for YO2, at least one structure directing agent suitable for the preparation of a zeolitic material having CHA framework structure, and at least one Cu source, and the process further comprising the hydrothermal crystallization of said aqueous solution obtaining a suspension containing the copper containing zeolitic material having CHA framework structure.

11 Claims, 45 Drawing Sheets

PROCESS FOR THE DIRECT SYNTHESIS OF CU CONTAINING ZEOLITES HAVING CHA STRUCTURE

The present invention relates to a process for the preparation of phosphor-free zeolitic materials having CHA framework structure and which contain Cu wherein said zeolitic material is obtained in a single process stage. This process stage is a hydrothermal crystallization stage to which an aqueous solution is subjected which, apart from tri- and/or tetravalent elements usually employed as framework elements of the zeolite framework, already contains all the Cu necessary for the preparation of the final Cu zeolite having CHA framework structure. In particular, the present invention relates to such processes for the preparation of zeolitic materials having CHA framework structure and exhibiting a high content of Cu wherein the obtained materials preferably contain Si and Al and have a high molar ratio of Si:Al. The present thus also relates to the zeolitic materials obtainable and/or obtained by this process as well as to specific zeolitic materials as such which contain Cu and have CHA framework structure, and which exhibit specific Si:Al ratios.

Zeolitic materials having chabazite (CHA) framework structure and which contain copper (Cu) are materials which are widely used in important actual technical areas such as in the automotive industry where the materials are employed as catalysts. Thus, these materials are of high economical and ecological interest. Due to the said technical areas and the resulting need of high amounts of the materials, there is an increasing demand for efficient processes for the preparation of these materials.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001). Chabazite is one of the molecular sieves for which a structure has been established, and the material of this framework-type is designated as CHA.

U.S. Pat. No. 5,254,515 discloses crystalline silicates containing copper. According to this document, the copper ions are applied to the crystalline material by ion-exchange wherein ion-exchange sites such as alkali metal ions and hydrogen ions are replaced by copper ions via immersing the silicate in an aqueous solution in which a mineral acid such as copper sulphate, copper nitrate, or, e.g., copper acetate is dissolved.

U.S. Pat. No. 6,056,928 discloses catalysts for the removal of $N_2O$ which can be beta zeolite, ZSM-5 zeolite, mordenite or chabazite. It is disclosed that, likewise, catalysts are usable which are based on zeolite having been exchanged with Cu, Co, Rh, Pd or Ir, for example. No example is given for a Cu chabazite zeolite.

U.S. Pat. No. 7,067,108 B2 discloses zeolites of chabazite framework type. These zeolites are prepared by employing a specific seeding material, namely a crystalline material having a framework type other than chabazite framework type, such as AEI type, LEV type, or OFF type. It is disclosed that any cations in the as-synthesized chabazite framework-type material can be replaced at least in part by ion exchange with other cations.

U.S. Pat. No. 6,974,889 B1 discloses a process for the manufacture of a crystalline molecular sieve, such as zeolites of structure type CHA or LEV, containing phosphorus in its framework, wherein a colloidal crystalline molecular sieve is used as seed material. It is disclosed that the synthesis mixture may contain a source of metallic elements, especially a Group VIII metal, more especially nickel. According to examples, typical molar ratios of $Al_2O_3:P_2O_5$ in the zeolite framework are about 1:1. This metal is advantageously in a molar proportion calculated as oxide relative to alumina within the range of 0.001 to 0.05, preferably 0.005 to 0.01, i.e. in very low molar ratios metal oxide:alumina. According to U.S. Pat. No. 6,974,889 B1, other suitable Group VIII metals include Fe and Co, while other suitable metals include Mn, Cr, Cu, Zn, Mg, Ti, and Zr. No example is given relating to a Cu zeolite, in particular Cu chabazite zeolite.

U.S. Pat. No. 4,996,322 relates to the separation of amides with molecular sieves. According to this document, preferred zeolites for this separation are zeolites of types A, X, Y, MFI and chabazite, and mordenite, calcium chabazite being particularly preferred. As to the chabazite zeolites, also Cu chabazite is disclosed. However, according to table 11 of U.S. Pat. No. 4,996,322, the copper chabazite is prepared by copper acetate exchange of a synthetic zeolite with a Si:Al ratio of 2.1.

Therefore, it is an object of the present invention to provide a novel process for the preparation of phosphorus-free Cu containing zeolitic materials having CHA framework structure, in particular of phosphorus-free containing zeolitic materials having CHA framework structure having a high Cu content.

It is a further object of the present invention to provide a novel process for the preparation of phosphorus-free Cu containing zeolitic materials having CHA framework structure, in particular of phosphorus-free containing zeolitic materials having CHA framework structure having a high Cu content.

It is a further object of the present invention to provide a novel and efficient process for the preparation of phosphorus-free Cu containing zeolitic materials having CHA framework structure, wherein the zeolitic material contains Si and Al in a high molar ratio of Si:Al and wherein the zeolitic material exhibits, at the same time, a high Cu content.

It is a further object of the present invention to provide Cu containing zeolitic materials having CHA framework structure wherein the zeolitic material exhibits a high Cu content, and preferably, also a high molar ratio of Si:Al.

Therefore, the present invention relates to a process for the preparation of a copper containing zeolitic material having CHA framework structure and a composition comprising the molar ratio

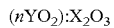

$$(nYO_2):X_2O_3$$

wherein X is a trivalent element, Y is a tetravalent element, and wherein n is preferably at least 10, more preferably at least 15, the process comprising (i) preparation of an aqueous solution containing at least one source for $X_2O_3$ and at least one source for $YO_2$, at least one structure directing agent suitable for the preparation of a zeolitic material having CHA framework structure, and at least one Cu source, wherein said aqueous solution does not contain a phosphorus source;

(ii) hydrothermal crystallization of the aqueous solution according to (i) which does not contain a phosphor source, obtaining a suspension containing the copper containing zeolitic material having CHA framework structure.

The term "the aqueous solution does not contain a phosphorus source" as used in this context of the present invention relates to the fact that no phosphorus containing compounds are used as such for the preparation for the aqueous solution according to (i) which is subsequently subjected to hydrothermal crystallization. However, this term does not exclude such embodiments where the starting materials explicitly described contain certain amounts of phosphorus or phosphorous containing compounds as impurities. By way of example, such impurities are typically present in amounts of below 1000 ppm, preferably below 500 ppm, more preferably below 300 ppm.

X and Y

According to stage (i) of the present invention, all conceivable sources for trivalent elements X and tetravalent elements Y may be employed which can build up the zeolitic framework and which, as part of this zeolitic framework, are referred to as $X_2O_3$ and $YO_2$ in the context of the present invention.

Preferably, the trivalent element X is selected from the group consisting of Al, B, In, G, and a mixture of two or more thereof.

Generally, all suitable sources for $B_2O_3$ can be employed. By way of example, borates and/or boric acid, metaboric acid, ammonium metaborate, and/or boric acid esters such as boric acid triethyl ester or boric acid trimethyl ester may be mentioned.

Generally, all suitable sources for $In_2O_3$ can be employed. By way of example, In nitrates may be mentioned.

Generally, all suitable sources for $Ga_2O_3$ can be employed. By way of example, Ga nitrates may be mentioned.

Generally, all suitable sources for $Al_2O_3$ can be employed. By way of example, metallic aluminum such as aluminum powder, suitable aluminates such as alkali metal aluminates, aluminum alcoholates such as aluminumtriisopropylate and aluminum hydroxide may be mentioned. According to a preferred embodiment of the present invention, however, an $Al_2O_3$ source is employed which is free of sodium, in particular free of alkali metals. Aluminum hydroxide, $Al(OH)_3$, and aluminumtriisopropylate are especially preferred.

Therefore, the present invention relates to above-described process wherein the source for $X_2O_3$, in particular the source for $Al_2O_3$ is free of sodium, in particular free of alkali metal.

According to an especially preferred embodiment of the present invention, the trivalent element X is Al, and even more preferably, no other trivalent element is used, Al thus being the only trivalent element building up the CHA zeolitic framework structure.

Preferably, the tetravalent element Y is selected from group consisting of Si, Sn, Ti, Zr, Ge, and a mixture of two or more thereof.

Generally, all suitable sources for $TiO_2$ can be employed. By way of example, titanium oxide or titanium alcoholates such as tetraethoxytitanate or tetrapropoxytitanate may be mentioned.

Generally, all suitable sources for $SnO_2$ can be employed. By way of example, tin chlorides or metalorganic tin compounds such as tin alcoholates or chelates such as tin-acetylacetonate may be mentioned.

Generally, all suitable sources for $ZrO_2$ can be employed. By way of example, zirconium chloride or zirconium alcoholates may be mentioned.

Generally, all suitable sources for $GeO_2$ can be employed. By way of example, germanium chloride may be mentioned.

Generally, all suitable sources for $SiO_2$ can be employed. By way of example, silicates, silica, silicic acid, colloidal silica, fumed silica, tetraalkoxysilanes, silica hydroxides, precipitated silica or clays may be mentioned. In this context, both so-called "wet-process silicon dioxide" as well as so called "dry-process silicon dioxide" can be employed. Colloidal silicon dioxide is, inter alia, commercially available as Ludox®, Syton®, Nalco®, or Snowtex®. "Wet process" silicon dioxide is, inter alia, commercially available as Hi-Sil®, Ultrasil®, Vulcasil®, Santocel®, Valron-Estersil®, Tokusil® or Nipsil®. "Dry process" silicon dioxide is commercially available, inter alia, as Aerosil®, Reolosil®, Cab-O-Sil®, Fransil® or ArcSilica®. Tetraalkoxysilanes, such as, for example, tetraethoxysilane or tetrapropoxysilane, may be mentioned.

According to preferred embodiments of the present invention, dry-process silica or colloidal silica is employed. If colloidal silica is employed, it is further preferred that said colloidal silica is stabilized without sodium, in particular without alkali metal. According to even more preferred embodiments where colloidal silica is used, the colloidal silica employed as aqueous solution in (i) is stabilized with ammonia.

Therefore, the present invention relates to above-described process wherein the source for $YO_2$, in particular the source for $SiO_2$ is free of sodium, in particular free of alkali metal.

According to an especially preferred embodiment of the present invention, the tetravalent element Y is Si, and even more preferably, no other tetravalent element is used, Si thus being the only tetravalent element building up the CHA zeolitic framework structure.

Consequently, according to an especially preferred embodiment of the present invention, X is Al and Y is Si, and even more preferably, no other trivalent and tetravalent element building up the zeolitic framework structure after hydrothermal crystallization is employed.

Therefore, the present invention relates to above-described process wherein X is selected from the group consisting of Al, B, In, G, and a mixture of two or more thereof; and wherein Y is selected from the group consisting of Si, Sn, Ti, Zr, Ge, and a mixture of two or more thereof; X preferably being Al and Y preferably being Si.

Generally, the sources for $X_2O_3$ and $YO_2$ can be employed in all conceivable amounts and molar ratios for the preparation of the aqueous solution in (i) with the proviso that in (ii), a Cu containing zeolite having CHA framework structure is obtained.

According to a preferred embodiment of the present invention, the at least one source for $YO_2$ and the at least one source for $X_2O_3$ are employed in such amounts that the aqueous solution obtained according to (i) exhibits a molar ratio $(nYO_2):X_2O_3$ wherein n is at least 10, more preferably at least 15. More preferably, n is in the range of from 15 to 80, more preferably from 15 to 60, more preferably from 15 to 50 such as, e.g., 15, 20, 25, 30, 35, 40, 45, 50.

Cu Source

As far as the Cu source is concerned, all suitable compounds can be employed for the preparation of the aqueous solution in (i) with the proviso that in (ii), a Cu containing zeolite having CHA framework structure is obtained. Preferably, an aqueous solution of at least one Cu salt is employed. Preferred Cu salts are, e.g., $CuCO_3$, Cu acetate and $Cu(NO_3)_2$.

Even more preferably, an aqueous solution of at least one suitable Cu salt is employed which, apart from water and the Cu salt, contains ammonia.

Therefore, the present invention relates to above-described process, wherein an aqueous solution containing Cu and ammonia is employed as Cu source. According to a preferred embodiment, the amount of ammonia contained in this aqueous solution is high enough so that the Cu which is contained in the aqueous solution is present as $[Cu(NH_3)_4]^{2+}$ complex.

Molar Ratios

Generally, the sources for $X_2O_3$ and $YO_2$ and Cu can be employed in all conceivable amounts and molar ratios for the preparation of the aqueous solution in (i) with the proviso that in (ii), a Cu containing zeolite having CHA framework structure is obtained.

According to a preferred embodiment of the present invention, the at least one source for $YO_2$ and the at least one source for $X_2O_3$ are employed in such amounts that the aqueous solution obtained according to (i) exhibits a molar ratio of Cu relative to the sum of (n $X_2O_3$) and $YO_2$, $(mCu):((nYO_2)+X_2O_3)$ wherein m is at least 0.005, more preferably at least 0.01, more preferably at least 0.02. Even more preferably, said m is less than or equal to 0.08, more preferably less than or equal to 0.07, more preferably less than or equal to 0.06, more preferably less than or equal to 0.05, and more preferably less than or equal to 0.04. Thus, according to preferred embodiments of the present invention, m is in the range of from 0.005 to 0.08, more preferably from 0.01 to 0.06, and even more preferably from 0.02 to 0.04.

Thus, the present invention also relates to above-described process wherein, for the preparation of the aqueous solution according to (i), the at least one source for $YO_2$, the at least one source for $X_2O_3$ and the Cu source are employed in such amounts that the aqueous solution obtained according to (i) exhibits a molar ratio $(nYO_2):X_2O_3$ wherein n is at least 10, preferably at least 15, more preferably in the range of from 15 to 70, and a molar ratio $(mCu):((nYO_2)+X_2O_3)$ wherein m is at least 0.005, preferably in the range of from 0.02 to 0.04.

In particular, the present invention relates to above-described process wherein, for the preparation of the aqueous solution according to (i), the at least one source for $SiO_2$, the at least one source for $Al_2O_3$ and the Cu source are employed in such amounts that the aqueous solution obtained according to (i) exhibits a molar ratio $(nSiO_2):Al_2O_3$ wherein n is in the range of from 15 to 50, and a molar ratio $(mCu):((nSiO_2)+Al_2O_3)$ wherein m is in the range of from 0.02 to 0.04.

Structure Directing Agent (SDA)

As far as the structure directing agent employed in (i) is concerned, no restriction exists with the proviso that a zeolitic material having CHA framework structure is obtained in (ii).

By way of example, a suitable N-alkyl-3-quinuclidinol, a suitable N,N,N-trialkyl-exoaminonorbornane, a suitable N,N,N-trimethyl-1-adamantylammonium compound, a suitable N,N,N-trimethyl-2-adamantylammonium compound, a suitable N,N,N-trimethylcyclohexylammonium compound, a suitable N,N-dimethyl-3,3-dimethylpiperidinium compound, a suitable N,N-methylethyl-3,3-dimethylpiperidinium compound, a suitable N,N-dimethyl-2-methylpiperidinium compound, 1,3,3,6,6-pentamethyl-6-azonio-bicyclo (3.2.1)octane, N,N-dimethylcyclohexylamine, or a suitable N,N,N-trimethylbenzylammonium compound may be mentioned. As suitable compounds, the hydroxides of above-mentioned compounds may be mentioned.

Preferably, a suitable N,N,N-trimethyl-1-adamantylammonium (1-adamantyltrimethyl ammonium) compound is employed. Optionally, this suitable 1-adamantyltrimethylammonium compound can be employed in combination with at least one further suitable ammonium compound such as, e.g., a N,N,N-trimethylbenzylammonium (benzyltrimethylammonium) compound or a tetramethylammonium compound or a mixture of a benzyltrimethylammonium and a tetramethylammonium compound.

According to a preferred embodiment of the present invention, a mixture of 1-adamantyltrimethylammonium compound and benzyltrimethylammonium compound is used wherein, even more preferably, the molar ratio of benzyltrimethylammonium compound to 1-adamantyltrimethylammonium is preferably in the range of from 1:1 to 5:1, more preferably in the range of from 1.5:1 to 4:1 and even more preferably in the range of from 2:1 to 3:1.

According to another preferred embodiment of the present invention, a mixture of 1-adamantyltrimethyl ammonium compound and tetramethylammonium compound is used wherein, even more preferably, the molar ratio of tetramethylammonium compound to 1-adamantyltrimethylammonium is preferably in the range of from 1:1 to 5:1, more preferably in the range of from 1.1:1 to 4:1, more preferably in the range of from 1.2 to 3:1 and even more preferably in the range of from 1.3:1 to 2:1.

As far as the ammonium compounds are concerned, it is conceivable that a suitable salt of the ammonium compounds is employed. Preferably, if such salt is employed, this salt or the mixture of salts should impart the desired pH to the aqueous solution to be subjected to hydrothermal crystallization. If necessary, a suitable base such as, for example, a suitable hydroxide source, can be added, in addition said salt(s) to impart said pH. Preferably, according to the present invention, the ammonium salt or ammonium salts as such are the suitable base, preferably the hydroxide source, i.e., it is preferred that the ammonium compound(s) is/are employed as hydroxide(s).

Thus, preferred compounds used according to the present invention as structure directing agent are 1-adamantyltrimethylammonium hydroxide, and benzyltrimethylammonium hydroxide and/or tetramethylammonium hydroxide. Even more preferred is a mixture of these hydroxides.

According to a preferred embodiment, the molar ratio of benzyltrimethylammonium hydroxide to 1-adamantyltrimethylammonium hydroxide is preferably in the range of from 1:1 to 5:1, more preferably in the range of from 1.5:1 to 4:1 and even more preferably in the range of from 2:1 to 3:1.

According to another preferred embodiment, the molar ratio of tetramethylammonium hydroxide to 1-adamantyltrimethylammonium hydroxide is preferably in the range of from 1.1:1 to 4:1, more preferably in the range of from 1.2 to 3:1 and even more preferably in the range of from 1.3:1 to 2:1.

Therefore, the present invention also relates to above-described process wherein the structure directing agent is a mixture of a 1-adamantyltrimethylammonium compound and at least one further suitable ammonium compound, preferably a mixture of 1-adamantyltrimethylammonium hydroxide and benzyltrimethylammonium hydroxide or a mixture of 1-adamantyltrimethylammonium hydroxide and tetramethylammonium hydroxide or a mixture of 1-adamantyltrimethylammonium hydroxide and benzyltrimethylammonium hydroxide and tetramethylammonium hydroxide, wherein the molar ratio of 1-adamantyltrimethylammonium hydroxide to benzyltrimethylammonium hydroxide or to tetramethylammonium hydroxide or to the sum of benzyltrimethylammonium hydroxide and tetramethylammonium hydroxide is in the range of from 1:5 to 1:1.

Therefore, the present invention also relates to above-described process wherein the structure directing agent is a mixture of a 1-adamantyltrimethylammonium compound and a benzyltrimethylammonium compound, preferably a mixture of 1-adamantyltrimethylammonium hydroxide and benzyltrimethylammonium hydroxide, wherein the molar ratio of benzyltrimethylammonium compound to 1-adamantyltrimethyl ammonium is preferably in the range of from 2:1 to 3:1.

Therefore, the present invention also relates to above-described process wherein the structure directing agent is a mixture of a 1-adamantyltrimethylammonium compound and a tetramethylammonium compound, preferably a mixture of 1-adamantyltrimethylammonium hydroxide and tetramethylammonium hydroxide, wherein the molar ratio of tetramethylammonium compound to 1-adamantyltrimethylammonium is preferably in the range of from 1.3:1 to 2:1.

As far as the ammonium compounds are concerned, it also possible according to the present invention to employ the respective amine compound, if necessary in combination with at least one suitable base such as, e.g. a suitable hydroxide source Generally, the sources for $X_2O_3$ and $YO_2$ and the structure directing agent can be employed in all conceivable amounts and molar ratios for the preparation of the aqueous solution in (i) with the proviso that in (ii), a Cu containing zeolite having CHA framework structure is obtained.

According to a preferred embodiment of the present invention, the at least one source for $YO_2$ and the at least one source for $X_2O_3$ are employed in such amounts that the aqueous solution obtained according to (i) exhibits a molar ratio of structure directing agent (SDA) relative to the sum of (n $X_2O_3$) and $YO_2$, $$(pSDA):((nYO_2)+X_2O_3)$$

wherein p is at least 0.035, more preferably at least 0.07, more preferably at least 0.15. Even more preferably, p is less than or equal to 0.6, more preferably less than or equal to 0.5, more preferably less than or equal to 0.4, more preferably less than or equal to 0.3, and more preferably less than or equal to 0.2. Thus, according to preferred embodiments of the present invention, p is in the range of from 0.035 to 0.6, more preferably from 0.07 to 0.4, and even more preferably from 0.15 to 0.2.

Thus, the present invention also relates to above-described process wherein, for the preparation of the aqueous solution according to (i), the at least one source for $YO_2$, the at least one source for $X_2O_3$ and the SDA source are employed in such amounts that the aqueous solution obtained according to (i) exhibits a molar ratio $$(nYO_2):X_2O_3$$

wherein n is at least 10, preferably at least 15, preferably in the range of from 15 to 70, and a molar ratio $$(pSDA):((nYO_2)+X_2O_3)$$

wherein p is at least 0.035, preferably in the range of from 0.15 to 0.2.

The pH of the Aqueous Solution

Preferably, the pH of the aqueous solution obtained from (i) and subjected to hydrothermal crystallization according to (ii) is at least 10, more preferably at least 11, and even more preferably at least 12. More preferably, the pH of the aqueous solution subjected to hydrothermal crystallization according to (ii) is in the range of from 12 to 14.

Thus, the present invention also relates to above-described process, wherein the pH of the aqueous solution subjected to (ii) is in the range of from 12 to 14.

Depending on the starting materials employed, it may be necessary to adjust the pH of the aqueous solution subjected to hydrothermal crystallization according to (ii) so that the pH has above-described values. Preferably, adjusting the pH is carried out using a base which does not contain sodium, preferably a base which does not contain an alkali metal, such as, e.g., sodium hydroxide or the like.

Preferably, the pH is adjusted to above-described values using ammonia which may be added as aqueous solution, e.g. as aqueous solution containing the at least one Cu salt described above.

Also preferably, the pH is adjusted to above-described values using suitable structure directing compounds, for example the respective ammonium hydroxide compounds as described above. In particular, in case a mixture of 1-adamantyltrimethylammonium hydroxide and tetramethylammonium hydroxide is used, tetramethylammonium hydroxide primarily acts as a source of hydroxide and thus, as a suitable base for adjusting the pH to above-described values.

Accordingly, the present invention also relates to the use of tetramethylammonium hydroxide as basic compound for adjusting the pH of a solution to be subjected to hydrothermal crystallization of a Cu containing zeolitic material having CHA structure, in particular for adjusting the pH to a value in the range of from 12 to 14.

Alkali Metal Content

As already described above, the at least one source for $YO_2$, preferably $SiO_2$, and the at least one source for $X_2O_3$, preferably $Al_2O_3$, are free of sodium, in particular free of alkali metal. According to an even more preferred embodiment of the present invention, the aqueous solution obtained in (i) and subjected to hydrothermal crystallization in (ii) is free of sodium, in particular free of alkali metal. Thus, for example, adjusting to pH of the aqueous solution subjected to hydrothermal crystallization according to (ii)—if necessary—is preferably carried out using bases which are free of sodium, in particular free of alkali metal; adjusting the pH is preferably carried out via the aqueous solution containing the at least one Cu salt described above, containing, as basic material, preferably ammonia.

The term "free of alkali metal" and "free of sodium", as used in this context of the present invention relates to the fact that no starting materials are employed which contain sodium, in particular alkali metal as essential component, such as, e.g., sodium aluminate as source for $Al_2O_2$, or the like. However, this term does not exclude such embodiments where the starting materials explicitly described contain certain amounts of sodium, in particular alkali metals as impurities. By way of example, such impurities are typically present in amounts of 1000 ppm or less, preferably 500 ppm or less, more preferably 300 ppm or less.

Therefore, the present invention also relates to above-described process, wherein the aqueous solution subjected to hydrothermal crystallization according to (ii) is free of sodium, in particular free of alkali metal.

Accordingly, the present invention also relates to a zeolitic material obtained and/or obtainable from the inventive process, having chabazite framework structure, and being free of sodium, in particular free of alkali metal.

In particular, in accordance with above-described definition, the present invention also relates to a zeolitic material obtained and/or obtainable from the inventive process, having chabazite framework structure, having a sodium content, in particular an alkali metal content of 1000 ppm or less, preferably 500 ppm or less, more preferably of 300 ppm or less.

The term "an alkali metal content of X ppm or less" as used in the context of the present, relates to an embodiment according to which the sum of all alkali metals present does not exceed X ppm.

Other Conceivable Starting Materials

According to further embodiments, the aqueous solution subjected to (ii) may contain at least one further metal, such as, for example, transition metals and/or lanthanides.

According to the embodiment according to which the aqueous solution may contain a transition metal, the at least one further metal is preferably selected from the group consisting of Fe, Co, Ni, Zn, Y, and V. Generally, all suitable Fe sources can be employed. By way of example, nitrate, oxalate, sulphate may be mentioned. Generally, all suitable Co sources can be employed. By way of example, nitrate, oxalate, sulphate may be mentioned. Generally, all suitable Ni sources can be employed. By way of example, nickel oxide, nickel salts such as nickel chloride, nickel bromide, nickel iodide and its hydrate, nickel nitrate and its hydrates, nickel sulfate and its hydrates, nickel acetate and its hydrates, nickel oxalate and its hydrates, nickel carbonate, nickel hydroxide, or nickel acetylacetonate may be mentioned. Generally, all suitable Zn sources can be employed. By way of example, oxalate, acetate may be mentioned. Generally, all suitable V sources can be employed. By way of example, suitable vanadyle salts may be mentioned.

Therefore, the present invention also describes a process wherein the aqueous solution subjected to (ii) contains at least one further metal source, said further metal being selected from the group consisting of Fe, Co, Ni, Zn, Y, and V.

According to a particularly preferred embodiment, the present invention relates to above-described process wherein the aqueous solution subjected to (ii) contains at least one Si source, at least one Al source, and at least one Cu source, and contains no other source for $XO_2$ and $Y_2O_3$, and contains no further metal such as Fe, Co, Ni, Zn, Y, or V, in particular no transition metal.

According to a further embodiment of the present invention, the aqueous solution subjected to (ii) contains a suitable lanthanide source, such as a suitable cerium source or a suitable lanthanum source, preferably a suitable La (lanthanum) source. While all suitable La sources are conceivable, a preferred La source, e.g., is a La salt which is soluble in the aqueous solution. A preferred La source is, among others, lanthanum nitrate. Still more preferably, as far as the overall process for producing the Cu containing zeolitic material is concerned, the lanthanum source is only employed in the aqueous solution subjected to (ii). In particular, neither the dried nor the calcined zeolitic material is subjected to any treatments wherein a La source is employed.

Generally, the La source can be employed in such amounts that the finally obtained material has the desired La content. Preferably, the aqueous solution subjected to (ii) has an atomic ratio of La:Cu in the range of from 1:10 to 1:100.

According to a particularly preferred embodiment, the present invention relates to above-described process wherein the aqueous solution subjected to (ii) contains at least one Si source, at least one Al source, at least one Cu source, and least one La source, and contains no other source for $XO_2$ and $Y_2O_3$, and contains no further metal such as Fe, Co, Ni, Zn, Y, or V, in particular no transition metal.

Therefore, the present invention also relates to the process as described above, wherein the aqueous solution subjected to hydrothermal crystallization according to (ii) contains a La source, preferably in such an amount that the atomic ratio La:Cu is in the range of from 1:10 to 1:100, more preferably in the range of from 1:20 to 1:80, even more preferably in the range of from 1:30 to 1:60.

Preparation of the Aqueous Solution According to (i)

Generally, there are no specific restrictions in which order the starting materials are mixed to obtain the aqueous solution according to (i).

According to one embodiment of the present invention, an aqueous solution containing the at least one structure directing agent is mixed with an aqueous solution containing the Cu source, and, preferably, additionally ammonia, as described above. In this solution, the at least one source for $X_2O_3$, preferably $Al_2O_3$, and the at least one source for $YO_2$, preferably $SiO_2$, suspended.

According to another embodiment of the present invention, an aqueous solution containing the at least one source for $X_2O_3$, preferably $Al_2O_3$, is admixed with the at least structure directing agent, wherein, subsequently, the at least one source of Cu is added, and finally, the at least one source for $YO_2$, preferably $SiO_2$, is added.

According to a preferred embodiment of the present invention, the at least one source for $YO_2$ and the at least one source for $X_2O_3$ are employed in such amounts that the aqueous solution obtained according to (i) exhibits a molar ratio of water relative to the sum of (n $X_2O_3$) and $YO_2$, $$(qH_2O):((nYO_2)+X_2O_3)$$

wherein q is at least 10, more preferably at least 15 and even more preferably at least 20. Even more preferably, said q is less than or equal to 70, more preferably less than or equal to 65, more preferably less than or equal to 60, more preferably less than or equal to 55, and more preferably less than or equal to 50. Thus, according to preferred embodiments of the present invention, q is in the range of from 10 to 70, more preferably from 15 to 60, and even more preferably from 20 to 50.

Thus, the present invention also relates to above-described process wherein, for the preparation of the aqueous solution according to (i), the at least one source for $YO_2$, the at least one source for $X_2O_3$ and water are employed in such amounts that the aqueous solution obtained according to (i) exhibits a molar ratio $$(nYO_2):X_2O_3$$

wherein n is at least 10, preferably at least 17, preferably in the range of from 15 to 70, and a molar ratio $$(qH_2O):((nYO_2)+X_2O_3)$$

wherein q is at least 10, preferably in the range of from 20 to 50.

Hence, the present invention also relates to above-described process wherein, for the preparation of the aqueous solution according to (i), the at least one source for $YO_2$, preferably $SiO_2$, more preferably exclusively $SiO_2$, the at least one source for $X_2O_3$, preferably $Al_2O_3$, more preferably exclusively $Al_2O_3$, and Cu source, SDA, and water are employed in such amounts that the aqueous solution obtained according to (i) exhibits a molar ratio $$(nYO_2):X_2O_3$$

wherein n is at least 10, preferably is at least 15, preferably in the range of from 15 to 70, a molar ratio $$(mCu):((nYO_2)+X_2O_3)$$

wherein m is at least 0.005, preferably in the range of from 0.02 to 0.04, a molar ratio $$(qH_2O):((nYO_2)+X_2O_3)$$

wherein q is at least 10, preferably in the range of from 20 to 50, and a molar ratio $$(pSDA):((nYO_2)+X_2O_3)$$

wherein p is at least 0.035, preferably in the range of from 0.15 to 0.2.

The temperature during the preparation of the aqueous solution according to (i) is preferably in the range of from 10 to 40° C., more preferably in the range of from 15 to 35° C., and particularly preferably in the range of from 20 to 30° C.

If, for the purpose of preparing the aqueous solution according to (i), higher amounts of water as described above shall be used, it is conceivable to suitably adjust the water content of the aqueous solution to be in above-described preferred ranges. According to a suitable method preferred among others, the water content can be adjusted by removing water in at least one suitable apparatus. According to this embodiment, the water can be removed at a temperature in the range of, preferably, from 60 to 85° C., more preferably of from 65 to 80° C. and particularly preferably of from 65 to 75° C. Accordingly, the present invention also relates to a process as described above, wherein, according to (i), an aqueous solution is prepared, and, prior to (ii), the water content of the aqueous solution obtained according to (i) is adjusted so that the aqueous solution exhibits a molar ratio of water relative to the sum of (n $X_2O_3$) and $YO_2$,

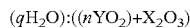

$(qH_2O):((nYO_2)+X_2O_3)$ wherein q is at least 10, more preferably at least 15, more preferably at least 20. Even more preferably, q is less than or equal to 70, more preferably less than or equal to 65, more preferably less than or equal to 60, more preferably less than or equal to 55, and more preferably less than or equal to 50. Thus, according to preferred embodiments of the present invention, q is in the range of from 10 to 70, more preferably from 15 to 60, and even more preferably from 20 to 50. Inter alia, rotary evaporators or ovens may be mentioned as at least one suitable apparatus. An oven is particularly preferred. Inter alia, apparatus which permit removal of water at reduced pressure and hence at low temperatures, such as, for example, rotary evaporators operated under reduced pressure, may be mentioned.

Hydrothermal Crystallization

In principle, it is possible to heat the aqueous solution according to (ii) under any suitable pressure and any suitable temperature or temperatures, provided that it is ensured that zeolitic material of CHA framework structure crystallizes in the solution. Here, temperatures which, at the chosen pressure, are above the boiling point of the solution obtained according to (i) are preferred. Temperatures of up to 200° C. at atmospheric pressure are more preferred. The term "atmospheric pressure" as used in the context of the present invention designates a pressure of, ideally, 101 325 Pa, which, however, may be subject to variations within the limits known to the person skilled in the art. For example, the pressure may be in the range of from 95 000 to 106 000 or of from 96 000 to 105 000 or of from 97 000 to 104 000 or of from 98 000 to 103 000 or of from 99 000 to 102 000 Pa.

According to a particularly preferred embodiment of the process according to the invention, the hydrothermal crystallization according to (ii) is carried out in an autoclave.

The present invention accordingly also relates to a process as described above, wherein the hydrothermal crystallization in (ii) is carried out in an autoclave.

The temperature used in the autoclave according to (ii) is preferably in the range of from 100 to 200° C., more preferably in the range of from 120 to 195° C., more preferably in the range of from 130 to 190° C., more preferably in the range of from 140 to 185° C. and particularly preferably in the range of from 150 to 180° C.

Accordingly, the present invention also relates to a process as described above, wherein the aqueous solution obtained according to (i), optionally after concentration as described above, is heated to a temperature in the range of from 100 to 200° C. according to (ii) in an autoclave.

According to an even more preferred embodiment of the present invention, the autoclave employed for carrying out the hydrothermal crystallization according to (ii) exhibits means for heating and cooling the content of the autoclave, more preferably external heating means such as a suitable heating/cooling jacket.

Heating the aqueous solution to said temperatures can be carried out continuously; discontinuously, such as stepwise; or semi-continuously, such as continuously up to a first temperature, holding the solution at this temperature for a given period of time, and further heating the solution from the first temperature to the desired final temperature, as described above. Also two or more temperature plateaus are conceivable. Preferably, the aqueous solution is heated continuously with a temperature profile in the range of from 5 to 95° C./h, more preferably from 10 to 55° C./h, and even more preferably 15 to 25° C./h.

Moreover, the present invention also relates to a process as described above, wherein the hydrothermal crystallization according to (ii) is carried out at a temperature in the range of from 100 to 200° C.

This temperature to which the aqueous solution is heated according to (ii) can in principle be maintained until the crystallization has taken place to the desired extent. Here, time periods of up to 340 h, more preferably of up to 300 h, more preferably of 260 h, more preferably from 1 h to 260 h, more preferably from 2 h to 252 h, more preferably from 3 to 252 h, more preferably from 4 to 240 h, more preferably from 5 to 216 h, more preferably from 6 to 192 h, more preferably from 8 to 168 h, more preferably from 12 to 144 h, more preferably from 24 to 120 h, more preferably from 48 to 115 h and more preferably from 50 to 110 h are preferred.

Therefore, the present invention also relates to a process as described above, wherein the hydrothermal crystallization according to (ii) is carried out at for a time period of from 12 to 144 h, preferably from 24 to 120 h, preferably from 48 to 115 h, and more preferably from 50 to 110 h.

According to further preferred embodiments of the present invention, crystallization times are in the range of from 12 to 48 h, more preferably from 24 to 48 h. Therefore, the present invention also relates to a process as described above, wherein the hydrothermal crystallization according to (ii) is carried out at for a time period of from 12 to 48 h, more preferably from 24 to 48.

During crystallization, pressure or pressures in the range of from 1 to 20 bar, more preferably from 2 to 10 bar and even more preferably from 5 to 8 bar are especially preferred.

Accordingly, the present invention also relates to a process as described above, wherein the colloidal solution obtained according to (i), optionally after concentration as described above, is heated for a time period in the range of from 12 to 144 h, preferably from 24 to 120 h, preferably from 48 to 115 h, and more preferably from 50 to 110 h according to (ii) at a pressure or at pressures in the range of from 1 to 20 bar, more preferably from 2 to 10 bar and even more preferably from 5 to 8 bar.

Thus, the present invention also relates to a process as described above, wherein the colloidal solution obtained according to (i), optionally after concentration as described above, is heated for a time period in the range of from 12 to 48 h, preferably from 24 to 48 h, according to (ii) at a pressure or at pressures in the range of from 1 to 20 bar, more preferably from 2 to 10 bar and even more preferably from 5 to 8 bar.

The aqueous solution is preferably suitably stirred for the crystallization according to (ii). It is also possible to rotate the reaction vessel in which the crystallization is carried out. Typical values as far as said stirring or rotation is concerned are in the range of from 40 to 250 rpm such as from 50 to 250 rpm (revolutions per minute).

While it is possible in the context of the present invention to add suitable seeding material to the solution subjected to stage (ii), such as optionally dried and/or calcined zeolitic material having CHA framework structure, it is preferred to carry out the hydrothermal crystallization and in particular the whole inventive process without seeding material.

Therefore, the present invention relates to above-described process wherein no seeding material is added, in particular no seeding material is added to the solution subjected to hydrothermal crystallization according to (ii).

According to another embodiment of the present invention, it was found that using a suitable seeding material during hydrothermal synthesis may be advantageous, in particular with regard to crystallinity of the obtained chabazite material and the hydrothermal crystallization time. While there are no particular restrictions as to the seeding material with the proviso that the desired chabazite material is obtained, it is preferred that chabazite zeolite is employed as seeding material. Further, it is conceivable that it may be possible to employ, as seeding material, as-synthesized chabazite zeolite, dried chabazite zeolite such as, for example, spray-dried and non-calcined chabazite zeolite, or (optionally dried) calcined chabazite zeolite. Further, it is conceivable that employing from 0.1 to 10 wt.-% seeding material, based on Si contained in the synthesis mixture, calculated as $SiO_2$, may be advantageous. Exemplary amounts of seeding material, based on Si in the synthesis mixture, are, for example, 1 to 9 wt.-%, 2 to 8 wt.-%, 3 to 7 wt.-%, or 4 to 6 wt.-%.

Therefore, the present invention also relates to above-described process wherein a seeding material is added, in particular a seeding material is added to the solution subjected to hydrothermal crystallization according to (ii).

According to one embodiment of the process according to the invention, the crystallization according to (ii) can be terminated by suitable quenching. Here, it is particularly preferred to add water to the suspension, wherein the water has a temperature which is suitable for terminating the crystallization.

According to another embodiment of the present invention, the crystallization according to (ii) is terminated without quenching, preferably by terminating supply of heat to the autoclave, more preferably by terminating supply of heat to the autoclave via the jacket of the autoclave. Terminating the supply of heat can be carried out by either terminating supply of heating medium to the jacket or by terminating supply of heating medium and passing at least one suitable cooling medium through the jacket.

After hydrothermal crystallization according to (ii), the mother liquor containing the inventive Cu containing zeolitic material having CHA framework structure is suitably separated from said mother liquor. Prior to separation, the temperature of the mother liquor containing the zeolitic material may be suitably decreased to a desired value employing a suitable cooling rate. Typical cooling rates are in the range of from 15 to 45° C./h, preferably from 20 to 40° C./h, and even more preferably from 25 to 35° C./h.

Typical temperatures of the cooled mother liquor containing the inventive Cu containing zeolitic material having CHA framework structure are in the range of from 25 to 55° C., preferably of from 35 to 50° C.

Separation and Drying Stages

According to one embodiment of the process according to the invention, the Cu containing zeolitic material having CHA framework structure is separated in a suitable manner in at least one step from the suspension, i.e. the mother liquor containing the zeolitic material, obtained from (ii). This separation can be effected by all suitable methods known to the skilled person, for example, by decantation, filtration, ultrafiltration, diafiltration or centrifugation methods or, for example, spray drying and spray granulation methods.

The suspension obtained according to (ii) as such or the suspension obtained by concentrating the suspension obtained according to (ii) can be subjected to the separation, for example separation by spray methods. Concentrating the suspension obtained according to (ii) can be achieved, for example, by evaporating, as for example evaporating under reduced pressure, or by cross flow filtration. Likewise, the suspension obtained according to (ii) can be concentrated by separating the suspension according to (ii) into two fractions wherein the solid contained in one of both fractions is separated off by filtration, ultrafiltration, diafiltration, or centrifugation or spray methods and is suspended after an optional washing step and/or drying step in the other fraction of the suspension. The sprayed material, obtained by spray drying and spray granulation drying, such as fluidized-bed spray granulation drying, as combined separation and drying methods, can contain solid and/or hollow spheres, and can substantially consist of such spheres, respectively, which have, for example, a diameter in the range of from 5 to 500 μm or also 5 to 300 μm. Single component or multiple component nozzles can be used during spraying as spray nozzles. The use of a rotary atomizer is also conceivable. Possible inlet temperatures for the used carrier gas are, for example, in the range of from 200 to 600° C., preferably in the range of from 225 to 550° C., and more preferably in the range of from 300 to 500° C. The outlet temperature of the carrier gas is, for example, in the range of from 50 to 200° C. Air, lean air or oxygen-nitrogen mixtures with an oxygen content of up to 10 vol. %, preferably of up to 5 vol. %, more preferably of less than 5 vol. %, as, for example, of up to 2 vol. %, may be mentioned as carrier gases. The spray methods can be carried out in counter-current or co-current flow.

Therefore, the present invention also relates to above-described process, additionally comprising (iii) separating the Cu containing zeolitic material from the suspension obtained according to (ii).

Depending on the structure directing agent content of the mother liquor separated from the zeolitic material, the structure directing agent can be re-used in (i), optionally after having been suitably separated from the mother liquor. According to an alternative, the mother liquor containing structure directing agent can be re-used as such in (i), without separation of the structure directing agent.

If, e.g., the zeolitic material is separated by filtration or centrifugation or concentration of the suspension obtained according to (ii), it is preferred that that the separated zeolitic material is suitably dried. Before the separated zeolitic material is dried, it may be washed at least once with a suitable washing agent, wherein it is possible to use identical or different washing agents or mixtures of washing agents in the case of at least two of the washing steps and to use identical or different drying temperatures in the case of at least two drying steps.

The drying temperatures here are preferably in the range of from room temperature to 200° C., more preferably of from 60 to 180° C., more preferably of from 80 to 160° C. and more preferably in the range of from 100 to 150° C.

The durations of drying are preferably in the range of from 2 to 48 h, more preferably of from 4 to 36 h.

Accordingly, the present invention also relates to the process as described above, additionally comprising drying the Cu containing zeolitic material, separated according to (iii), at a temperature in the range of from 100 to 150° C.

Moreover, the present invention also relates to the process as described above, additionally comprising
(iii) separating the Cu containing zeolitic material from the suspension obtained according to (ii);
(iv) drying the Cu containing zeolitic material, separated according to (iii), at a temperature in the range of from 100 to 150° C.

Washing agents used may be, for example, water, alcohols, such as, for example, methanol, ethanol or propanol, or mixtures of two or more thereof. For example, mixtures of two or more alcohols, such as, for example, methanol and ethanol or methanol and propanol or ethanol and propanol or methanol and ethanol and propanol, or mixtures of water and at least one alcohol, such as, for example, water and methanol or water and ethanol or water and propanol or water and methanol and ethanol or water and methanol and propanol or water and ethanol and propanol or water and methanol and ethanol and propanol, may be mentioned as mixtures. Water or a mixture of water and at least one alcohol, preferably water and ethanol, is preferred, wherein water as the sole washing agent being is very particularly preferred.

If, e.g., the separation is carried out by means of spray drying methods or spray granulation methods, as described above, this method provides the advantage that the separation of the zeolitic material from the suspension obtained according to (ii) and the drying of the zeolitic material can be carried out in a single step.

Additionally, in particular where the separation is carried out by means of spray drying methods or spray granulation methods, suitable compounds may be added to the suspension which is subjected to the spray drying methods or spray granulation methods. Such compounds can be pore forming agents resulting in, e.g., micropores and/or mesopores, binder compounds, or the like. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds.

Therefore, the following preferred separation, washing and or drying sequences may be listed by way of example in the context of the present invention:
(a) The mother liquor containing the Cu containing zeolitic material having CHA framework type is subjected to spraying without further treatment, i.e. it is subjected to spraying as obtained from hydrothermal crystallization, optionally after suitable cooling. Prior to spraying, the suspension can be admixed with suitable compounds such as pore forming agents or binder compounds.
(b) The mother liquor containing the Cu containing zeolitic material having CHA framework type is subjected to spraying after suitable concentration, as described above. Prior to spraying, the suspension can be admixed with suitable compounds such as pore forming agents or binder compounds.
(c) The mother liquor containing the Cu containing zeolitic material having CHA framework type is subjected to a separation stage different from spraying, e.g. to decantation, filtration, ultrafiltration, diafiltration or centrifugation.

The sprayed material obtained from (a) or (b) or the material obtained from (c) can be washed at least once, with at least one suitable washing agent, optionally admixed with at least one suitable base and/or at least one suitable acid. After the washing stage or the washing stages, the material can be suitably dried wherein the drying temperatures are preferably in the range of from room temperature to 200° C., more preferably of from 60 to 180° C., more preferably of from 80 to 160° C., and more preferably in the range of from 100 to 150° C., the durations of drying preferably being in the range of from 2 to 48 h, more preferably of from 4 to 36 h.

If the material is obtained according to (c), the optionally washed and optionally dried material can be slurried in at least one suitable compound such as, e.g. water. The suspension thus obtained may be subjected to a spraying stage such as spray drying or spray granulation drying. Prior to spraying, at least one suitable further compound such as a pore forming agent and/or a binder compound may be added to the suspension. After this spraying stage, the sprayed material may be subjected to at least one suitable washing stage, optionally followed by a subsequent suitable drying stage.

If the zeolitic material according to the present invention is separated from its mother liquor by filtration, it is particularly preferred to admix a suitable amount of a suitable acidic compound to the suspension containing the zeolitic material prior to filtration. Most preferably, such amounts of acidic compounds are added that the pH of the resulting suspension to be filtrated is in the range of from 6 to 8, preferably in the range of from 6.5 to 7.5 and more preferably in the range of from 6.8 to 7.2 such about 6.5, 6.6, 6.7, 6.8, 6.9, 7.0, 7.1 or 7.2 or 7.3 or 7.4 or 7.5. Surprisingly, it has been found that adjusting the pH of the suspension to such values, in particular to values around 7.0 strongly facilitates aggregation of the zeolitic crystalline material contained in the suspension and, thus, strongly facilitates formation of a respective filter cake and, in turn, the separation of the zeolitic material from its mother liquor. Such acids are preferred which can be easily removed via drying and calcination, as described herein. Among others, nitric acid or suitable organic acids such as formic acid or acetic acid may be mentioned as suitable acid.

Calcination

According to a particularly preferred embodiment of the process according to the invention, the zeolitic material obtained according to (iii) or (iv), preferably after (iv), is calcined in at least one additional step.

Therefore, the present invention also relates to above-described process, additionally comprising calcining the Cu containing zeolitic material.

It is possible in principle to feed the suspension comprising the zeolitic material directly to the calcination. Preferably, the zeolitic material is separated from the suspension, as described above, according to (iii), before the calcination. Even more preferably, the zeolitic material is dried before the calcination.

The calcination of the zeolitic material obtained according to (ii) and/or (iii) and/or (iv) is preferably effected at a temperature in the range of up to 750° C. According to one alternative, if the calcination is carried out under static conditions, such as, e.g., in a muffle furnace, temperatures of up to 600 to 650° C. are preferred. According to another alternative, if the calcination is carried out under dynamic conditions, such as, e.g., in a rotary calciner, temperatures of up to 700 to 750° C. are preferred.

According to a preferred embodiment of the process according to the invention, the zeolitic material is heated thereby from room temperature or from the temperature employed for the drying stage to a temperature of up to 750° C., wherein, more preferably, the heating rate is in the range of from 0.1 to 10° C./min, more preferably of from 0.2 to 5° C./min and particularly preferably in the range of from 1 to 4° C./min. This temperature is preferably, for example, in the range of from 200 to 750° C. Calcination temperatures in the range of from 250 to 700° C. are preferred, temperatures in the range of from 300° C. to 650° C. are particularly preferred.

According to an especially preferred embodiment of the present invention, calcination is carried out for such a period of time that the total organic carbon (TOC) content of the resulting calcined material is 0.1 wt.-% or less, based on the total weight of the calcined material.

Therefore, the present invention also relates to above-described process, additionally comprising (v) calcining the Cu containing zeolitic material, preferably dried according to (iv), at a temperature in the range of from 300 to 650° C., wherein, according to an even more preferred embodiment, the heating rate for achieving this temperature is in the range of from 0.1 to 10° C./min, in particular in the range of from 1 to 4° C./min.

According to a possible embodiment of the process according to the invention, the calcination is carried out stepwise at successive temperatures. The term "stepwise at successive temperatures" as used in the context of the present invention designates a calcination in which the zeolitic material to be calcined is heated to a certain temperature, kept at this temperature for a certain time and heated from this temperature to at least one further temperature and kept there in turn for a certain time. Preferably, the zeolitic material to be calcined is kept at up to 4 temperatures, more preferably at up to 3 temperatures and particularly preferably at 2 temperatures. In this respect, the first temperature is preferably in the range of from 300 to 550° C., more preferably in the range of from 350 to 550° C. This temperature is preferably maintained for a time in the range of from 1 to 24 h, more preferably of from 2 to 18 h and in particular of from 5 to 10 hours. The second temperature is preferably in the range of from greater than 550 to 750° C., more preferably in the range of from 575 to 700° C. and particularly preferably in the range of from 600 to 650° C. This temperature is preferably maintained for a time in the range of from 1 to 24 h, more preferably of from 2 to 18 h and in particular of from 5 to 10 hours.

Accordingly, the present invention also relates to a process as described above, wherein the calcination is effected stepwise at successive temperatures in the range of up to 750° C., preferably from 200 to 750° C., more preferably from 250 to 700° C., more preferably from 300 to 650° C.

If the calcination is carried out stepwise, the respective heating rates to achieve the desired temperatures may be the same or different. If, e.g., calcination is carried out at two temperatures, the first temperature preferably being in the range of from 300 to 550° C., more preferably in the range of from 350 to 550° C., this temperature preferably being maintained for a period of time in the range of from 1 to 24 h, more preferably of from 2 to 18 h and in particular of from 5 to 10 hours, preferred heating rates to achieve this temperature are in the range of from 0.1 to 10° C./min, more preferably of from 1 to 4° C./min. The heating rate for achieving the second temperature, preferably being in the range of from greater than 550 to 750° C., more preferably in the range of from 600 to 650° C., this temperature preferably being maintained for a time in the range of from 1 to 24 h, more preferably of from 2 to 18 h and in particular of from 5 to 10 hours, is preferably in the range of from 0.1 to 10° C./min, more preferably of from 1 to 4° C./min.

According to a preferred embodiment of the present invention, the first heating rate to achieve the first temperature may be in the range of from 1.5 to 2.5° C./min, more preferably of from 1.75 to 2.25° C./min, and the second heating rate to achieve the second temperature may be in the range of from 0.5 to 1.5° C./min, more preferably of from 0.75 to 1.25° C./min.

Therefore, the present invention also relates to above-described process, additionally comprising (v)(a) calcining the Cu containing zeolitic material, preferably dried according to (iv), at a first temperature in the range of from 300 to 550° C., more preferably in the range of from 350 to 550° C., wherein, according to an even more preferred embodiment, the heating rate to achieve this temperature is in the range of from from 0.1 to 10° C./min, preferably of from 0.2 to 5° C./min, and (v)(b) calcining the thus calcined Cu containing zeolitic material at a second temperature in the range of from greater than 550 to 750° C., more preferably in the range of from 600 to 650° C., wherein, according to an even more preferred embodiment, the heating rate to achieve this temperature is in the range of from 0.1 to 10° C./min, preferably of from 0.2 to 5° C./min, wherein, even more preferably, the heating rate to achieve the second temperature is lower than the heating rate to achieve the first temperature, the first heating rate more preferably being in the range of from 1.75 to 2.25° C./min and the second heating rate more preferably being in the range of from 0.75 to 1.25° C./min.

The calcination can be effected in any suitable atmosphere, such as, for example, air, lean air depleted in oxygen, oxygen, nitrogen, water steam, synthetic air, carbon dioxide. The calcination is preferably effected under air. It is also conceivable that calcination is carried out in a dual mode, i.e. a mode comprising a first calcination in an oxygen-reduced or oxygen-free atmosphere, said mode comprising a second calcination in an oxygen-enriched or pure oxygen atmosphere.

The calcination can be carried out in any apparatus suitable for this purpose. The calcination is preferably effected under static and/or dynamic conditions, such as in a rotating tube, in a belt calciner, in a muffle furnace, in situ in an apparatus in which the zeolitic material is subsequently used for the intended purpose, for example as a molecular sieve, catalyst, or for any other application described below. A rotating tube and a belt calciner are particularly preferred.

Accordingly, the present invention also relates to above-described process, additionally comprising (iii) separating the Cu containing zeolitic material from the suspension obtained according to (ii);

(iv) drying the Cu containing zeolitic material, separated according to (iii), preferably at a temperature in the range of from 100 to 150° C.;

(v) calcining the Cu containing zeolitic material, dried according to (iv), preferably at a temperature in the range of from 300 to 650° C.

According to a conceivable embodiment of the present invention, according to which the zeolitic material obtained according to (ii) is separated from the suspension obtained from (ii) by means of spray drying methods or spray granulation methods, the conditions employed during the separation may be chosen so that during the separation at least a portion of the zeolitic material is at least partly calcined. Thereby, during the separation, temperatures of preferably at least 300° C. are chosen. This embodiment may provide the advantage that the separation step, the drying step and at least partly the calcination step are combined to a single step.

The present invention also relates to the Cu containing zeolitic material having framework structure CHA, obtainable or obtained by above-described process.

According to a particularly preferred embodiment, the present invention is especially characterized in that only in stage (i), a copper source is employed. In no subsequent stage of the process any other copper source is employed. In particular, neither after drying nor after calcining, the obtained Cu containing zeolitic material having framework structure CHA is contacted with a copper source. Therefore, the present invention allows for a straight-forward direct synthesis of a Cu containing CHA zeolitic material wherein no post-synthesis stage for contacting a (copper-free) CHA zeolitic material with a suitable Cu source has to be carried out.

Therefore, the present invention also relates to above-described process and the Cu containing zeolitic material having CHA framework structure obtainable or obtained by this process, wherein, after (i), no Cu source is employed. In particular, neither the dried nor the calcined zeolitic material is subjected to any treatments wherein a Cu source is employed.

According to an even more preferred embodiment wherein the Cu containing zeolitic material is synthesized, as described above, in the absence of sodium, in particular in the absence of alkali metal, the process of the present invention allows for an even more simplified process since the time consuming ion-exchange steps usually to be employed—namely
(I) synthesis of the Na form of a CHA zeolitic material,
(II) calcination, removing the template (SDA) thus forming the H—Na form,
(III) transformation to the NH form, and, finally
(IV) transformation to the $Cu^{2+}$ form
can be avoided.

Consequently, the present invention allows for an economically and also ecologically advantageous process for the preparation of a Cu containing zeolitic material having CHA framework structure.

In particular, the present invention relates to a Cu containing zeolitic material having CHA framework structure, obtainable or obtained by a process, comprising
(i) preparation of an aqueous solution containing at least one source for $X_2O_3$, preferably at least one source for $Al_2O_3$, and at least one source for $YO_2$, preferably at least one source for $SiO_2$, at least one structure directing agent suitable for the preparation of a zeolitic material having CHA framework structure, preferably a mixture of 1-adamantyltrimethylammonium hydroxide and benzyltrimethylammonium hydroxide or a mixture of 1-adamantyltrimethylammonium hydroxide and tetramethylammonium hydroxide, and at least one Cu source, wherein said aqueous solution does not contain a phosphorus source;
(ii) hydrothermal crystallization of the aqueous solution according to (i) which does not contain a phosphorus source, obtaining a suspension containing the copper containing zeolitic material having CHA framework structure;
(iii) separating the Cu containing zeolitic material from the suspension obtained according to (ii);
(iv) drying the Cu containing zeolitic material, separated according to (iii), preferably at a temperature in the range of from 100 to 150° C., wherein, prior to drying, the separated Cu containing zeolitic material is washed at least once, preferably with water;
(v) calcining the Cu containing zeolitic material, dried according to (iv), preferably at a temperature in the range of from 300 to 650° C.;
wherein, after (i), no Cu source is employed.

According to an even more preferred embodiment, the present invention relates to a Cu containing zeolitic material having CHA framework structure, obtainable or obtained by a process, comprising
(i) preparation of an aqueous solution containing at least one source for $X_2O_3$, preferably at least one source for $Al_2O_3$, and at least one source for $YO_2$, preferably at least one source for $SiO_2$, at least one structure directing agent suitable for the preparation of a zeolitic material having CHA framework structure, preferably a mixture of 1-adamantyltrimethylammonium hydroxide and benzyltrimethylammonium hydroxide or a mixture of 1-adamantyltrimethylammonium hydroxide and tetramethylammonium hydroxide, and at least one Cu source, wherein said aqueous solution does not contain a phosphorus source;
(ii) hydrothermal crystallization of the aqueous solution according to (i) which does not contain a phosphorus source, obtaining a suspension containing the copper containing zeolitic material having CHA framework structure;
(iii) separating the Cu containing zeolitic material from the suspension obtained according to (ii);
(iv) drying the Cu containing zeolitic material, separated according to (iii), preferably at a temperature in the range of from 100 to 150° C., wherein, prior to drying, the separated Cu containing zeolitic material is washed at least once, preferably with water;
(v) calcining the Cu containing zeolitic material, dried according to (iv), preferably at a temperature in the range of from 300 to 650° C.;
wherein, after (i), no Cu source is employed, and wherein, for the preparation of the aqueous solution according to (i), the at least one source for $YO_2$, preferably $SiO_2$, more preferably exclusively $SiO_2$, the at least one source for $X_2O_3$, preferably $Al_2O_3$, more preferably exclusively $Al_2O_3$, and Cu source, SDA, and water are employed in such amounts that the aqueous solution obtained according to (i) exhibits a molar ratio $$(nYO_2):X_2O_3$$

wherein n is at least 10, preferably at least 15, preferably in the range of from 15 to 70, a molar ratio $$(mCu):((nYO_2)+X_2O_3)$$

wherein m is at least 0.005, preferably in the range of from 0.02 to 0.04, a molar ratio $$(qH_2O):((nYO_2)+X_2O_3)$$

wherein q is at least 20, preferably in the range of from 40 to 50, and a molar ratio $$(pSDA):((nYO_2)+X_2O_3)$$

wherein p is at least 0.035, preferably in the range of from 0.15 to 0.2.

According to a particularly preferred embodiment, the present invention relates to a Cu containing zeolitic material having CHA framework structure, having a composition including of molar ratio $$(nYO_2):X_2O_3$$

wherein X is a Al, Y is Si, and n is in the range of from 15 to 70, said zeolitic material having CHA framework structure having a Cu content in the range of from 2.0 to 4.0 wt.-%, preferably from 2.5 to 3.5 wt.-%, based on the total weight of the calcined zeolitic material, said zeolitic material being obtained by a process, comprising (i) preparation of an aqueous solution containing at least one source for Al$_2$O$_3$, and at least one source for SiO$_2$, a mixture of 1-adamantyltrimethyl ammonium hydroxide and benzyltrimethylammonium hydroxide, or a mixture of 1-adamantyltrimethyl ammonium hydroxide and tetramethylammonium hydroxide, as structure directing agent (SDA), and at least one Cu source, wherein said aqueous solution does not contain a phosphorus source and does not contain a sodium source, in particular an alkali source, and wherein the pH of the aqueous solution is in the range of from 12 to 14;

(ii) hydrothermal crystallization of the aqueous solution according to (i) which does not contain a phosphor source, obtaining a suspension containing the Cu containing zeolitic material having CHA framework structure;

(iii) separating the Cu containing zeolitic material from the suspension obtained according to (ii), preferably by filtration;

(iv) drying the Cu containing zeolitic material, separated according to (iii), at a temperature in the range of from 100 to 150° C., wherein, prior to drying, the separated Cu containing zeolitic material is washed at least once, preferably with water;

(v) calcining the Cu containing zeolitic material, dried according to (iv), at a temperature in the range of from 300 to 600° C., preferably stepwise at successive temperatures in the range of from 350 to 550° C., and in the range of from 570 to 600° C., respectively;

wherein, after (i), no Cu source is employed, and wherein, for the preparation of the aqueous solution according to (i), the at least one source for SiO$_2$, the at least one source for Al$_2$O$_3$, and Cu source, SDA, and water are employed in such amounts that the aqueous solution obtained according to (i) exhibits a molar ratio $$(n\text{YO}_2):\text{X}_2\text{O}_3$$

wherein n is in the range of from 15 to 70, a molar ratio $$(m\text{Cu}):((n\text{YO}_2)+\text{X}_2\text{O}_3)$$

wherein m is in the range of from 0.02 to 0.04, a molar ratio $$(q\text{H}_2\text{O}):((n\text{YO}_2)+\text{X}_2\text{O}_3)$$

wherein q is in the range of from 40 to 50, and a molar ratio $$(p\text{SDA}):((n\text{YO}_2)+\text{X}_2\text{O}_3)$$

wherein p is in the range of from 0.07 to 0.2.

The Cu Containing Zeolitic Material as Such

The present invention also relates to a Cu containing zeolitic material as such, having framework structure CHA, being free of P, and having a composition comprising the molar ratio $$(n\text{YO}_2):\text{X}_2\text{O}_3$$

wherein X is a trivalent element, Y is a tetravalent element and n is at least 10, preferably at least 15, and wherein the Cu content of the zeolitic material, calculated as elemental Cu, is at least 0.5 wt.-%, based on the total weight of the calcined zeolitic material. In this context, the term "Cu containing zeolitic material as such, having framework structure CHA, being free of P" relates to the calcined zeolitic material which is essentially free of water and from which the structure directing agent and any other organic compounds such as organic acids have been essentially removed by calcination.

The term "free of P" as used in this context of the present invention relates to a P content of the calcined material below 500 ppm, preferably below 300 ppm.

Preferably, n is in the range of from 15 to 70, more preferably in the range of from 15 to 60, more preferably in the range of from 15 to 50. By way of example, especially preferred values of n are 15, 20, 25, 30, 40, 45, 50.

The Cu content of the zeolitic material, calculated as elemental Cu, is preferably at least 1.0 wt.-%, more preferably at least 1.5 wt.-%, more preferably at least 2.0 wt.-% and even more preferably at least 2.5 wt.-%, in each case based on the total weight of the calcined zeolitic material. Even more preferably, the Cu content of the zeolitic material, calculated as elemental Cu, is in the range of up to 5 wt.-%, more preferably of up to 4.5 wt.-%, more preferably of up to 4.0 wt.-%, and even more preferably of up to 3.5 wt.-%, in each case based on the total weight of the calcined zeolitic material. Therefore, preferred ranges of the Cu content of the zeolitic material, calculated as elemental Cu, are from 1.0 to 5.0 wt.-%, more preferably from 1.5 to 4.5 wt.-%, more preferably from 2.0 to 4.0 wt.-%, and even more preferably from 2.5 to 3.5 wt.-%, in each case based on the total weight of the calcined zeolitic material.

Therefore, the present invention also relates to the zeolitic material as described above, wherein the Cu content of the zeolitic material, calculated as elemental Cu, is in the range of from 2.5 to 3.5 wt.-%, based on the total weight of the calcined zeolitic material.

According to a further embodiment of the present invention, the Cu containing zeolitic material as such, having framework structure CHA, being free of P, additionally contains La, preferably in such an amount that that the atomic ratio La:Cu is in the range of from 1:10 to 1:100, more preferably in the range of from 1:20 to 1:80, and even more preferably in the range of from 1:30 to 1:60.

Therefore, the present invention also relates to the zeolitic material as described above, additionally containing La, preferably in such an amount that the atomic ratio La:Cu is in the range of from 1:10 to 1:100.

Generally, all conceivable trivalent elements X and tetravalent elements Y may be contained in the zeolitic framework, are referred to as X$_2$O$_3$ and YO$_2$ in the context of the present invention.

Preferably, the trivalent element X is selected from the group consisting of Al, B, In, G, and a mixture of two or more thereof. According to an especially preferred embodiment of the present invention, the trivalent element X is Al, and even more preferably, Al is the only trivalent element building up the CHA zeolitic framework structure.

Preferably, the tetravalent element Y is selected from group consisting of Si, Sn, Ti, Zr, Ge, and a mixture of two or more thereof. According to an especially preferred embodiment of the present invention, the tetravalent element Y is Si, and even more preferably, no other tetravalent element is used, Si thus being the only tetravalent element building up the CHA zeolitic framework structure.

Even more preferably, the calcined zeolitic material described above is free of sodium, in particular free of alkali metal. The term "free of alkali metal" and "free of sodium", as used in this context of the present invention relates to zeolitic materials having an alkali metal content, and a sodium content, respectively, of 1000 ppm or less, preferably 500 ppm or less, more preferably 300 ppm or less.

According to a conceivable embodiment of the present invention, the zeolitic material as described above additionally contains at least one metal selected from the group consisting of Fe, Co, Ni, Zn, Y, and V. More preferably, the zeolitic material as described above essentially consists of Si, Al, Cu, and O, and optionally La, and contains essentially no further element.

According to one embodiment of the present invention, the edges of at least 90%, preferably at least 95% of the crystallites of the calcined zeolitic material as described above or of the calcined zeolitic material obtainable or obtained according to the process as described above have a mean length in the range of from 0.05 to 5 micrometer, preferably in the range of from 0.1 to 4 micrometer, more preferably in the range of from 0.5 to 4 micrometer, more preferably in the range of from 0.75 to 4 micrometer, and in particular in the range of from 1 to 3 micrometer, determined via SEM.

According to a preferred embodiment of the present invention, the calcined zeolitic material, obtainable or obtained by the process of the present invention, or the Cu containing zeolitic material as such, having CHA framework structure, has a TOC content of 0.1 wt.-% or less, based on the total weight of the zeolitic material.

According to a preferred embodiment of the present invention, the calcined zeolitic material, obtainable or obtained by the process of the present invention, or the Cu containing zeolitic material as such, having CHA framework structure, has a BET surface, determined according to DIN 66131, in the range of from 300 to 700 $m^2/g$, preferably of from 400 to 700 $m^2/g$.

According to a preferred embodiment of the present invention, the calcined zeolitic material, obtainable or obtained by the process of the present invention, or the Cu containing zeolitic material as such, having CHA framework structure, has a Langmuir surface, determined according to DIN 66135, in the range of from 400 to 975 $m^2/g$, preferably of from 550 to 975 $m^2/g$.

According to a preferred embodiment of the present invention, the calcined zeolitic material, obtainable or obtained by the process of the present invention, or the Cu containing zeolitic material as such, having CHA framework structure, has a thermal stability, determined via differential thermal analysis or differential scanning calorimetry, in the range of from 900 to 1400° C., preferably in the range of from 1100 to 1400° C., more preferably in the range of from 1150 to 1400° C.

Moldings

The zeolitic material according to the present invention may be provided in the form of a powder or a sprayed material obtained from above-described separation techniques, e.g. decantation, filtration, centrifugation, or spraying.

In many industrial applications, it is often desired on the part of the user to employ not the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, the present invention also relates to a molding comprising the Cu containing zeolitic material having framework structure CHA of the present invention.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promotors, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

The catalysts of the present invention may also be provided in the form of extrudates, pellets, tablets or particles of any other suitable shape, for use as a packed bed of particulate catalyst, or as shaped pieces such as plates, saddles, tubes, or the like.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention having the CHA structure may be deposited on an open cell foam substrate. Such substrates are well known in the art, and are typically formed of refractory ceramic or metallic materials.

Use of the Cu Containing Zeolitic Material Having CHA Structure

In general, the zeolitic material described above can be used as molecular sieve, adsorbent, catalyst, catalyst support or binder thereof. Especially preferred is the use as catalyst. For example, the zeolitic material can be used as molecular sieve to dry gases or liquids, for selective molecular separation, e.g. for the separation of hydrocarbons or amides; as ion exchanger; as chemical carrier; as adsorbent, in particular as adsorbent for the separation of hydrocarbons or amides; or as catalyst. Most preferably, the zeolitic material according to the present invention is used as catalyst.

Therefore, the present invention also relates to a catalyst, preferably a molded catalyst, containing the Cu containing zeolitic material having CHA framework structure as described above.

Moreover, the present invention relates to the use of the Cu containing zeolitic material having CHA framework structure as described above as a catalyst.

Moreover, the present invention relates to a method of catalyzing a chemical reaction wherein the Cu containing zeolitic material having CHA framework structure according to the present invention is employed as catalytically active material.

Among others, said catalyst may be employed as catalyst for the selective reduction (SCR) of nitrogen oxides $NO_x$; for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes.

Therefore, the present invention also relates to a method for selectively reducing nitrogen oxides $NO_x$ by contacting a stream containing $NO_x$ with a catalyst containing the Cu containing zeolitic material having CHA framework structure according to the present invention under suitable reducing conditions; to a method of oxidizing $NH_3$, in particular of oxidizing $NH_3$ slip in diesel systems, by contacting a stream containing $NH_3$ with a catalyst containing the Cu containing zeolitic material having CHA framework structure according to the present invention under suitable oxidizing conditions; to a method of decomposing of $N_2O$ by contacting a stream containing $N_2O$ with a catalyst containing the Cu containing zeolitic material having CHA framework structure according to the present invention under suitable decomposition conditions; to a method of controlling emissions in Advanced Emission Systems such as Homogeneous Charge Compression Ignition (HCCI) engines by contacting an emission stream with a catalyst containing the Cu containing zeolitic material having CHA framework structure according to the present invention under suitable conditions; to a fluid catalytic cracking FCC process wherein the Cu containing zeolitic material having CHA framework structure according to the present invention is employed as additive; to a method of converting an organic compound by contacting said compound with a catalyst containing the Cu containing zeolitic material having CHA framework structure according to the present invention under suitable conversion conditions; to a "stationary source" process wherein a catalyst is employed containing the Cu containing zeolitic material having CHA framework structure according to the present invention.

Most preferably, the zeolitic material according to the present invention or the zeolitic material obtainable of obtained according to the present invention is used as catalyst, preferably as molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for SCR (selective catalytic reduction) of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Therefore, the present invention also relates to a method for selectively reducing nitrogen oxides $NO_x$, wherein a gaseous stream containing nitrogen oxides $NO_x$, preferably also containing ammonia and/urea, is contacted with the zeolitic material according to the present invention or the zeolitic material obtainable of obtained according to the present invention, preferably in the form of a molded catalyst, still more preferably as a molded catalyst wherein the zeolitic material is deposited on a suitable refractory carrier, still more preferably on a "honeycomb" carrier.

The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a catalyst containing the zeolitic material according to the present invention or the zeolitic material obtainable of obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Especially preferred is the use of a catalyst containing the zeolitic material according to the present invention or the zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

When preparing specific catalytic compositions or compositions for different purposes, it is also conceivable to blend the Cu containing material according to the present invention having CHA structure with at least one other catalytically active material or a material being active with respect to the intended purpose. It is also possible to blend at least two different inventive materials which may differ in the Cu content, and/or in the $YO_2:X_2O_3$ ratio, preferably in the $SiO_2:Al_2O_3$ ratio, and/or in the presence or absence of a further metal such as a transition metal and/or a lanthanide such as La, and/or in the specific amounts of a further metal such as a transition metal and/or a lanthanide such as La, or the like. It is also possible to blend at least two different inventive materials with at least one other catalytically active material or a material being active with respect to the intended purpose. By way of example, it is possible to blend at least one inventive material with at least one other zeolitic material having CHA structure type and being prepared according to the prior art wherein the zeolitic material, after hydrothermal crystallization, is subjecting to an ion-exchange process wherein, e.g., Cu is introduced. Such mixing of two or more different Cu—CHA materials according to invention or at least one Cu—CHA material according to the invention with at least one other material, such as, e.g., a Cu—CHA material obtained according to the prior art might be useful as catalytic compositions allowing for even better meeting low and high temperature needs in, e.g., catalytic applications.

The following examples shall further illustrate the process and the materials of the present invention.

EXAMPLES

Determination of Thermal Stability

Throughout the examples, thermal stability of the materials was determined with the thermal analysis instrument STA 449C Jupiter. If the determination of thermal stability is referred to in the present invention, it shall be understood that said determination refers to the determination according to this instrument. The thermal analysis instrument STA 449C Jupiter is designed to simultaneously measure the mass changes (TG) and the calorimetric effects (DSC or DTA) at both high and low temperature. The TG technique measures the temperature-induced changes in sample mass. The output signal may be differentiated electronically to yield a DTG curve. The DTA technique measures the difference in temperature between the sample and a reference material. DTA curves provide information on the temperature range wherein a process takes place and allow calculation of the value of the enthalpy change ($\Delta H$). Similar information can be obtained from DSC. The following test conditions were applied: 10 mg of sample were used for TGA/DTA. The temperature ramp rate was 30° C./min from room temperature to 1400° C.

Determination of Crystallinity

Crystallinity, as determined in the examples and throughout the invention, shall be understood as being determined using a Bruker D 4 Endeavor diffractometer, having 4° Söller slits, V20 variable divergence slits, and scintillator counter as X-ray detector. The following measurement conditions were applied: The samples to be analyzed were measured from 2° to 70° (2 theta), or if a quick result is needed from 2° to 47° (2 theta) with a shorter time/step. Step width of 0.02° and step time of 2 seconds were used. The measurements were done with variable primary and secondary divergence slits. Prior to refinement the raw data were converted to fixed slit data using the data evaluation program EVA from Bruker AXS. This had the effect of flattening the background and localizing the halo of the amorphous phase. The converted raw data were then refined in Rietveld program "Topas" by Bruker AXS using the above mentioned procedure. The background was modeled by a Chebychev function of order one which corresponds to a linear function where the slope is a refinable parameter. The fitting range was chosen from 8° to 70° (2 theta). The amorphous peak position was fixed at 21.95° (2 theta).

Analytical Method:

CHA is a three-dimensional framework zeolite consisting of 4- and 6-membered rings of $SiO_4$ tetrahedra, which form two cages per unit cell. Chabazite crystallizes in a rhombohedral unit cell with space group R-3M and lattice constants of a=1.352 nm and c=1.468 nm. The diffractogram of good crystalline sample shows only sharp diffraction lines and no anisotropic line broadening. Totally amorphous Si/O has a main, broad diffraction peak in the range between approximately 15° and 35° (2 theta) with the peak maximum at around 22° (2 theta). Therefore any amorphous content in a zeolite sample leads to a decrease of the peak area under the crystalline peaks in this range and to an increase of the amorphous peak area. The area of the diffraction peaks of the chabazite phase and the amorphous phase was determined with the help of the whole pattern decomposition technique using the Rietveld program "Topas" from Bruker AXS. The degree of crystallinity is defined as the ratio from the area of the crystalline chabazite phase to the combined area of the crystalline and amorphous phase (D=Ic/(Ic+Ia)). This method does not rely on additional external standards to be measured or spiking methods, which acquire additional preparation efforts. The diffraction peaks of the chabazite were refined by defining the space group and the lattice constants for the chabazite phase. These determine the position of the individual (hkl) diffraction lines. The intensities of the (hkl) lines are individually refinable parameters. The amorphous phase was defined by a single peak phase with its position at 22°. The positions as well as the area of the amorphous peak phase are refinable parameters. Instead of using analytical functions like Pseudo Voigt or Pearson VII to fit the shape of the (hkl)-lines and the amorphous peak phase, the fundamental parameter approach of "Topas" was used, where the instrumental parameters of the diffractometer are used to model the shape of the individual peaks. This had the advantage of keeping the number of refinable parameters small thereby avoiding cross correlations between refinable parameters.

Example 1

Production of a Cu Containing Zeolitic Material Having CHA Framework Structure

1.1 Preparation of the Synthesis Gel

The following starting materials were employed:
Deionized water
Trimethyl-1-adamantylammonium hydroxide (TMAA, 12.2 wt.-% in water)
Trimethylbenzylammonium hydroxide (TMBA, 40 wt.-% in water (Aldrich 24,603-4, Lot. S30723-355))
Al(OH)$_3$ (Barcroft 0250)
Ammonia (25 wt.-% in water)
Cu(NO$_3$)$_2$*2.5H$_2$O
Aerosil 200

In a beaker, 1160.60 g of deionized water, 157.2 g of the aqueous TMAA solution and 91.5 g of the aqueous TMBA solution were admixed and stirred.

In a second beaker, 11.09 g of the copper nitrate were dissolved in 105.2 g of the 25 wt.-% aqueous ammonia solution were within about 2 h. Thereby, the solution was stirred.

To the solution of the first beaker, the solution of the second beaker was added while the solution in the first beaker was stirred. After mixing, the obtained solution was stirred for about 20 min. Subsequently, 5.2 of the Al(OH)$_3$ starting material and 94.0 g of the Aerosil were suspended in the solution. The obtained suspension was stirred for 30 min. The liquid gel having a pH of 13.8 had a composition with the following molar ratios: 36 SiO$_2$:1.2 Al(OH)$_3$:2.09 TMAA:5.04 TMBA: 35.6 NH$_3$:1831H$_2$O. This gel was transferred in an autoclave.

1.2 Hydrothermal Crystallization

The autoclave was sealed and heated to a temperature of 160° C. within 1 h. The temperature of 160° C. was maintained for 60 h. Thereby, the mixture in the autoclave was stirred at 200 U/min. The pressure within the autoclave was in the range of from 7 to 8 bar.

1.3 Separation, Drying, and Calcination

After the hydrothermal crystallization, the reaction mixture having a pH of 10.5 was cooled to room temperature. The solid material of the suspension was separated from the mother liquor by filtration and washed with 3000 ml of deionized water. The washed solid was dried for 10 h at 120° C. under air. 107.2 g of dried material was obtained. The dried material was then calcined under air by heating to a temperature of 540° C. at a heating rate of 1° C./min and maintaining this temperature for 5 h. Subsequently, the temperature was raised to 595° C. within 60 min, and this temperature was maintained for another 5 h. 87.0 g of calcined material were obtained.

1.4 Characterization of the Product

Elementary analysis of the calcined material showed 0.02 g of C, 0.02 g of Na, 3.1 g of Cu, 1.4 g of Al and 39.0 g of Si per 100 g of the calcined material.

The BET surface of the calcined material, determined according to DIN 66131, was 527 m$^2$/g, the Langmuir surface area, determined according to DIN 66135, was 705 m$^2$/g. The degree of crystallization was 88%, and the mean length of the crystallites was above 100 nm. FIG. 1 shows the XRD pattern of the calcined material having CHA framework type, and FIG. 2 shows a typical crystallite of the calcined material, determined by SEM.

Example 2

Production of a Cu Containing Zeolitic Material Having CHA Framework

2.1 Synthesis of the Cu Source

To 21.55 l of a 25 wt.-% solution of NH$_3$ in H$_2$O, 2.87 kg of NH$_4$HCO$_3$ were added. Then 8.81 kg of CuCO$_3$ were dissolved in this mixture under NH$_3$ atmosphere during 1 h. At the end, 2.5 l of H$_2$O were added. The solution was filtrated after 12 h. An aqueous solution of [Cu(NH$_3$)$_4$]CO$_3$ complex (15.7 wt % Cu) was obtained.

2.2 Preparation of the Synthesis Gel

In a 60 l autoclave, equipped with an anchor mixer and external cooling/heating means, the following starting materials were admixed:
The aqueous solution of [Cu(NH$_3$)$_4$]CO$_3$ complex according to 2.1
Al(OH)$_3$ (Barcroft, 78.8 wt.-%)
Trimethyl-1-adamantylammonium hydroxide (TMAA, 10.7 wt.-% in water)
Trimethylbenzylammonium hydroxide (TMBA, 10.2 wt.-% in water)
Colloidal Ludox AS40 (NH$_4$$^+$-stabilized, 40 wt.-% suspension in H$_2$O).

The materials were added in the following order:
1. H$_2$O
2. Al(OH)$_3$. After the addition of the Al source, the resulting mixture was stirred for 10 min at room temperature using an anchor mixer.
3. TMAA
4. TMBA. After the addition of the TMBA, the resulting mixture was stirred for 20 min at room temperature using an anchor mixer.
5. [Cu(NH$_3$)$_4$]CO$_3$. After the addition of the Cu source, the resulting mixture was stirred for 10 min at room temperature using an anchor mixer.
6. SiO$_2$ (Ludox). After the addition of the Si source, the resulting mixture was stirred for 1 h at room temperature using an anchor mixer.

The materials were added in amounts to obtain a synthesis gel having the following composition:

| SiO$_2$/mol | Al(OH)$_3$/mol | Cu/mol | NH$_3$/mol | H$_2$O/mol | TMAA/mol | TMBA/mol |
|---|---|---|---|---|---|---|
| 36 | 1.2 | 1.0 | 3.24 | 1,648 | 2.08 | 4.77 |

2.3 Hydrothermal Synthesis

After the preparation of the synthesis gel, the autoclave was sealed. Using the external heating means, the synthesis gel in the autoclave was heated to a temperature of 170° C. with a heating rate of 2° C./min. The reaction mixture in the autoclave was stirred with 150 rpm. After 92 h, crystallization was terminated. During crystallization, 4 samples were taken to control the degree of crystallinity (see below, section 2.5).

2.4 Separation, Drying, Calcination

After crystallization, the samples and the product obtained after 92 h crystallization time were filtered and washed with deionized water until pH 7 (conductivity 90 µS) of the filtrate was reached. Then the product was dried during 24 h at 120° C. under air. For calcination purposes, the dried samples and the dried product, respectively, were heated under air with a heating rate of 2° C./min to a temperature of 350° C., and subsequently to a temperature of 600° C. with a heating rate of 1° C./min. The temperature of 600° C. was maintained for 5 h.

2.5 Characterization of the Product

During crystallization, an increase in the degree of crystallinity was observed. 80% of crystallinity were reached after about 60 h, and for next 32 h, only a slight increase of crystallinity to a final value of about 85% was observed (see FIG. 3).

The overall yield of 100% crystalline Cu chabazite, based on the amount of silica of the synthesis gel, was 73 mol-%, and 2.7 kg product material were obtained. The solid concentration of the reaction mixture before the separation of the solid material from its mother liquor was 6.3 wt.-%. The pH of the reaction mixture after hydrothermal crystallization was 12.

The BET surface of the calcined product, determined according to DIN 66131, was 481 m$^2$/g. The molar ratio of Si:Al of the calcined material was 28 which corresponds to a molar ratio of $SiO_2$:$Al_2O_3$ of 56. The Cu content of the calcined material, calculated as elemental Cu, was 2.6 wt.-%, based on the total weight of the calcined material.

The XRD pattern of the product having CHA framework type (total crystallization time 92 h) is shown in FIG. 4.

Example 3

Production of a Cu Containing Zeolitic Material Having CHA Framework Structure 3.1 Preparation of the Synthesis Gel In a autoclave having a total volume of 60 l and a reaction volume of 40 l, equipped with a mixer and external cooling/heating means, 24,587 g of an aqueous solution of trimethyl-1-adamantylammonium hydroxide (TMAA, 4.5 wt.-% in water) and 2,684.8 g of an aqueous solution of tetramethylammonium hydroxide (TMAOH, 25 wt.-% in water) were mixed. Subsequently, the resulting mixture was stirred and 966.2 g of aluminum triisopropoxide were added. The resulting mixture was stirred for about 30 min. Then, 913.2 g of an aqueous solution of [Cu(NH$_3$)$_4$]CO$_3$ complex (15.7 wt % Cu), prepared according to Example 2 (2.1) were added, and the resulting mixture was stirred for 15 min. Subsequently, 10,892.3 g of Ludox AS40 were added, and the resulting suspension was stirred for about 30 min.

A sample was taken for determining the pH of the suspension. The pH of the suspension was 13.3.

The molar ratios of the synthesis gel were
3.6 TMAOH:2.6 TMAA:2.22 Al isoprop.:1.12 Cu:36 SiO$_2$: 904 H20

3.2 Hydrothermal Synthesis

The autoclave containing the suspension of 3.1 was sealed, and the suspension was heated to a temperature of 160° C. At 160° C., the pressure in the autoclave was 5.9 bar. Then, the suspension was stirred at 160° C. for 12 h at 120 rpm, and after 12 h, the pressure in the autoclave was 7.2 bar. After another 4 h, i.e. after a total crystallization time of 16 h, a first sample (S1) was taken. A second sample (S2) was taken after a total crystallization time of 38 h. Crystallization was terminated after a total crystallization time of 102 h. A sample S3 was taken from the reaction mixture obtained after a total crystallization time of 102 h.

The remaining reaction mixture was filled in a 60 l plastic drum. After homogenization, 5 l portions of the reaction mixture of the plastic drum were subjected to different further processes (see sections 3.6 to 3.8).

3.3 Analysis of Sample S1

The pH of sample S1 was 11.8. 260 g of the milky suspension were filtrated with a porcelain suction filter with a diameter of 25 cm. The filter cake was washed with deionized water, and 293.32 g of the wet cake were filled in a porcelain bowl. The wet product was heated to a temperature of 120° C. in air within 30 min and dried at 120° C. for 240 min. The dried product was then heated to a temperature of 600° C. within 240 min and calcined in air at 600° C. for 300 min. The yield was 31.07 g. A sample of calcined S1 was examined via XRD. It was found that the sample was amorphous (see FIG. 5).

3.4 Analysis of Sample S2

The pH of sample S2 was 11.5. 257.45 g of the milky suspension were filtrated with a porcelain suction filter with a diameter of 25 cm. The filter cake was washed with deionized water, and 112.8 g of the wet cake were filled in a porcelain bowl. The wet product was heated to a temperature of 120° C. in air within 30 min and dried at 120° C. for 240 min. The dried product was then heated to a temperature of 600° C. within 240 min and calcined in air at 600° C. for 300 min. The yield was 27.29 g. A sample of calcined S2 was examined via XRD (see FIG. 6). The XRD pattern showed a crystalline zeolitic material having CHA framework type.

The degree of crystallinity was 51%, the mean length of the crystallites of sample S2, determined via SEM/TEM was above 100 nm.

3.5 Analysis of Sample S3

A sample S3 was taken from the reaction mixture obtained after a total crystallization time of 102 h. The pH of sample S3 was 11.43. 227.9 g of the milky suspension were filtrated with a porcelain suction filter with a diameter if 25 cm. The filter cake was washed with deionized water, and 70 g of the wet cake were filled in a porcelain bowl. The wet product was heated to a temperature of 120° C. in air within 30 min and dried at 120° C. for 240 min. The dried product was then heated to a temperature of 600° C. within 240 min and calcined in air at 600° C. for 300 min. The yield was 26.07 g. A sample of calcined S3 was examined via XRD (see FIG. 7). The XRD pattern showed a crystalline zeolitic material having CHA framework type.

The degree of crystallinity was 85%, the mean length of the crystallites of sample S3, determined via SEM was above 100 nm. Elementary analysis of calcined S3 showed 0.06 g of Na, 2.8 g of Cu, 2.4 g of Al and 39.2 g of Si, in each case per 100 g of calcined S3. The Si:Al ratio of calcined S3 was 15.87.

3.6 Spray-Drying of the Reaction Product "as Such" (Sample S4)

2*5 l=10 l of the reaction mixture of the plastic drum, after homogenization (see section 3.2 above), were spray-dried. The spray-drying apparatus is schematically shown in FIG. 8. The nozzle of the spray-drier was a two-component nozzle with a diameter of 1.5 mm. The nozzle pressure was 3 bar abs. As drying gas, nitrogen was used with a flow rate of 30 Nm$^3$/h. The temperature of the drying as was 299° C. As atomizing gas, nitrogen was used with a flow rate of 4 Nm$^3$/h. The temperature of the atomizing gas was ambient temperature. The temperature of the conus of the spray-drier was in the range of from 160-175° C., the temperature of the cyclone in the range of from 135-145° C.

In total, 923 g of spray-dried material were obtained, having a moisture level of 5.31%.

555.42 g of the spray-dried material were filled in a porcelain bowl. The material was heated to a temperature of 120° C. in air within 30 min and dried at 120° C. for 240 min. The dried product was then heated to a temperature of 600° C. within 240 min and calcined in air at 600° C. for 300 min. 425.0 g of calcined material S4 were obtained.

A sample of calcined S4 was examined via XRD (see FIG. 9). The XRD pattern showed a crystalline zeolitic material having CHA framework type.

The degree of crystallinity was 88%, the mean length of the crystallites of sample S4, determined via SEM was above 100 nm (see FIGS. 10-13).

Elementary analysis of calcined S4 showed 0.014 g of C, less than 0.01 g of N, 0.17 g of Na, 2.7 g of Cu, 2.3 g of Al and 39.5 g of Si, in each case per 100 g of calcined S4.

The BET surface of calcined S4, determined according to DIN 66131, was 492 m$^2$/g, the Langmuir surface, determined according DIN 66135, was 652 m$^2$/g.

The thermal behavior of calcined S4 was determined via TGA-IR in Ar atmosphere. The following results were obtained (Delta m=mass difference):

| sample | Delta m | Delta m | Delta m |
|---|---|---|---|
| S4 | −3.5% 40° C.-370° C. endoth. peak: 157° C. H$_2$O | −0.3% 370° C.-600° C. | −0.9% 600° C.-1350° C. exoth. peak: 1177° C. |

3.7 Spray-Drying of the Neutral Reaction Product (Sample S5)

2 kg of the reaction mixture in the plastic drum, after homogenization (see section 3.2 above), were admixed with 2 kg of deionized water. With 496 g of 10 wt.-% aqueous HNO$_3$, the pH of the suspension was adjusted to a value of 7, and the suspension was subjected to filtration. The filter cake was admixed again with deionized water, and the pH of the resulting suspension was adjusted to a value of 7 with 10 wt.-% aqueous HNO$_3$. Subsequently, the suspension was filtrated, and the filter cake was treated once again in the same manner. Then, the solid was washed with deionized water (15 l) until the conductivity of the filtrate was 120 μS (Microsiemens).

Subsequently, the solid was slurried with deionized water, and the slurry was spray-dried. The spray-drying apparatus is schematically shown in FIG. 8. The nozzle of the spray-drier was a two-component nozzle with a diameter of 1.5 mm. The nozzle pressure was 3 bar abs. As drying gas, nitrogen was used with a flow rate of 30 Nm$^3$/h. The temperature of the drying as was 299° C. As atomizing gas, nitrogen was used with a flow rate of 4 Nm$^3$/h. The temperature of the atomizing gas was ambient temperature. The temperature of the conus of the spray-drier was in the range of from 165-175° C., the temperature of the cyclone in the range of from 130-140° C.

In total, 541 g of spray-dried material S5 were obtained, having a moisture level of about 1%.

540 g of the spray-dried material were filled in a porcelain bowl. The material was heated to a temperature of 120° C. in air within 30 min and dried at 120° C. for 240 min. The dried product was then heated to a temperature of 600° C. within 240 min and calcined in air at 600° C. for 300 min. 435.5 g of calcined material S5 were obtained.

A sample of calcined S5 was examined via XRD (see FIG. 14). The XRD pattern showed a crystalline zeolitic material having CHA framework type.

The degree of crystallinity was 86%, the mean length of the crystallites of sample S5, determined via SEM was above 100 nm (see FIGS. 15-18).

Elementary analysis of calcined S5 showed 0.018 g of C, less than 0.01 g of N, 0.05 g of Na, 2.7 g of Cu, 2.4 g of Al and 40.0 g of Si, in each case per 100 g of calcined S5.

The BET surface of calcined S5, determined according to DIN 66131, was 492 m$^2$/g, the Langmuir surface, determined according DIN 66135, was 651 m$^2$/g.

The thermal behavior of calcined S5 was determined via TGA-IR in Ar atmosphere. The following results were obtained (Delta m=mass difference):

| sample | Delta m | Delta m | Delta m |
|---|---|---|---|
| S5 | −2.6% 40° C.-335° C. endoth. peak: 171° C. | −0.4% 335° C.-600° C. | −0.9% 600° C.-1350° C. exoth. peak: 1195° C. |

3.8 Spray-Drying of the Reaction Product (Sample S6)

2 kg of the reaction mixture in the plastic drum, after homogenization (see section 3.2 above), were subjected to filtration. Subsequently, the obtained solid was slurried with deionized water, and the slurry was spray-dried. The spray-drying apparatus is schematically shown in FIG. 8. The nozzle of the spray-drier was a two-component nozzle with a diameter of 1.5 mm. The nozzle pressure was 3 bar abs. As drying gas, nitrogen was used with a flow rate of 30 Nm$^3$/h. The temperature of the drying as was 299° C. As atomizing gas, nitrogen was used with a flow rate of 4 Nm$^3$/h. The temperature of the atomizing gas was ambient temperature. The temperature of the conus of the spray-drier was in the range of from 165-175° C., the temperature of the cyclone in the range of from 135-150° C.

In total, 541 g of spray-dried material S6 were obtained, having a moisture level of about 1.52%.

480 g of the spray-dried material S6 were filled in a porcelain bowl. The material was heated to a temperature of 120° C. in air within 30 min and dried at 120° C. for 240 min. The dried product was then heated to a temperature of 600° C. within 240 min and calcined in air at 600° C. for 300 min. 377.5 g of calcined material S6 were obtained.

Elementary analysis of calcined S6 showed 0.021 g of C, less than 0.01 g of N, 0.09 g of Na, 2.6 g of Cu, 2.4 g of Al and 41.0 g of Si, in each case per 100 g of calcined S6.

Example 4

SCR Test of Sample S5 According Example 3

4.1 Preparation of a Slurry 90 g of the spray-dried and calcined zeolitic material containing Cu and having CHA framework structure, obtained according to example 3 (sample 5) were mixed with 215 ml of deionized water. The mixture was ball-milled for 11 hours to obtain a slurry which comprised 90% particles smaller than 10 micrometer. 15.8 g of zirconium acetate in dilute acetic acid were added to the slurry with agitation. In the finally calcined honeycomb, ZrO$_2$ is then formed, acting as binder material for the adhesion of particles to the honeycomb.

4.2 Coating

The slurry was coated onto 1"D×3"L cellular ceramic cores having a cell density of 400 cpsi (cells per square inch=cells per (2.54 cm)$^2$) and a wall thickness of 6.5 mm. The coated cores were dried at 110° C. for 3 hours and calcined at 400° C. for 1 hour. The coating process was repeated once to obtain a target washcoat loading of 2.4 g/in$^3$ (2.4 g/(2.54 cm)$^3$). The washcoat loading is defined as the dry weight gain on the honeycomb with respect to the volume.

4.3 Measuring NOx Selective Catalytic Reduction (SCR) Efficiency

Nitrogen oxides selective catalytic reduction (SCR) efficiency and selectivity of a fresh catalyst core were measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried at a space velocity of 80,000 $h^{-1}$ across a 150° C. to 460° C. temperature range. Space velocity is defined as the gas flow rate comprising the entire reaction mixture divided by the geometric volume of the catalyst core. These conditions define the standard test for fresh catalysts.

FIG. 19 shows the results of the SCR test, indicating the catalytic efficiency and selectivity of the fresh catalyst. Generally, there is a desire to provide materials which exhibit high performance over a wide temperature range, particularly with improvement of low temperature performance. Performance includes NOx conversion but, also selectivity of the SCR to $N_2$ reflected by minimizing the formation of $N_2O$. It can be seen that this catalyst according to the invention exhibits high NOx conversion across the entire temperature window together with low $N_2O$ make (<10 ppm $N_2O$).

4.4 Measuring Hydrothermal Stability of the Catalyst

Hydrothermal stability of the catalyst was measured by hydrothermal aging of the fresh catalyst core described above under section 4.2 in the presence of 10 wt.-% $H_2O$ at 850° C. for 6 hours, followed by measurement of the nitrogen oxides SCR efficiency and selectivity by the same process, as outlined above under section 4.3, for the SCR evaluation on a fresh catalyst core.

The results of the SCR efficiency and selectivity of the aged catalyst is depicted in FIG. 20. Generally, there is a desire to improve hydrothermal stability over existing zeolitic materials, for example, catalyst materials which are stable at temperatures up to at least about 650° C. and higher, for example in the range of about 700° C. to about 800° C. It can be seen that this catalyst according to the invention maintains high NOx conversion over the entire temperature window whilst maintaining high selectivity towards nitrogen which is reflected in the low $N_2O$ make (<20 ppm $N_2O$).

Example 5

Production of a Cu Containing Zeolitic Material Having CHA Framework Structure, Additionally Containing La 5.1 Preparation of the Synthesis Gel The following starting materials were employed:
Deionized water
Trimethyl-1-adamantylammonium hydroxide (TMAA, 13.4 wt.-% in water, Sachen Lot. A7089OX16007)
Tetramethylammonium hydroxide (TMAOH, 25 wt.-% in water (Aldrich 331633, Lot. A337872))
Aluminum triisopropylate (Aldrich 22,041-8, Lot. S42369-457)
[$Cu(NH_3)_4$]$CO_3$ complex (15.7 wt % Cu), prepared according to Example 2 (2.1)
$La(NO_3)_3 \times 6 H_2O$
Ludox AS40

In a beaker, 612.15 g of deionized water and 309.29 g of the aqueous TMAA solution were admixed. Subsequently, 99 g of the aqueous TMAOH solution were admixed and stirred for 10 min at room temperature. Subsequently, 0.92 g $La(NO_3)_3 \times 6 H_2O$ were added while the mixture was stirred. Then, 34.7 g of Aluminum triisopropylate were added, and the resulting suspension was stirred for about 60 min. Subsequently, 36.2 g of the [$Cu(NH_3)_4$]$CO_3$ solution were added and stirred for about 10 min. Subsequently, 408.3 g Ludox AS40 were added, and the resulting suspension was stirred for about 20 min.

The pH of the obtained suspension was 13.3.

The suspension had a composition with the following molar ratios: 36 $SiO_2$:2.25 Al isprop.:2.6 TMAA:3.6 TMAOH:1.12 Cu amine:455$H_2O$:0.028 $La(NO_3)_3 \times 6 H_2O$. This gel was transferred in an autoclave.

5.2 Hydrothermal Crystallization

The autoclave was sealed and heated to a temperature of 160° C. The temperature of 160° C. was maintained for 12 h. Thereby, the mixture in the autoclave was stirred at 200 rpm (revolutions/minute). The pressure within the autoclave was 7 bar at the beginning, and 7.2 bar after 12 h. Then, heating of the autoclave was stopped, the autoclave was cooled to 50° C., and the reaction mixture was stirred for 30 min. Subsequently, the autoclave was heated to 160° C., and stirred for 90 h while the temperature was maintained at 160° C.

5.3 Separation, Drying, and Calcination

After the hydrothermal crystallization, the resulting suspension had a pH of 11.57. This suspension was admixed (1:1) with deionized water, and the pH of the resulting suspension was adjusted to 7.47 with 650 g of 5% $HNO_3$. Then, the suspension was filtrated with a porcelain suction filter with a diameter of 15 cm. The filter cake was washed with deionized water, and 380 g of the wet cake were filled in a porcelain bowl. The wet product was heated to a temperature of 120° C. in air within 30 min and dried at 120° C. for 240 min. The dried product was then heated to a temperature of 600° C. within 240 min and calcined in air at 600° C. for 300 min. The yield was 179.99 g. A sample of the calcined material was examined via XRD, and it was found that a zeolite having CHA framework had been obtained (see FIG. 21).

5.4 Characterization of the Product

Elementary analysis of calcined material obtained according to 5.3 showed 0.015 g of C, less than 0.5 g of N, 0.06 g of Na, 2.6 g of Cu, 2.2 g of Al and 38.0 g of Si, in each case per 100 g of calcined material.

The BET surface of the calcined material, determined according to DIN 66131, was 488 $m^2/g$, the Langmuir surface area, determined according to DIN 66135, was 675.5 $m^2/g$. The degree of crystallization was 92%, and the mean length of the crystallites was above 100 nm. Typical crystallites had a mean length of about 3-4 micrometers (see FIGS. 22-24).

The thermal behavior of calcined material was determined via TG/DTA/IR. The following results were obtained (Delta m=mass difference):

| sample | Delta m | Delta m |
|---|---|---|
| calcined material of Example 5 (FTIR analysis) | −3.8% (30° C.-713° C.) endoth. peak 187.2° C. $H_2O$, traces of $CO_2$ | −0.8% (713° C.-1350° C.) exoth. peaks 1182.7° C. and 1302.1° C. $CO_2$, traces of $H_2O$ und CO |

It was found that the material had a decomposition temperature of about 1182.7° C. and a recrystallization temperature of about 1302.1° C. It can be noted that the presence of La has resulted in an increase in the decomposition temperature when compared to Example 3.6

Example 6

Production of a Cu Containing Zeolitic Material Having CHA Framework Structure 6.1 Preparation of the Synthesis Gel
  The following starting materials were employed:
  Trimethyl-1-adamantylammonium hydroxide (TMAA, 13.4 wt.-% in water, Sachen Lot. A7089OX16007)
  Tetramethylammonium hydroxide (TMAOH, 25 wt.-% in water (Aldrich 331633, Lot. A337872))
  Aluminum triisopropylate (Aldrich 22,041-8, Lot. S42369-457)
  $[Cu(NH_3)_4]CO_3$ complex (15.7 wt % Cu), prepared according to Example 2 (2.1)
  Ludox AS40

In a beaker, 222.8 g of TMAA and 696.7 g of TMAOH solution were mixed. This solution was stirred for 10 min at room temperature. Then, 94.1 g of Aluminum triisopropylate were added, and the resulting suspension was stirred for about 60 min. Subsequently, 67.4 g of the $[Cu(NH_3)_4]CO_3$ solution were added and stirred for about 10 min. Subsequently, 918.9 g Ludox AS40 were added, and the resulting suspension was stirred for about 20 min.

The pH of the obtained suspension was 13.6.

The suspension had a composition with the following molar ratios: 36 $SiO_2$:2.7 Al isprop.:2.6 TMAA:3.6 TMAOH: 0.096 Cu amine:450 $H_2O$. This gel was transferred in an autoclave.

6.2 Hydrothermal Crystallization
  The autoclave was sealed and heated to a temperature of 170° C. The temperature of 170° C. was maintained for 120 h. Thereby, the mixture in the autoclave was stirred at 200 rpm (revolutions/minute).

6.3 Separation, Drying, and Calcination
  After the hydrothermal crystallization, the resulting suspension had a pH of 11.26. This suspension was admixed (1:1) with deionized water, and the pH of the resulting suspension was adjusted to 7.47 with about 650 g of 5% $HNO_3$. Then, the suspension was filtrated with a porcelain suction filter with a diameter of 15 cm. The wet product was heated to a temperature of 120° C. in air within 30 min and dried at 120° C. for 240 min. The dried product was then heated to a temperature of 600° C. within 240 min and calcined in air at 600° C. for 300 min. The yield was 403.5 g. A sample of the calcined material was examined via XRD, and it was found that a zeolite having CHA framework had been obtained (see FIG. 25).

6.4 Characterization of the Product
  Elementary analysis of calcined material obtained according to 5.3 showed 0.026 g of C, less than 0.5 g of N, 0.038 g of Na, 2.2 g of Cu, 2.9 g of Al and 39.0 g of Si, in each case per 100 g of calcined material.

The BET surface of the calcined material, determined according to DIN 66131, was 459.7 $m^2/g$, the Langmuir surface area, determined according to DIN 66135, was 638.5 $m^2/g$. The degree of crystallization was 92%, and the mean length of the crystallites was above 100 nm. Typical crystallites had a mean length of about 2-5 micrometers (see FIGS. 26-28).

The thermal behavior of calcined material was determined via TG/DTA/IR. The following results were obtained (Delta m=mass difference):

| sample | Delta m | Delta m |
|---|---|---|
| calcined material of Example 6 (FTIR analysis) | −5.3% (30° C.-578° C.) $H_2O$, traces of $CO_2$ | −1.2% (578° C.-1375° C.) exoth. peaks 1188.5° C. and 1329.3° C. $CO_2$, traces of $H_2O$, NH3 and CO |

It was found that the material had a decomposition temperature of about 1188.5° C. and a recrystallization temperature of about 1329.3° C.

Example 7

SCR Test of Sample According Example 6

7.1 Preparation of a Slurry
  150 g of the spray-dried and calcined zeolitic material containing Cu and having CHA framework structure, obtained according to example 6 was mixed with 358 ml of deionized water. The mixture was ball-milled for 11 hours to obtain a slurry which comprised 90% particles smaller than 10 micrometer. 26 g of zirconium acetate in dilute acetic acid (containing 30% $ZrO2$) were added to the slurry with agitation.

7.2 Coating
  The slurry was coated onto 1"D×3"L cellular ceramic cores having a cell density of 65 cpsc (cells per square cm) (400 cpsi (cells per square inch)) and a wall thickness of 6.5 mm. The coated cores were dried at 110° C. for 3 hours and calcined at 400° C. for 1 hour. The coating process was repeated once to obtain a target washcoat loading of 0.146 $g/cm^3$ (2.4 $g/in^3$). The washcoat loading is defined as the dry weight gain on the honeycomb with respect to volume.

7.3 Measuring NOx Selective Catalytic Reduction (SCR) Efficiency
  Nitrogen oxides selective catalytic reduction (SCR) efficiency and selectivity of a fresh catalyst core were measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried at a space velocity of 80,000 $h^{-1}$ across a 150° C. to 460° C. temperature range. Space velocity is defined as the gas flow rate comprising the entire reaction mixture divided by the geometric volume of the catalyst core. These conditions define the standard test for fresh catalysts.

FIG. 29 shows the results of the SCR test, indicating the catalytic efficiency and selectivity of the fresh catalyst. Generally, there is a desire to provide materials which exhibit high performance over a wide temperature range, particularly with improvement of low temperature performance. Performance includes NOx conversion but, also selectivity of the SCR to $N_2$ reflected by minimizing the formation of $N_2O$. It can be seen that this catalysts exhibits high NOx conversion across the entire temperature window together with low $N_2O$ make (<10 ppm $N_2O$).

7.4 Measuring Hydrothermal Stability of the Catalyst
  Hydrothermal stability of the catalyst was measured by hydrothermal aging of the fresh catalyst core described above under section 4.2 in the presence of 10 wt.-% H₂O at 850° C. for 6 hours, followed by measurement of the nitrogen oxides SCR efficiency and selectivity by the same process, as outlined above under section 4.3, for the SCR evaluation on a fresh catalyst core.

The results of the SCR efficiency and selectivity of the aged catalyst is depicted in FIG. 30. Generally, there is a desire to improve hydrothermal durability over existing zeolitic materials, for example, catalyst materials which are stable at temperatures up to at least about 650° C. and higher, for example in the range of about 700° C. to about 900° C. It can be seen that this catalyst maintains high NOx conversion over the entire temperature window whilst maintaining high selectivity towards nitrogen which is reflected in the low $N_2O$ make (<20 ppm $N_2O$).

CE 1 (Example According to Prior Art)

Production of a Cu Containing Zeolitic Material Having CHA Framework Structure Via Ion Exchange CE 1.1 Preparation of a Powder Zeolitic Material Having CHA Framework Structure The following starting materials were employed:
Deionized water
Trimethyl-1-adamantylammonium hydroxide (TMAA, 13.4 wt.-% in water, Sachen Lot. A7089OX16007)
Aluminum triisopropoxide (Aldrich 22,041-8, Lot. S42369-457)
Ludox AS40
Sodium hydroxide (50% solution)

38.95 kg of adamantyl solution were added to the autoclave. Subsequently, 2.65 kg sodium hydroxide solution were added with agitation. Mixing was carried out until the solution was clear (about 30 minutes). Then, 4.26 kg aluminum triisopropoxide (ATIP) were added within 5-15 minutes. Mixing was continued until the solids were reacted and the solution was a uniform suspension (about 2 hours). Then, 50 kg Ludox AS-40 were added with stirring.

The suspension had a composition with the following molar ratios: 36 $SiO_2$:1.1 $Al_2O_3$:2.6 TMAA:1.8 $Na_2O$: 377$H_2O$.

CE 1.2 Hydrothermal Crystallization

The autoclave was sealed and heated to a temperature of 170° C. The temperature of 170° C. was maintained for 20 hours. Thereby, the mixture in the autoclave was stirred at 200 rpm (revolutions/minute). The pressure within the autoclave was 7.8 bar. The pH was 13.4 at the beginning of the reaction. After 20 hours, heating of the autoclave was stopped and the autoclave was cooled to 35° C.

CE 1.3 Separation, Drying, and Calcination

After the hydrothermal crystallization, the resulting suspension had a pH of 11.9. Per 1000 kg of reactor content 168 kg of diluted acid were added. About 80% of the calculated total amount of premixed nitric acid (10 wt.-% aqueous solution) was fed into the reactor under agitation. About 20% were slowly added in smaller portions until pH reached about 7-7.5. The entire composition was fed to the filtration device.

The suspension was filtrated with a filter press. The filter cake was washed with deionized water to a conductivity of 200 microSiemens/cm. The wet product was heated to a temperature of 120° C. in air within 30 min and dried at 120° C. for 240 min. The dried product was then heated to a temperature of 600° C. within 240 min and calcined in air at 600° C. for 300 min. A sample of the calcined material was examined via XRD, and it was found that a zeolite having CHA framework had been obtained.

CE 1.4 Ammonium Exchange

The ammonium form was produced via ion-exchange of CE 1.3. An ammonium nitrate solution was prepared by mixing 55.6 g of 54 wt.-% ammonium nitrate with 530 g of deionized water at 80° C. 300 g of the zeolitic material of CE 1.3 was then added to this solution. The ion-exchange reaction between the Na/H-form of the zeolitic material and the ammonium ions was carried out by agitating the slurry at 60° C. for 1 hour. The pH was between 2.7 and 2.4 during the reaction. The resulting mixture was then filtered, washed until the filtrate had a conductivity of <200 microSiemens/cm before the washed sample was air dried.

CE 1.5 Copper Exchange

A copper (II) acetate monohydrate solution was prepared by dissolving 89.8 g of copper acetate salt in 1.125 l of deionized water at 70° C. 300 g of the zeolitic material of CE 1.4 was then added to this solution. An ion-exchange reaction between the $NH_4^+$-form of the zeolitic material and the copper ions was carried out by agitating the slurry at 70° C. for 1.5 hours. The pH was between 4.8 and 4.5 during the reaction. The resulting mixture was then filtered, washed until the filtrate had a conductivity of <200 microSiemens/cm, which indicated that substantially no soluble or free copper remained in the sample, and the washed sample was dried at 90° C. The obtained Cu containing material comprised Cu at 2.4% by weight and Na at 104 ppm. The $SiO_2$:$Al_2O_3$ was 30:1.

CE 1.6 SCR Test of the Material of CE 1.5

CE 1.6.1 Preparation of a Slurry 197 g of the zeolitic material containing Cu and having CHA framework structure, obtained according to CE 1.5 was mixed with 280.4 ml of deionized water. The mixture was ball-milled for 20 minutes to obtain a slurry which comprised 90% particles smaller than 10 micrometer. 27.38 g of zirconium acetate in dilute acetic acid (containing 30% $ZrO_2$) were added to the slurry with agitation.

CE 1.6.2 Coating

The slurry was coated onto 1"D×3"L cellular ceramic cores having a cell density of 65 cpsc (cells per square cm) (400 cpsi (cells per square inch)) and a wall thickness of 6.5 mm. The coated cores were dried at 110° C. for 3 hours and calcined at 400° C. for 1 hour. The coating process was repeated once to obtain a target washcoat loading of 0.146 g/cm³ (2.4 g/in³). The washcoat loading is defined as the dry weight gain on the honeycomb with respect to volume.

CE 1.6.3 Measuring NOx Selective Catalytic Reduction (SCR) Efficiency

Nitrogen oxides selective catalytic reduction (SCR) efficiency and selectivity of a fresh catalyst core were measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried out at a space velocity of 80,000 h⁻¹ across a 150° C. to 460° C. temperature range. Space velocity is defined as the gas flow rate comprising the entire reaction mixture divided by the geometric volume of the catalyst core. These conditions define the standard test for fresh catalysts.

The results of the SCR efficiency and selectivity of the fresh catalyst is depicted in FIG. 31.

CE 1.6.4 Measuring Hydrothermal Stability of the Catalyst

Hydrothermal stability of the catalyst was measured by hydrothermal aging of the fresh catalyst core described above under section 4.2 in the presence of 10 wt.-% $H_2O$ at 850° C. for 6 hours, followed by measurement of the nitrogen oxides SCR efficiency and selectivity by the same process, as outlined above under section 4.3, for the SCR evaluation on a fresh catalyst core.

The results of the SCR efficiency and selectivity of the aged catalyst is depicted in FIG. 32.

Example 8

Production of a Cu Containing Zeolitic Material Having CHA Framework Structure 8.1 Preparation of the Synthesis Gel The following starting materials were employed:
Trimethyl-1-adamantylammonium hydroxide (TMAA, 13.4 wt.-% in water, Sachen Lot. A7089OX16007)
Tetramethylammonium hydroxide (TMAOH, 25 wt.-% in water (Aldrich 331633, Lot. A337872))
Aluminum triisopropylate (Aldrich 22,041-8, Lot. S42369-457)
$[Cu(NH_3)_4]CO_3$ complex (14.5 wt % Cu), prepared according to Example 2 (2.1)
Ludox AS-40
seeds of a one-pot CuCHA In a 1600 liter autoclave, 190.9 kg of TMAA and 59.7 kg of TMAOH solution were mixed. This solution was stirred for 10 min at room temperature. Then, 25.2 kg of aluminum triisopropylate were added, and the resulting suspension was stirred for about 60 min. Subsequently, 19.1 kg of the [Cu (NH$_3$)$_4$]CO$_3$ solution were added and stirred for about 10 min. Subsequently, 246.2 kg Ludox AS-40 were added, and the resulting suspension was stirred for about 20 min.

The pH of the obtained suspension was 13.5.

The suspension had a composition with the following molar ratios: 36 $SiO_2$:2.7 Al isprop.:2.6 TMAA:3.6 TMAOH: 0.96 Cu amine:450 $H_2O$. Then, 5 kg of 79% crystalline CuChabazite were added as seeds in the spray dried form.

8.2 Hydrothermal Crystallization

The autoclave was sealed and heated to a temperature of 170° C. The temperature of 170° C. was maintained for 96 h. Thereby, the mixture in the 1600 liter autoclave was stirred at 49 rpm (revolutions/minute). In-situ samples were taken after 48, 72 and 96 hours.

8.3 Separation, Drying, and Calcination

After the hydrothermal crystallization, the resulting suspension had a pH of 11.4. This suspension was admixed (1:1) with deionized water, and the pH of the resulting suspension was adjusted to 7.5 with 5% $HNO_3$. Then, the suspension was filtrated with a 400 liter porcelain suction filter with a diameter of 80 cm. The wet product was then spray dried (cylcon temperature was 130° C. and drying gases temperature was 300° C.). The dried product was then calcined in a rotary kiln at a temperature of 600° C. to remove the template and ensure a C content less than 0.1 wt %. A sample of the calcined material was examined via XRD, and it was found that a zeolite having CHA framework had been obtained (see FIG. 33).

8.4 Characterization of the Product

Elementary analysis of the calcined material obtained according to 8.3 showed less than 0.1 g of C, less than 0.5 g of N, 0.05 g of Na, 1.8 g of Cu, 2.4 g of Al and 32.0 g of Si, in each case per 100 g of calcined material. This correlates to a $SiO_2$:$Al_2O_3$ ratio of 25.6.

The BET surface of the calcined material, determined according to DIN 66131, and the Langmuir surface area, determined according to DIN 66135, are listed in the table hereinunder with details of the crystallization. Typical crystallites had a mean length of about 1.5-3 micrometers (see FIGS. 34-36).

| Crystallization Time/h | Gel OH/Si | XRD/% | Langmuir Surface Area/(m$^2$/g) | BET Surface/ (m$^2$/g) |
|---|---|---|---|---|
| 48 | 0.172 | 79 | 680.5 | 502.3 |
| 72 | 0.172 | 82 | 660.8 | 492.0 |
| 96 | 0.172 | 80 | 663.6 | 494.1 |

The characterization of the products with crystallization time indicate that the crystallization is complete after at most 48 hours. It is conceived that shorter crystallization times may be possible.

Example 9

SCR Test of Sample According Example 8

9.1 Preparation of a Slurry 150 g of the spray-dried and calcined zeolitic material containing Cu and having CHA framework structure, obtained according to example 8 was mixed with 358 ml of deionized water. The mixture was ball-milled for 11 hours to obtain a slurry which comprised 90% particles smaller than 10 micrometer. 26 g of zirconium acetate in dilute acetic acid (containing 30% $ZrO_2$) were added to the slurry with agitation 9.2 Coating The slurry was coated onto 1"D×3"L cellular ceramic cores having a cell density of 65 cpsc (cells per square cm) (400 cpsi (cells per square inch)) and a wall thickness of 6.5 mm. The coated cores were dried at 110° C. for 3 hours and calcined at 400° C. for 1 hour. The coating process was repeated once to obtain a target washcoat loading of 0.146 g/cm$^3$ (2.4 g/in$^3$). The washcoat loading is defined as the dry weight gain on the honeycomb with respect to volume.

9.3 Measuring NOx Selective Catalytic Reduction (SCR) Efficiency

Nitrogen oxides selective catalytic reduction (SCR) efficiency and selectivity of a fresh catalyst core were measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried at a space velocity of 80,000 h$^{-1}$ across a 150° to 460° C. temperature range. Space velocity is defined as the gas flow rate comprising the entire reaction mixture divided by the geometric volume of the catalyst core. These conditions define the standard test for fresh catalysts.

FIG. 37 shows the results of the SCR test, indicating the catalytic efficiency and selectivity of the fresh catalyst. Generally, there is a desire to provide materials that exhibit high performance over a wide temperature range, particularly with improvement of low temperature performance. Performance includes NOx conversion but also selectivity of the SCR to $N_2$ reflected by minimizing the formation of $N_2O$. It can be seen that this catalysts exhibits high NOx conversion across the entire temperature window together with low $N_2O$ make (<10 ppm $N_2O$). These performance characteristics are a large improvement over current commercial catalysts such as FeBeta using the same testing conditions.

9.4 Measuring Hydrothermal Stability of the Catalyst

Hydrothermal stability of the catalyst was measured by hydrothermal aging of the fresh catalyst core described above under section 9.2 in the presence of 10 wt.-% $H_2O$ at 850° C. for 6 hours, followed by measurement of the nitrogen oxides SCR efficiency and selectivity by the same process, as outlined above under section 9.3, for the SCR evaluation on a fresh catalyst core.

The results of the SCR efficiency and selectivity of the aged catalyst is depicted in FIG. 38. There is a desire to improve hydrothermal durability over existing zeolitic materials, for example, catalyst materials which are stable at temperatures up to at least about 650° C. and higher, for example in the range of about 700° C. to about 900° C. It can be seen that this catalyst maintains high NOx conversion over the entire temperature window whilst maintaining high selectivity towards nitrogen which is reflected in the low $N_2O$ make (<20 ppm $N_2O$).

Example 10

Production of a Cu Containing Zeolitic Material Having CHA Framework Structure 10.1 Preparation of the Synthesis Gel The following starting materials were employed:
Trimethyl-1-adamantylammonium hydroxide (TMAA, 13.4 wt.-% in water, Sachen Lot. A7089OX16007)
Tetramethylammonium hydroxide (TMAOH, 25 wt.-% in water (Aldrich 331633, Lot. A337872))
Aluminum triisopropylate (Aldrich 22,041-8, Lot. S42369-457)
[Cu(NH$_3$)$_4$]CO$_3$ complex (14.5 wt % Cu), prepared according to Example 2 (2.1)
Ludox AS40
seeds of a one-pot CuCHA In a beaker, 718.6 g of TMAA and 188.8 g of TMAOH solution were mixed. This solution was stirred for 10 min at room temperature. Then, 94.8 g of aluminum triisopropylate were added, and the resulting suspension was stirred for about 60 min. Subsequently, 71.7 g of the [Cu(NH$_3$)$_4$]CO$_3$ solution were added and stirred for about 10 min. Subsequently, 926.1 g Ludox AS40 were added, and the resulting suspension was stirred for about 20 min.

The pH of the obtained suspension was 14.1.

The suspension had a composition with the following molar ratios: 36 SiO$_2$:2.7 Al isprop.:2.6 TMAA:3.0 TMAOH: 0.96 Cu amine:448H$_2$O. This gel was transferred in a 2.5 L autoclave. Then 20 g of 79% crystalline CuChabazite were added as seeds in the spray dried form.

10.2 Hydrothermal Crystallization

The autoclave was sealed and heated to a temperature of 160° C. The temperature of 160° C. was maintained for 48 h. Thereby, the mixture in the autoclave was stirred at 200 rpm (revolutions/minute).

10.3 Separation, Drying, and Calcination

After the hydrothermal crystallization, the resulting suspension had a pH of 11.6. This suspension was admixed (1:1) with deionized water, and the pH of the resulting suspension was adjusted to 7.5 with 5% HNO$_3$. Then, the suspension was filtrated with a porcelain suction filter with a diameter of 15 cm. The wet product was heated to a temperature of 120° C. in air within 30 min and dried at 120° C. for 240 min. The dried product was then heated to a temperature of 600° C. within 240 min and calcined in air at 600° C. for 300 min. The yield was 406 g. A sample of the calcined material was examined via XRD, and it was found that a zeolite having CHA framework had been obtained (see FIG. 39). Crystallinity was reported as 90%.

10.4 Characterization of the Product

Elementary analysis of calcined material obtained according to Example 10.3 showed 0.026 g of C, less than 0.5 g of N, 0.06 g of Na, 2.4 g of Cu, 3 g of Al and 39.0 g of Si, in each case per 100 g of calcined material.

The BET surface of the calcined material was 521.9 m$^2$/g, determined according to DIN 66131, and the Langmuir surface area was 700.3 m$^2$/g, determined according to DIN 66135. Typical crystallites had a mean length of about 1.5-3 micrometers (see FIGS. 40-42).

CE 2 (Example According to Prior Art)

Production of a Cu Containing Zeolitic Material Having CHA Framework Structure Via Ion Exchange CE 2.1 Preparation of the Synthesis Gel The following starting materials were employed:
Trimethyl-1-adamantylammonium hydroxide (TMAA, 13.4 wt.-% in water, Sachen Lot. A7089OX16007)
Sodium hydroxide (NaOH pellets, >99% Riedel-de Haen)
Aluminum triisopropylate (Aldrich 22,041-8, Lot. S42369-457)
Ludox AS40

In a 3 L plastic beaker, 805.6 g of TMAA and 28.1 g of NaOH were mixed. This solution was stirred for 10 min at room temperature. Then, 114.7 g of Aluminum triisopropylate were added, and the resulting suspension was stirred for about 60 min. Subsequently, 1051.6 g Ludox AS40 were added, and the resulting suspension was stirred for about 20 min.

The pH of the obtained suspension was 13.5.

The suspension had a composition with the following molar ratios: 36 SiO$_2$:2.8 Al isprop.:2.6 TMAA:3.6 NaOH: 379H$_2$O. This gel was transferred in to a 2.5 liter autoclave.

CE 2.2 Hydrothermal Crystallization

The autoclave was sealed and heated to a temperature of 170° C. The temperature of 170° C. was maintained for 40 h. Thereby, the mixture in a 2.5 L autoclave was stirred at 200 rpm (revolutions/minute).

CE 2.3 Separation, Drying, and Calcination

After the hydrothermal crystallization, the resulting suspension had a pH of 11.95. This suspension was admixed (1:1) with deionized water, and the pH of the resulting suspension was adjusted to 7.5 with 5% HNO$_3$. Then, the suspension was filtrated with a porcelain suction filter with a diameter of 15 cm. The wet product was then spray dried (cyclon temperature was 130° C. and drying gases temperature was 300° C.). The dried product was then calcined in a rotary kiln at a temperature of 600° C. to remove the template and ensure a C content less than 0.1 wt %. A sample of the calcined material was examined via XRD, and it was found that a zeolite having CHA framework had been obtained (see FIG. 43).

CE 2.4 Characterization of the Product

Elementary analysis of calcined material obtained according to CE 2.3 showed 0.068 g of C, less than 0.5 g of N, less than 0.78 g of Na, 2.9 g of Al and 38.0 g of Si, in each case per 100 g of calcined material. This correlates to a $SiO_2:Al_2O_3$ ratio of 25.2.

CE 2.5 Ammonium Exchange of Na-Form

A $NH_4$-chabazite powder catalyst was prepared by ion-exchange with ammonium nitrate. An ammonium nitrate solution was prepared by mixing 22.5 g of the ammonium nitrate with 2.25 L of deionized water at 60° C. 450 g of Na-form chabazite from CE 2.3 was then added to this solution. An ion-exchange reaction between the $Na^+$-form chabazite and the ammonium ions was carried out by agitating the slurry at 60° C. for 1 hour. The resulting mixture was then filtered, washed until the filtrate had a conductivity of <200 $\mu Scm^{-1}$, which indicated that substantially no soluble or free copper remained in the sample, and the washed sample was dried at 90° C.

Elementary analysis of the material obtained showed 0.54 g of $NH_4$ and less than 0.01 g of Na per 100 g of material.

CE 2.6 Copper Exchange of $NH_4$-Form

A Cu chabazite powder catalyst was prepared by ion-exchange with copper acetate. A 0.1 M copper (II) acetate monohydrate solution was prepared by dissolving 16 g of the copper salt in 800 ml of deionized water at 60° C. 200 g of $NH_4^+$-form chabazite according to CE 2.5 was then added to this solution. An ion-exchange reaction between the NH4+-form chabazite and the copper ions was carried out by agitating the slurry at 60° C. for 1 hour. The pH was between 4.8 and 4.6 during the reaction. The resulting mixture was then filtered, washed until the filtrate had a conductivity of <200 $\mu Scm^{-1}$, which indicated that substantially no soluble or free copper remained in the sample, and the washed sample was dried at 90° C.

Elementary analysis of the material obtained according to 1.3 showed 0.068 g of C, less than 0.5 g of N, less than 0.01 g of Na, 1.6 g of Cu, 2.6 g of Al and 35.0 g of Si, in each case per 100 g material. This correlates to a $SiO_2:Al_2O_3$ ratio of 25.9.

CE 2.7 SCR Test of Sample According to CE 2.6

CE 2.7.1 Preparation of a Slurry 150 g of the zeolitic material containing Cu and having CHA framework structure, obtained according to CE 2.6 was mixed with 358 ml of deionized water. The mixture was ball-milled for 11 hours to obtain a slurry which comprised 90% particles smaller than 10 micrometer. 26 g of zirconium acetate in dilute acetic acid (containing 30% $ZrO_2$) were added to the slurry with agitation CE 2.7.2 Coating The slurry was coated onto 1"D×3"L cellular ceramic cores having a cell density of 65 cpsc (cells per square cm) (400 cpsi (cells per square inch)) and a wall thickness of 6.5 mm. The coated cores were dried at 110° C. for 3 hours and calcined at 400° C. for 1 hour. The coating process was repeated once to obtain a target washcoat loading of 0.146 $g/cm^3$ (2.4 $g/in^3$). The washcoat loading is defined as the dry weight gain on the honeycomb with respect to volume.

CE 2.7.3 Measuring NOx Selective Catalytic Reduction (SCR) Efficiency

Nitrogen oxides selective catalytic reduction (SCR) efficiency and selectivity of a fresh catalyst core according to 2.7.2 were measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried at a space velocity of 80,000 $h^{-1}$ across a 150° C. to 460° C. temperature range. Space velocity is defined as the gas flow rate comprising the entire reaction mixture divided by the geometric volume of the catalyst core. These conditions define the standard test for fresh catalysts.

FIG. 44 shows the results of the SCR test, indicating the catalytic efficiency and selectivity of the fresh catalyst.

CE 2.7.4 Measuring Hydrothermal Stability of the Catalyst

Hydrothermal stability of the catalyst was measured by hydrothermal aging of the fresh catalyst core described above under section CE 2.7.2 in the presence of 10 wt.-% $H_2O$ at 850° C. for 6 hours, followed by measurement of the nitrogen oxides SCR efficiency and selectivity by the same process, as outlined above under section CE 2.7.3, for the SCR evaluation on a fresh catalyst core.

The results of the SCR efficiency and selectivity of the aged catalyst is depicted in FIG. 45.

SHORT DESCRIPTION OF THE FIGURES

FIG. 1 shows the XRD pattern of the calcined zeolitic material having CHA framework type according to Example 1. The powder X-ray diffraction patterns were recorded on a Siemens D-5000 with monochromatic Cu K alpha-1 radiation, a capillary sample holder being used in order to avoid a preferred orientation. The diffraction data were collected using a position-sensitive detector from Braun, in the range from 8 to 96° (2 theta) and with a step width of 0.0678°. Indexing of the powder diagram was effected using the program Treor90, implemented in powder-X (Treor90 is a public domain program which is freely accessible via the URL http://www.ch.iucr.org/sincris-top/logiciel/). In the figure, the angle 2 theta in ° is shown along the abscissa and the intensities (LC=Lin Counts) are plotted along the ordinate.

Figure 1:
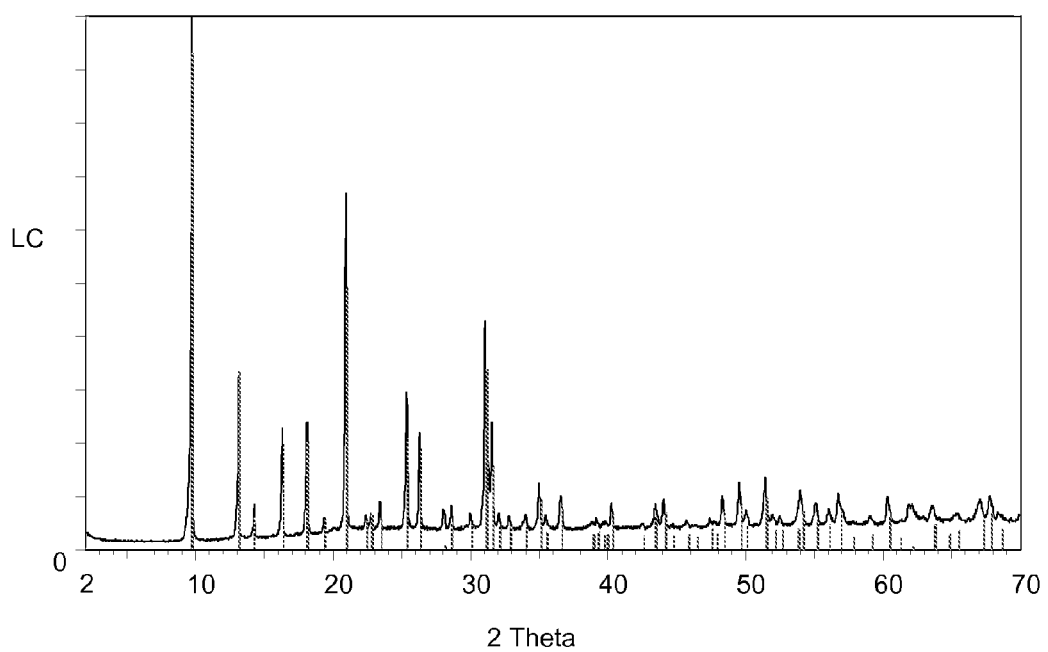
Figure 2:
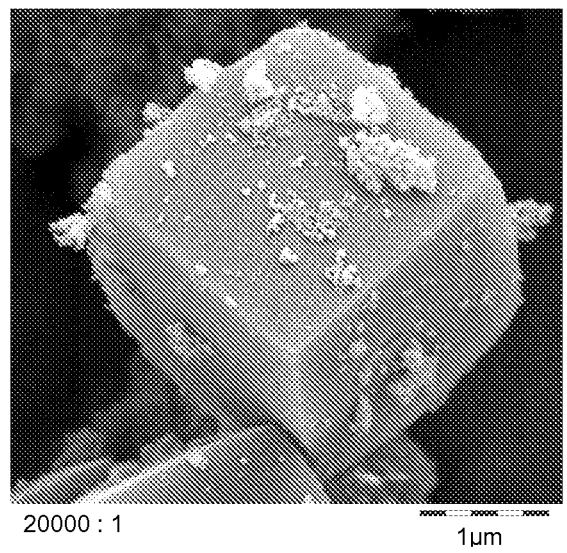
FIG. 2 shows a typical crystallite of the calcined zeolitic material having CHA framework type according to Example 1, determined by SEM (Fig. with secondary electrons 5 kV; scale 20000:1).
Figure 3:
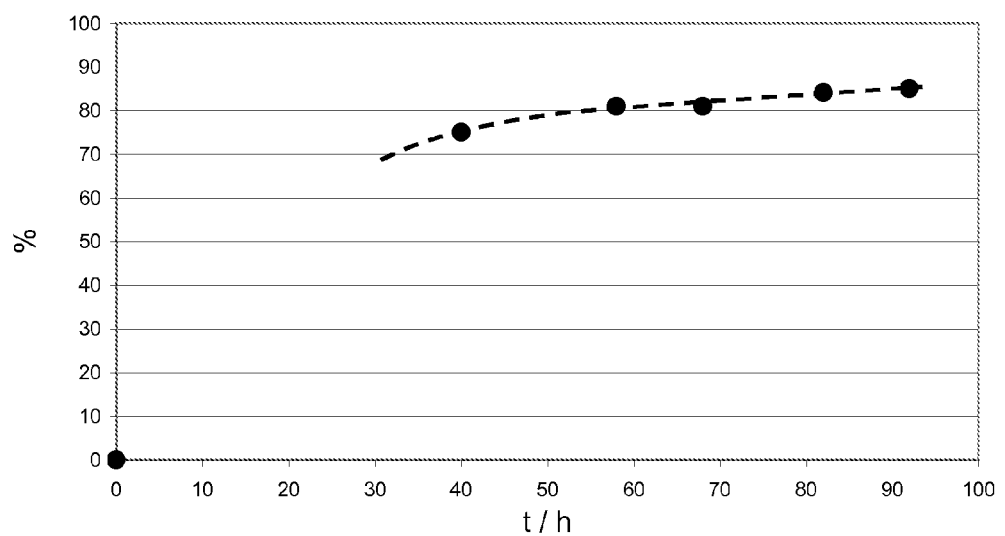
FIG. 3 shows the increase of the degree of crystallinity of the calcined samples obtained according to Example 2.
Figure 4:
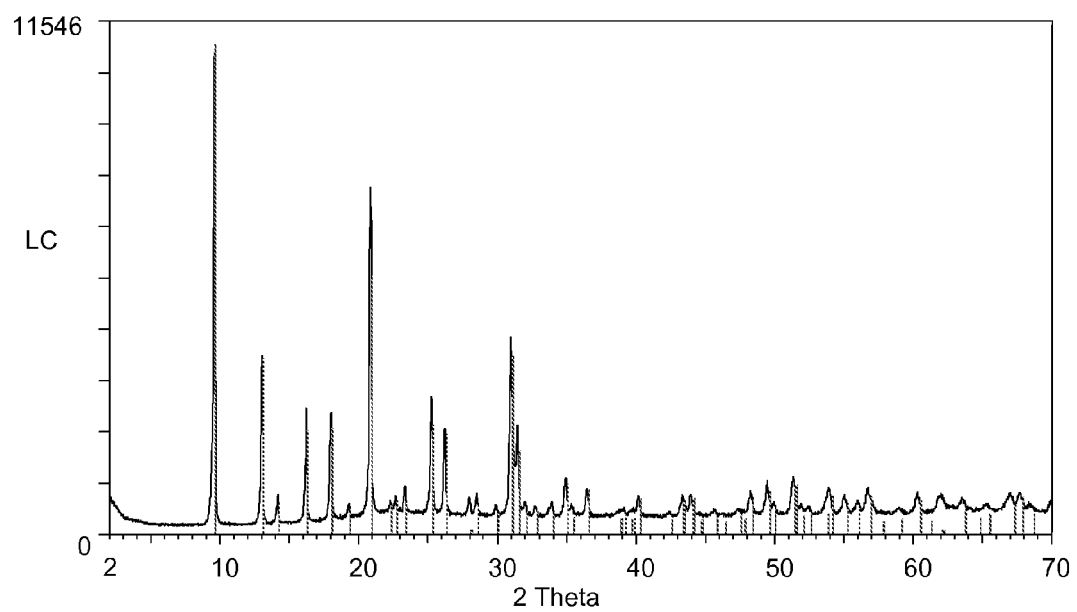
FIG. 4 shows the XRD pattern of the calcined product having CHA framework type, obtained according to Example 2 after a total crystallization time of 92 h. As to the method of determining the XRD pattern, see FIG. 1.
Figure 5:
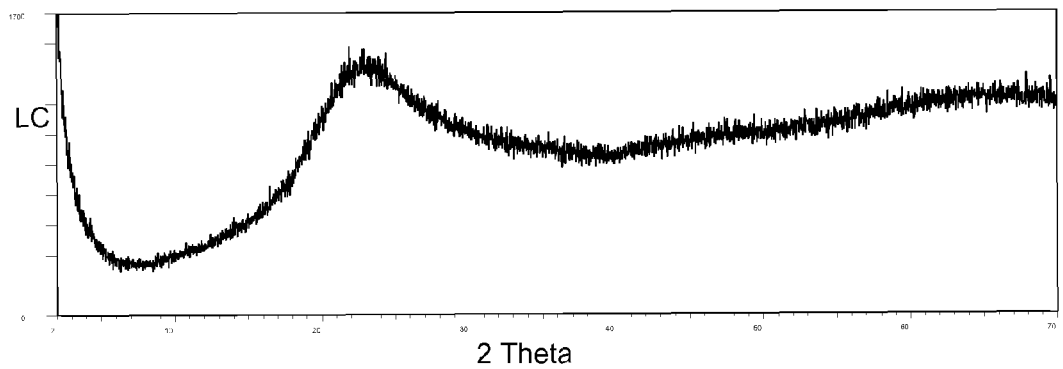
FIG. 5 shows the XRD pattern of the calcined sample S1 obtained according to Example 3. As to the method of determining the XRD pattern, see FIG. 1.
Figure 6:
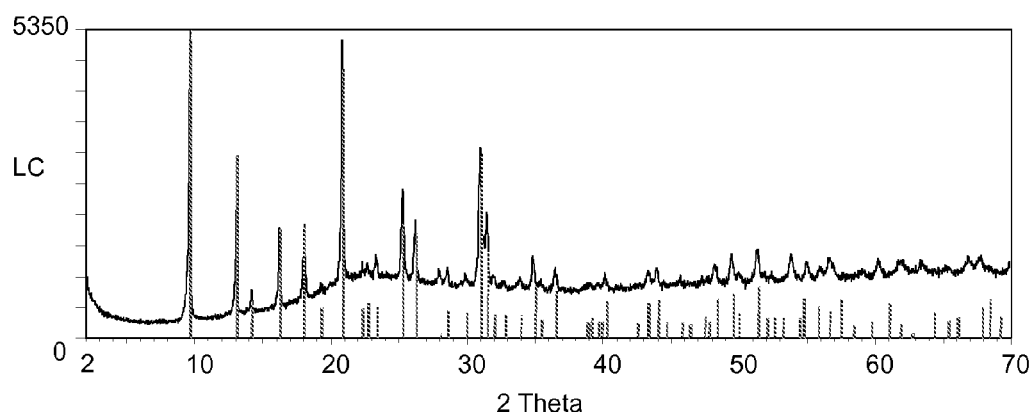
FIG. 6 shows the XRD pattern of the calcined sample S2 obtained according to Example 3, having CHA framework type. As to the method of determining the XRD pattern, see FIG. 1.
Figure 7:
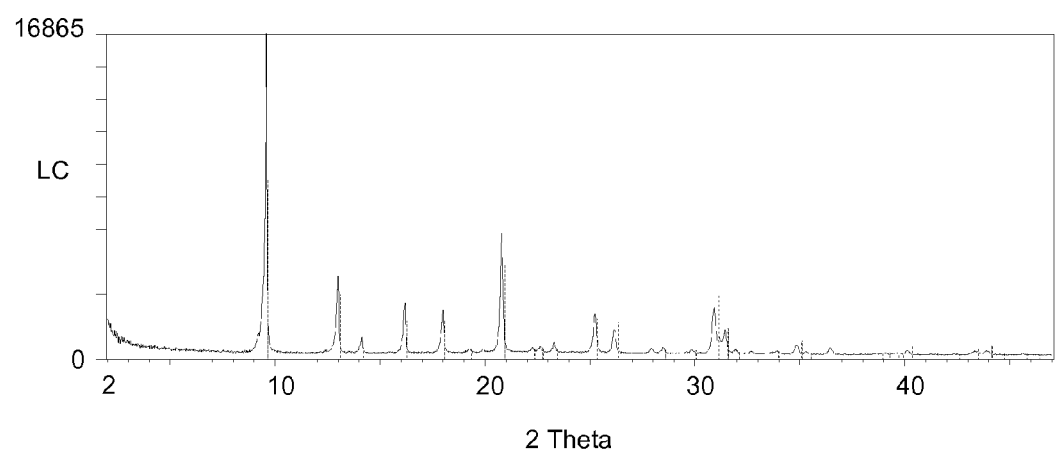
FIG. 7 shows the XRD pattern of the calcined sample S3 obtained according to Example 3, having CHA framework type. As to the method of determining the XRD pattern, see FIG. 1.
Figure 8:
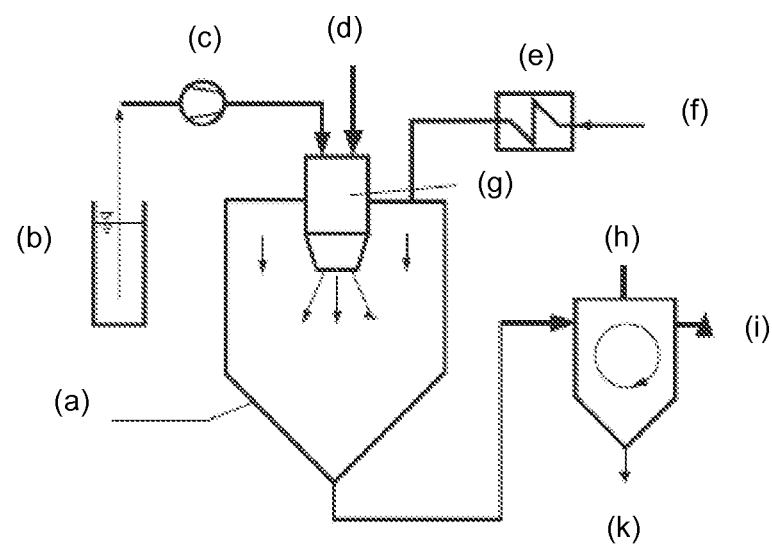
Figure 9:
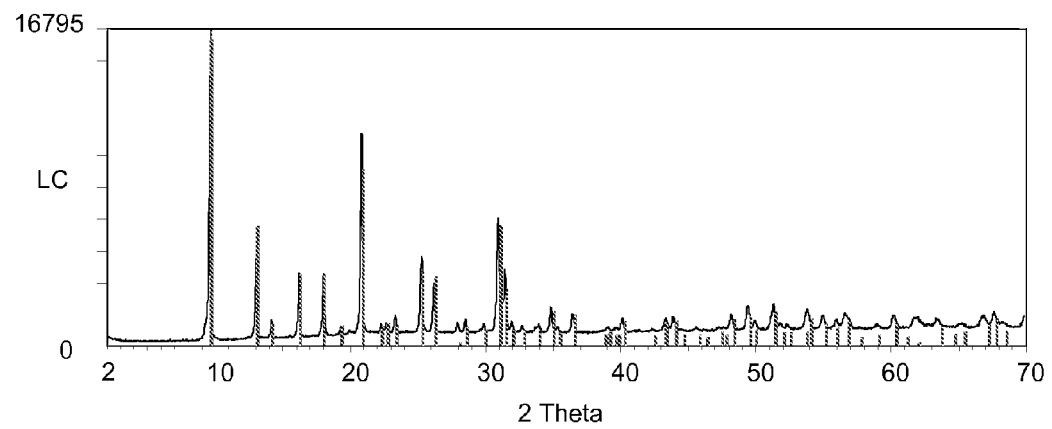

FIG. 8 shows schematically the apparatus used for spray-drying the samples according to Example 3. The reference signs (a)-(k) have the following meaning:
  (a) spay-drier
  (b) vessel containing the sample to be subjected to spray-drying
  (c) pump (d) atomizing gas (spray gas)
(e) electric heating
(f) drying gas
(g) atomizer
(h) cyclone
(i) off-gas
(k) spray-dried product FIG. 9 shows the XRD pattern of the calcined sample S4 obtained according to Example 3, having CHA framework type. As to the method of determining the XRD pattern, see FIG. 1.

Figure 10:
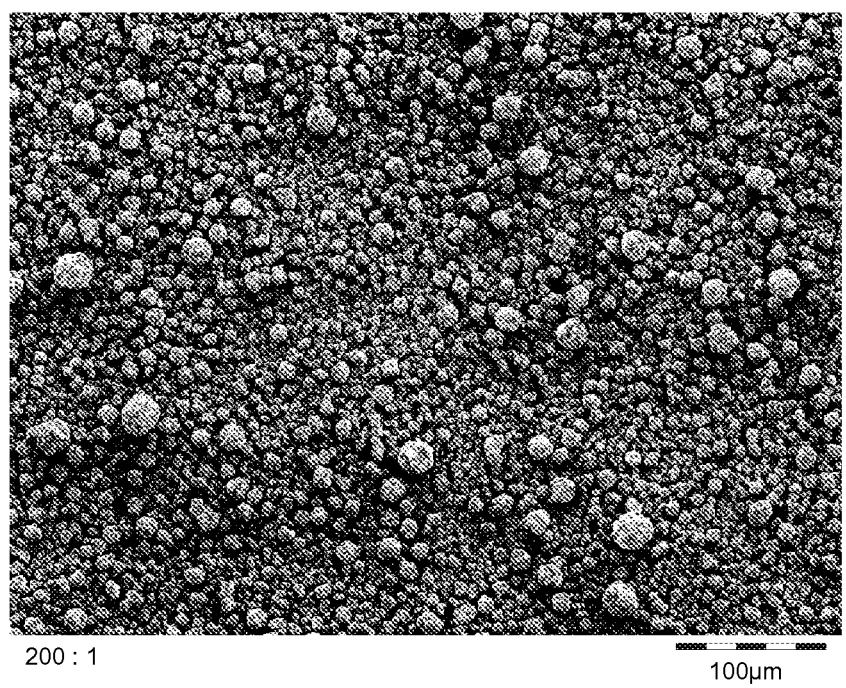

FIG. 10 shows crystallites of the calcined zeolitic material S4 having CHA framework type according to Example 3, determined by SEM (Fig. with secondary electrons 5 kV; scale: 200:1).

Figure 11:
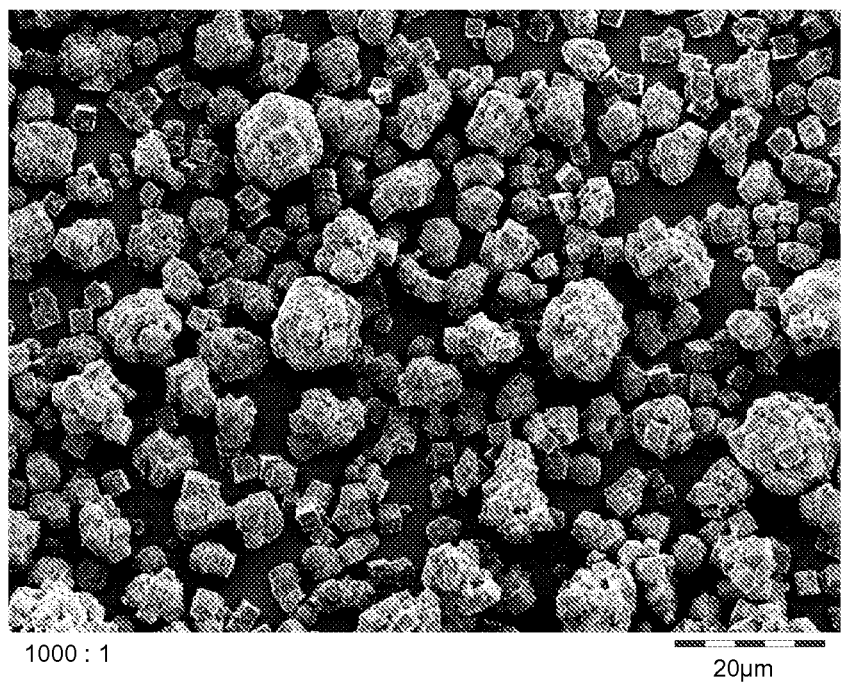

FIG. 11 shows crystallites of the calcined zeolitic material S4 having CHA framework type according to Example 3, determined by SEM (Fig. with secondary electrons 5 kV; scale: 1000:1).

Figure 12:
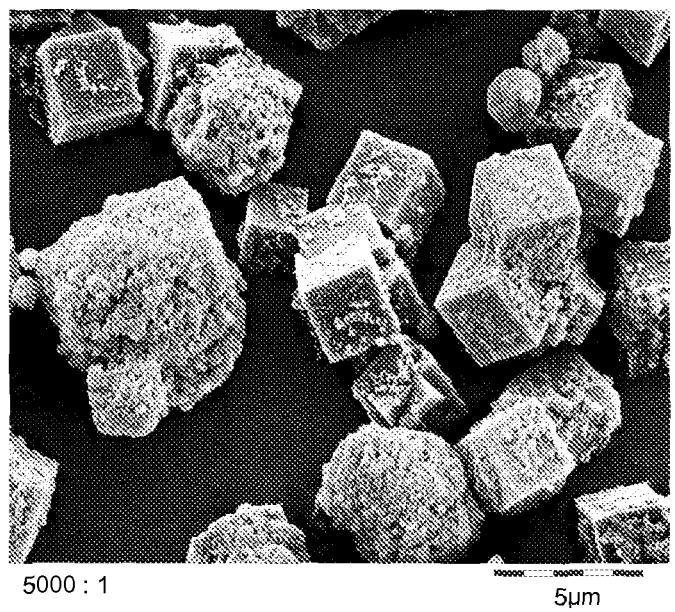

FIG. 12 shows crystallites of the calcined zeolitic material S4 having CHA framework type according to Example 3, determined by SEM (Fig. with secondary electrons 5 kV; scale: 5000:1).

Figure 13:
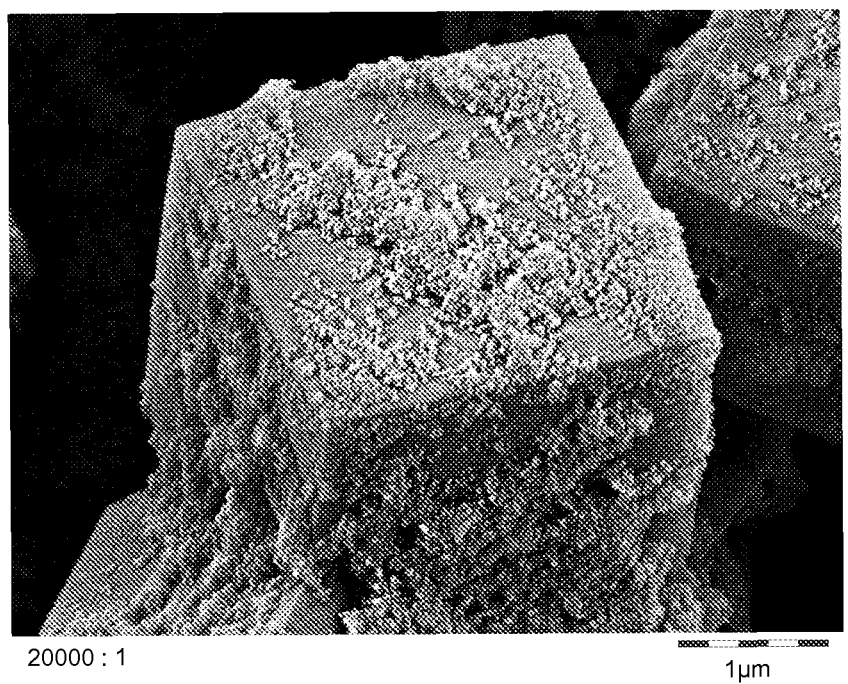

FIG. 13 shows crystallites of the calcined zeolitic material S4 having CHA framework type according to Example 3, determined by SEM (Fig. with secondary electrons 5 kV; scale: 20000:1).

Figure 14:
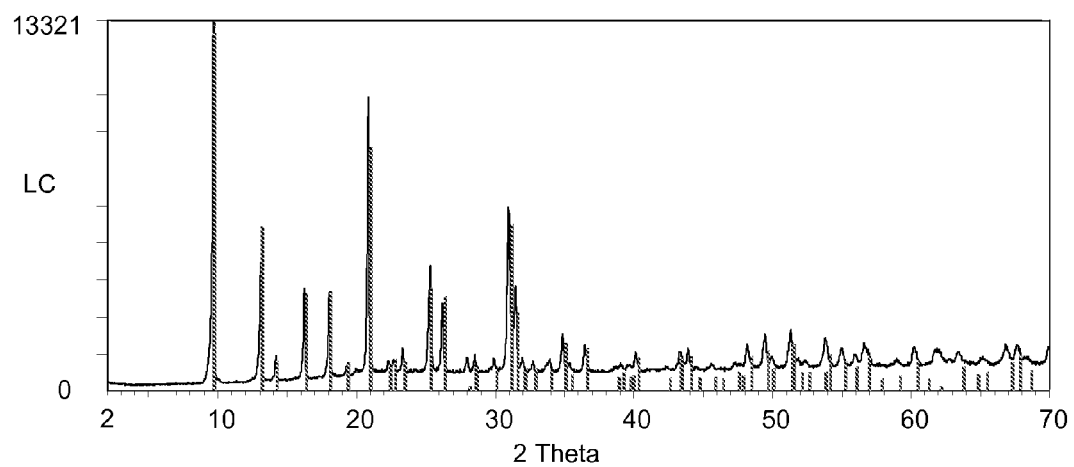

FIG. 14 shows the XRD pattern of the calcined sample S5 obtained according to Example 3, having CHA framework type. As to the method of determining the XRD pattern, see FIG. 1.

Figure 15:
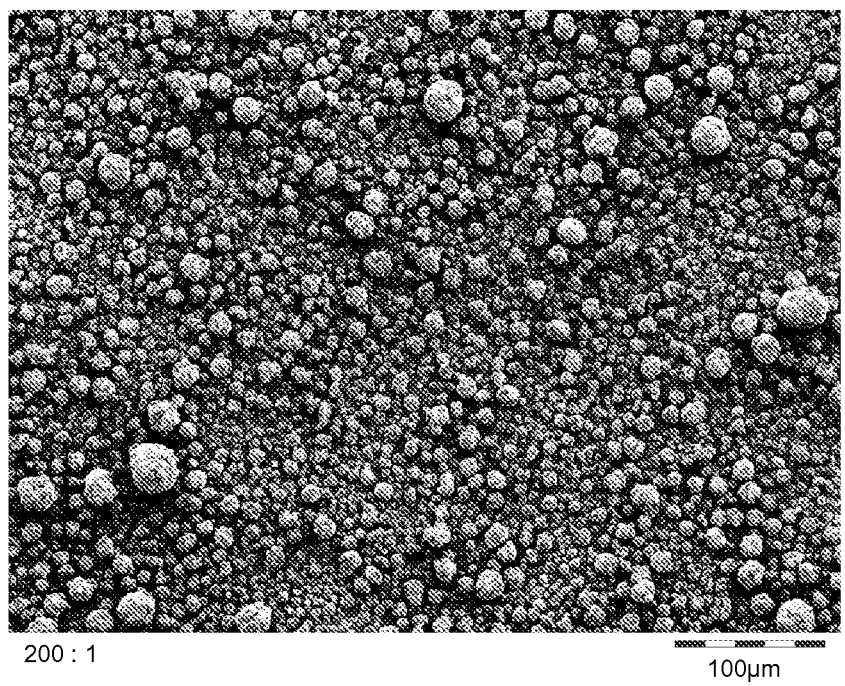

FIG. 15 shows crystallites of the calcined zeolitic material S5 having CHA framework type according to Example 3, determined by SEM (Fig. with secondary electrons 5 kV; scale: 200:1).

Figure 16:
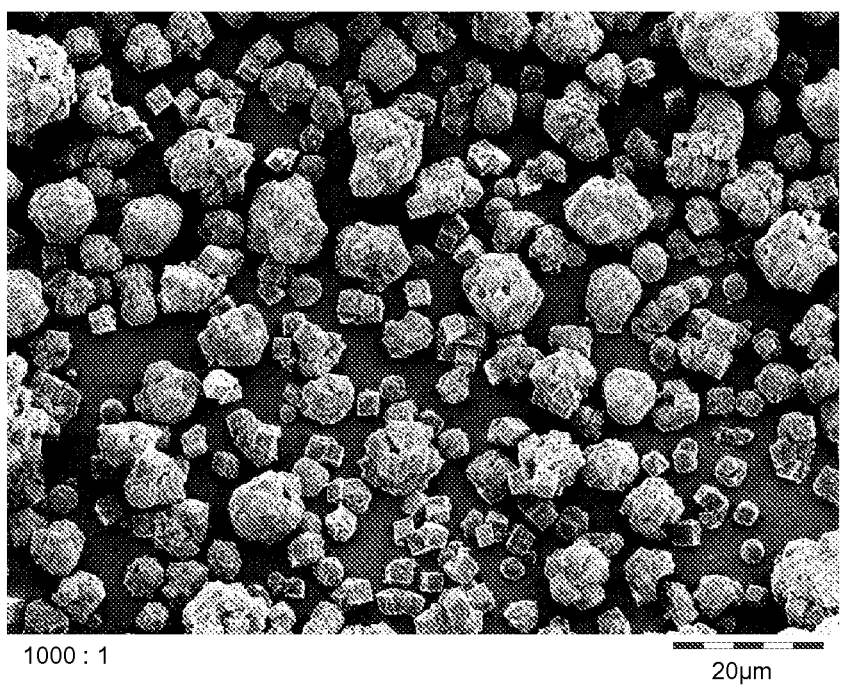

FIG. 16 shows crystallites of the calcined zeolitic material S5 having CHA framework type according to Example 3, determined by SEM (Fig. with secondary electrons 5 kV; scale: 1000:1).

Figure 17:
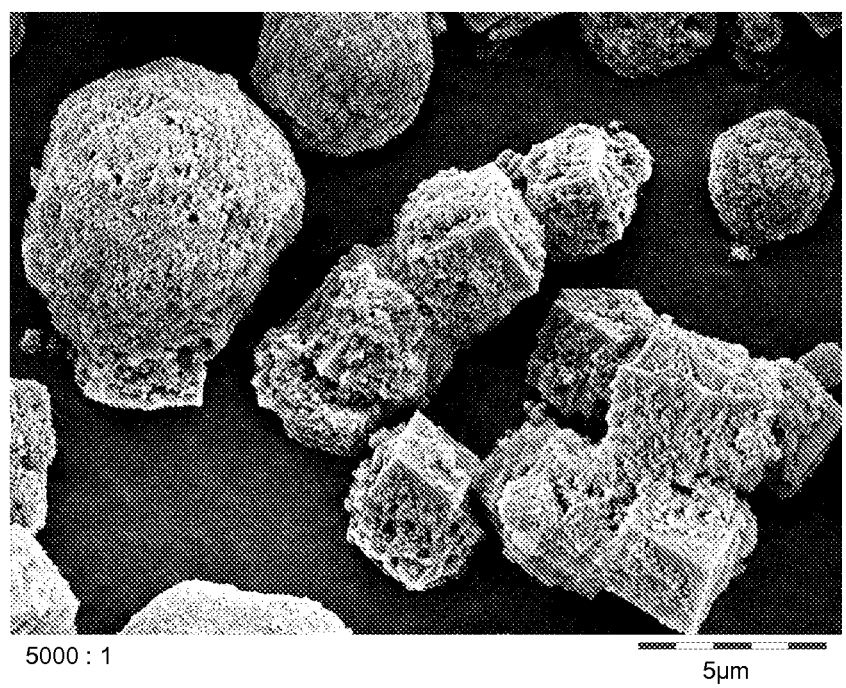

FIG. 17 shows crystallites of the calcined zeolitic material S5 having CHA framework type according to Example 3, determined by SEM (Fig. with secondary electrons 5 kV; scale: 5000:1).

Figure 18:
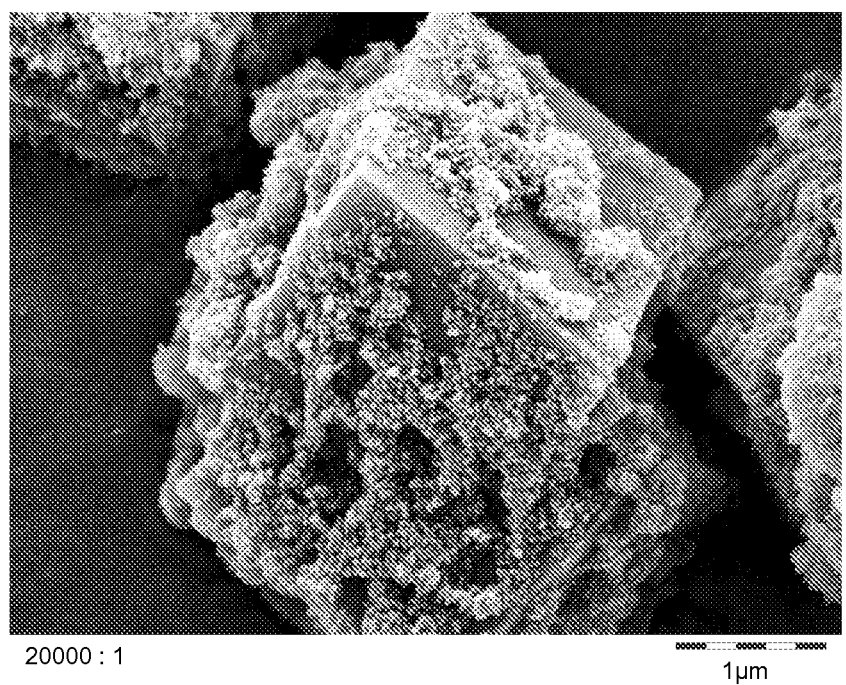

FIG. 18 shows crystallites of the calcined zeolitic material S5 having CHA framework type according to Example 3, determined by SEM (Fig. with secondary electrons 5 kV; scale: 20000:1).

Figure 19:
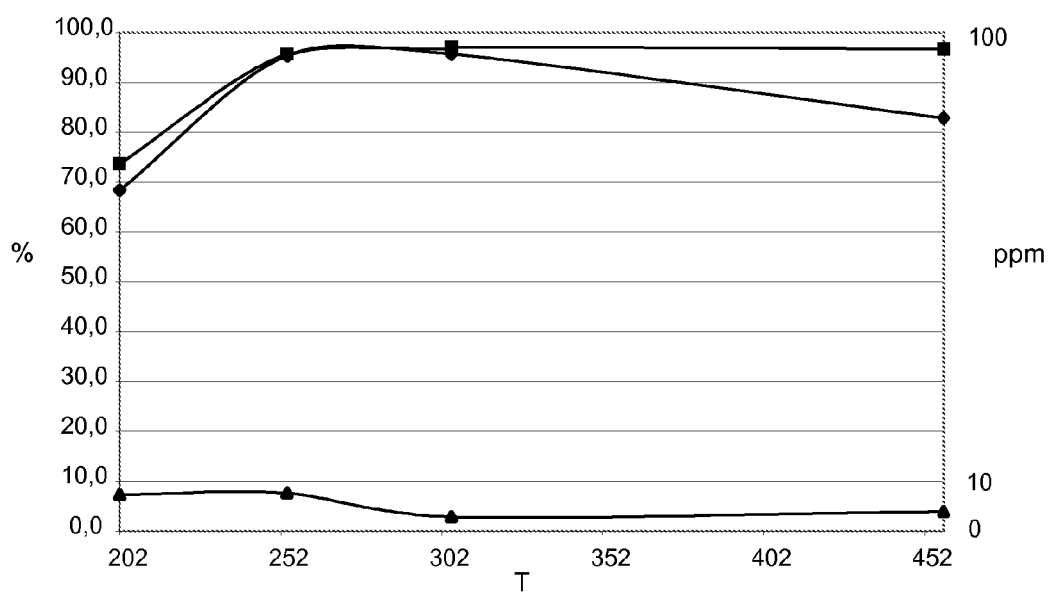

FIG. 19 shows the result of an SCR test of sample S5 applied onto a cellular ceramic core according to Example 4 (fresh SCR catalyst). Abbreviation "T" stand for the inlet temperature in ° C., abbreviation "%" for the conversion of NOx, $NH_3$. Abbreviation "ppm" stands for $N_2O$ make. The symbols of the curves represent the following chemical compounds:
- ◆ NOx (conversion)
- ■ $NH_3$ (conversion)
- ▲ $N_2O$ (production)

Figure 20:
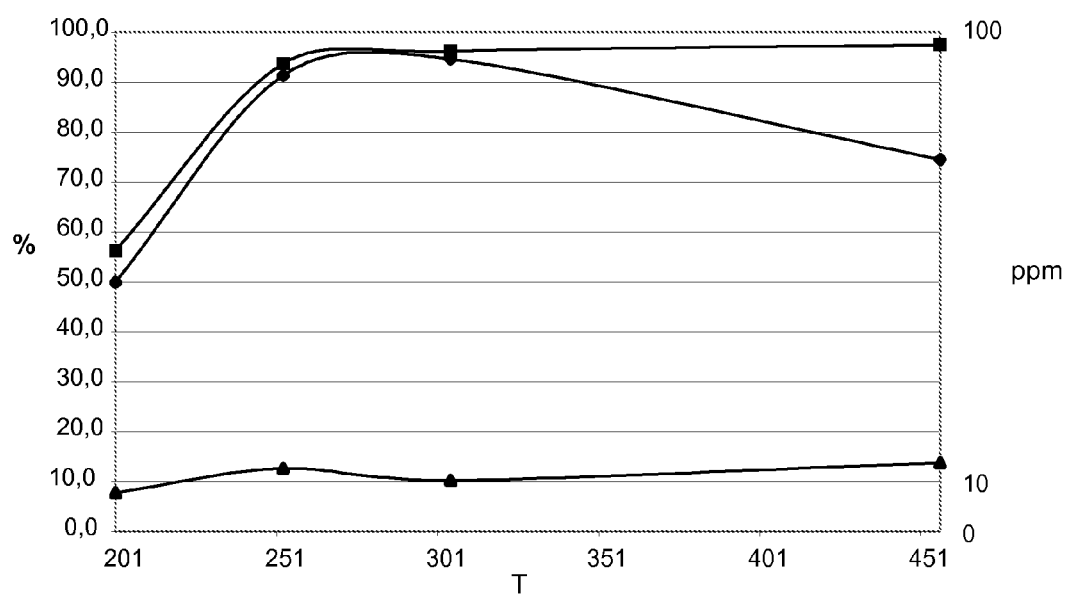

FIG. 20 shows the result of an SCR test of sample S5 applied onto a cellular ceramic core according to Example 4 (aged SCR catalyst). Abbreviation "T" stand for the inlet temperature in ° C., abbreviation "%" for the conversion of NOx, $NH_3$. Abbreviation "ppm" stands for $N_2O$ make. The symbols of the curves represent the following chemical compounds:
- ◆ NOx (conversion)
- ■ $NH_3$ (conversion)
- ▲ $N_2O$ (production)

Figure 21:
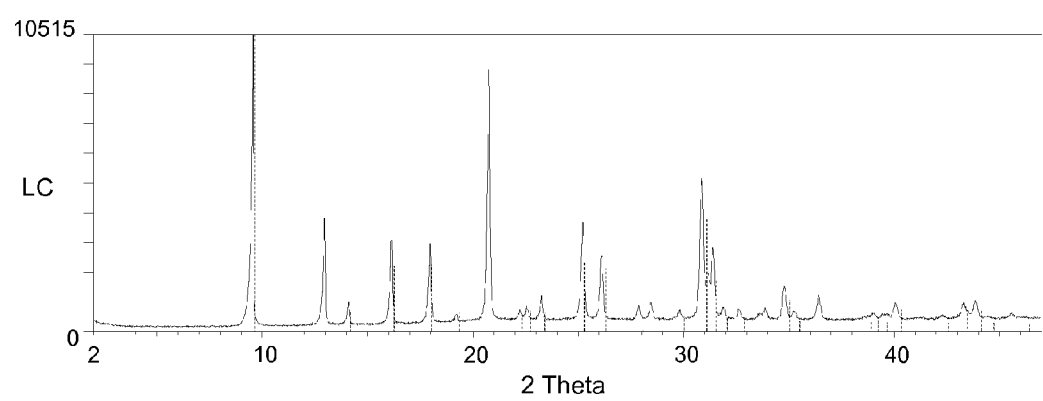

FIG. 21 shows the XRD pattern of the Cu and La containing calcined zeolitic material having CHA framework type according to Example 5. As to the method of determining the XRD pattern, see FIG. 1.

Figure 22:
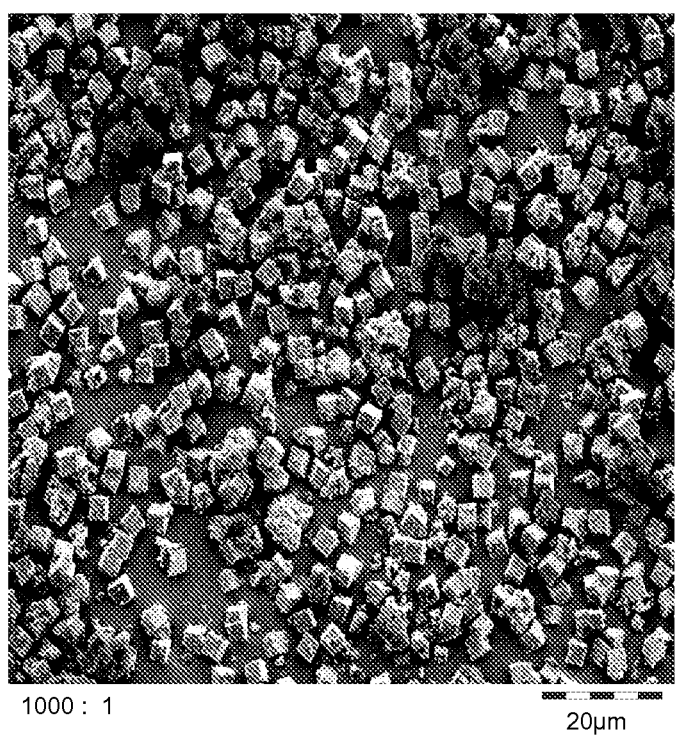

FIG. 22 shows crystallites of the Cu and La containing calcined zeolitic material having CHA framework type according to Example 5, determined by SEM (Fig. with secondary electrons 5 kV; scale: 1000:1).

Figure 23:
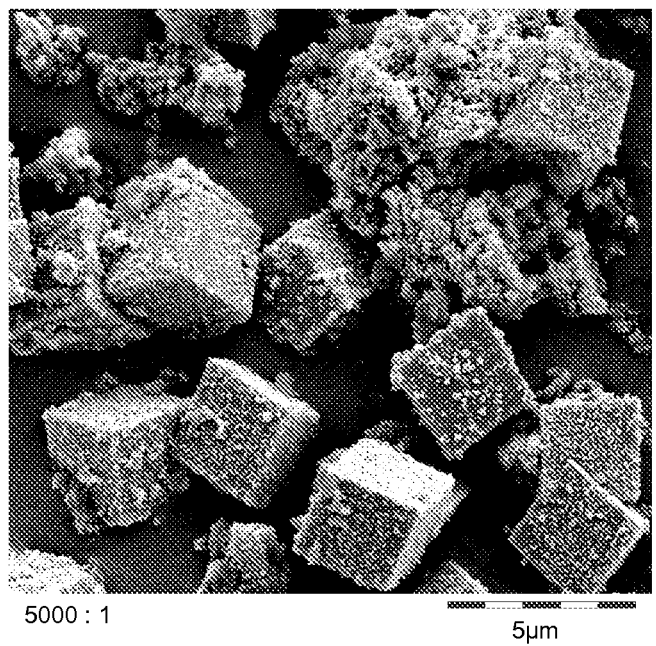

FIG. 23 shows crystallites of the Cu and La containing calcined zeolitic material having CHA framework type according to Example 5, determined by SEM (Fig. with secondary electrons 5 kV; scale: 5000:1).

Figure 24:
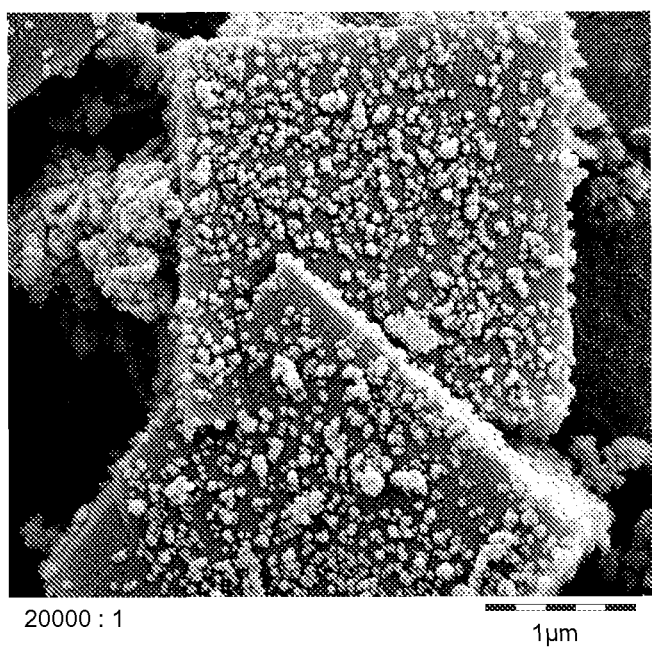

FIG. 24 shows crystallites of the Cu and La containing calcined zeolitic material having CHA framework type according to Example 5, determined by SEM (Fig. with secondary electrons 5 kV; scale: 20000:1).

Figure 25:
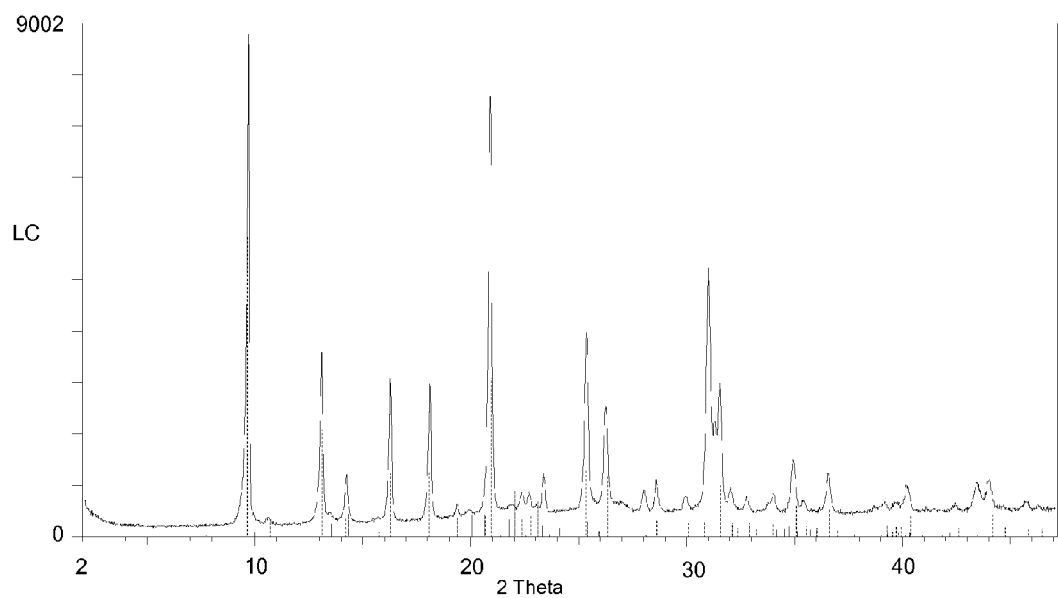

FIG. 25 shows the XRD pattern of the Cu containing calcined zeolitic material having CHA framework type according to Example 6. As to the method of determining the XRD pattern, see FIG. 1.

Figure 26:
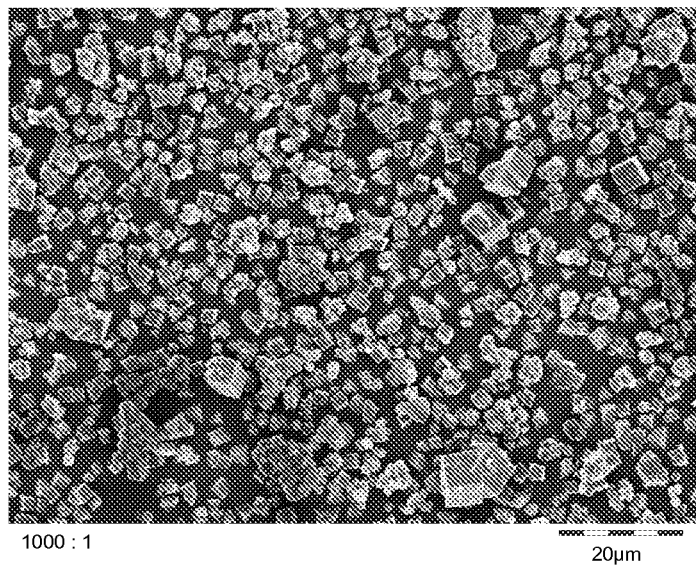

FIG. 26 shows crystallites of the Cu containing calcined zeolitic material having CHA framework type according to Example 6, determined by SEM (Fig. with secondary electrons 5 kV; scale: 1000:1).

Figure 27:
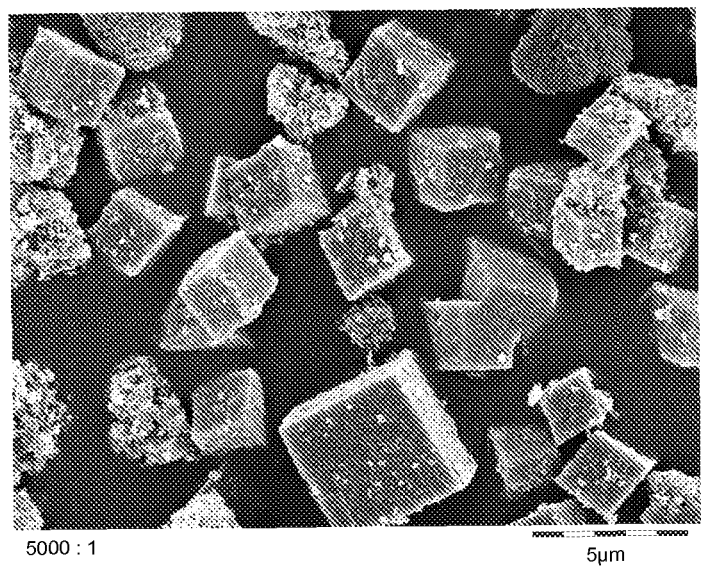

FIG. 27 shows crystallites of the Cu containing calcined zeolitic material having CHA framework type according to Example 6, determined by SEM (Fig. with secondary electrons 5 kV; scale: 5000:1).

Figure 28:
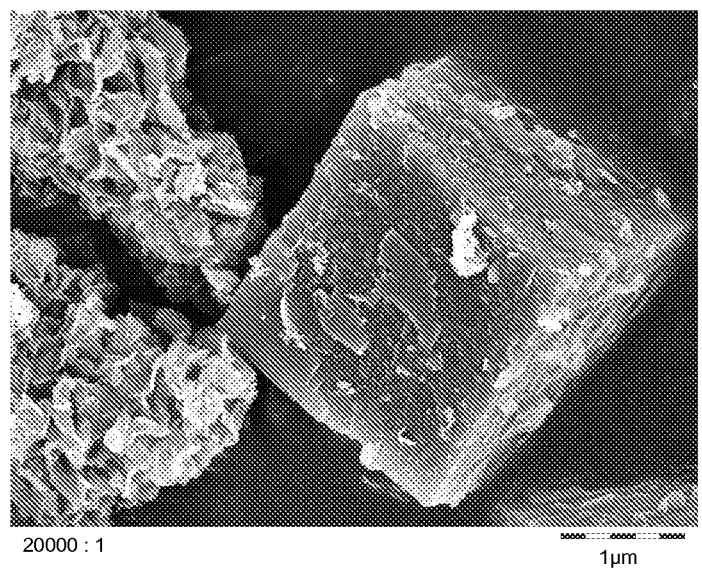

FIG. 28 shows crystallites of the Cu containing calcined zeolitic material having CHA framework type according to Example 6, determined by SEM (Fig. with secondary electrons 5 kV; scale: 20000:1).

Figure 29:
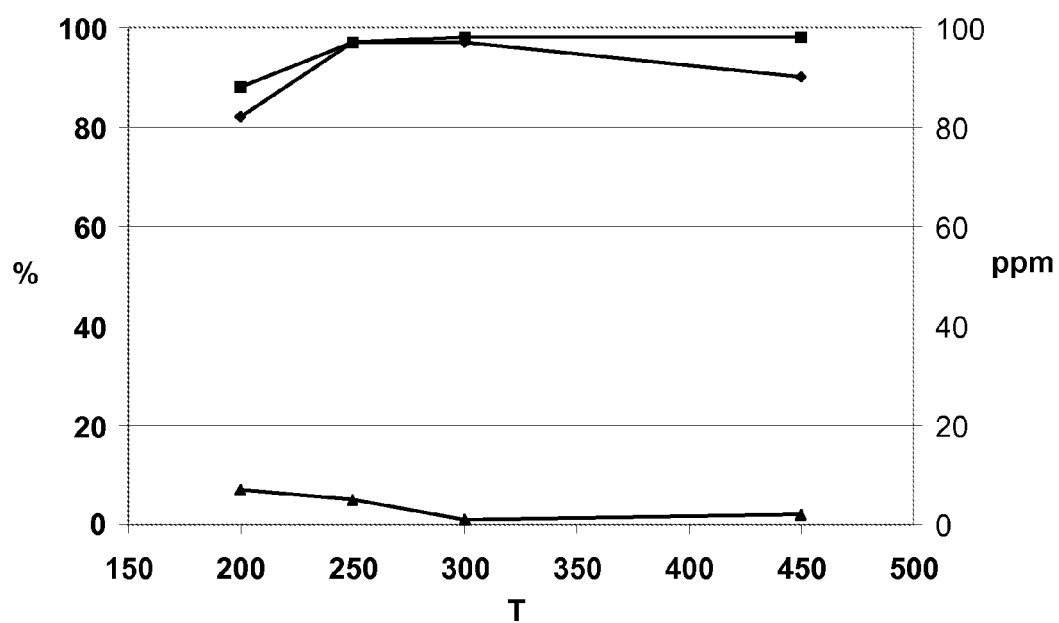

FIG. 29 shows the result of an SCR test of the material obtained according to example 6 applied onto a cellular ceramic core according to example 7 (fresh SCR). Abbreviation "T" stand for the inlet temperature in ° C., abbreviation "%" for the conversion of NOx, and $NH_3$. Abbreviation "ppm" stands for $N_2O$ make. The symbols of the curves represent the following chemical compounds:
- ◆ NOx (conversion)
- ■ $NH_3$ (conversion)
- ▲ $N_2O$ (production)

Figure 30:
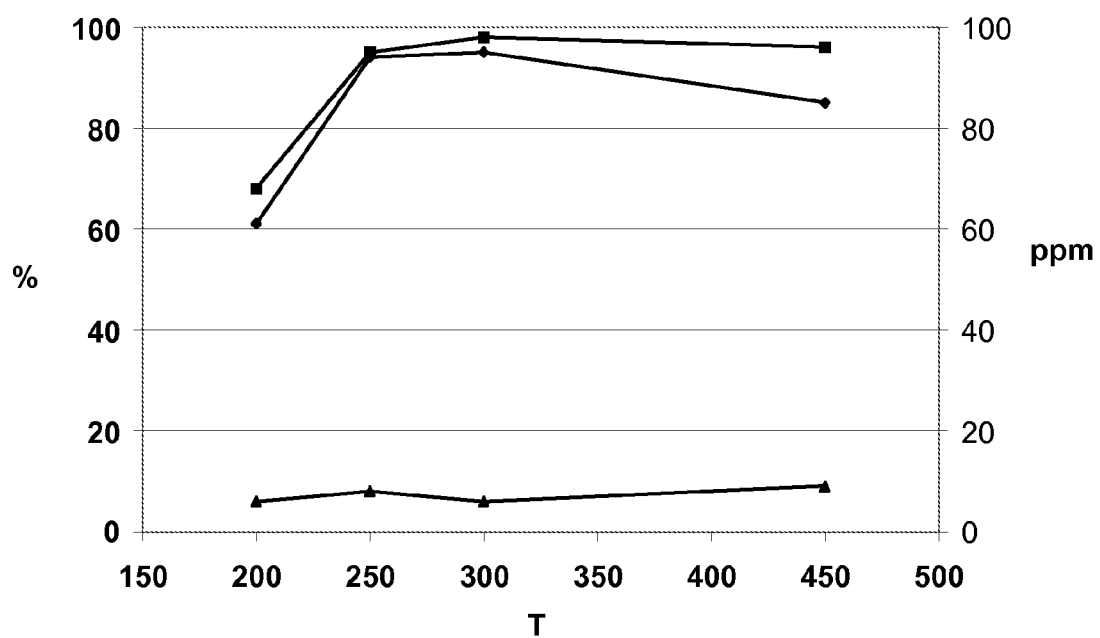

FIG. 30 shows the result of an SCR test of the material obtained according to example 6 applied onto a cellular ceramic core according to example 7 (aged SCR). Abbreviation "T" stand for the inlet temperature in ° C., abbreviation "%" for the conversion of NOx, and $NH_3$. Abbreviation "ppm" stands for $N_2O$ make. The symbols of the curves represent the following chemical compounds:
- ◆ NOx (conversion)
- ■ $NH_3$ (conversion)
- ▲ $N_2O$ (production)

Figure 31:
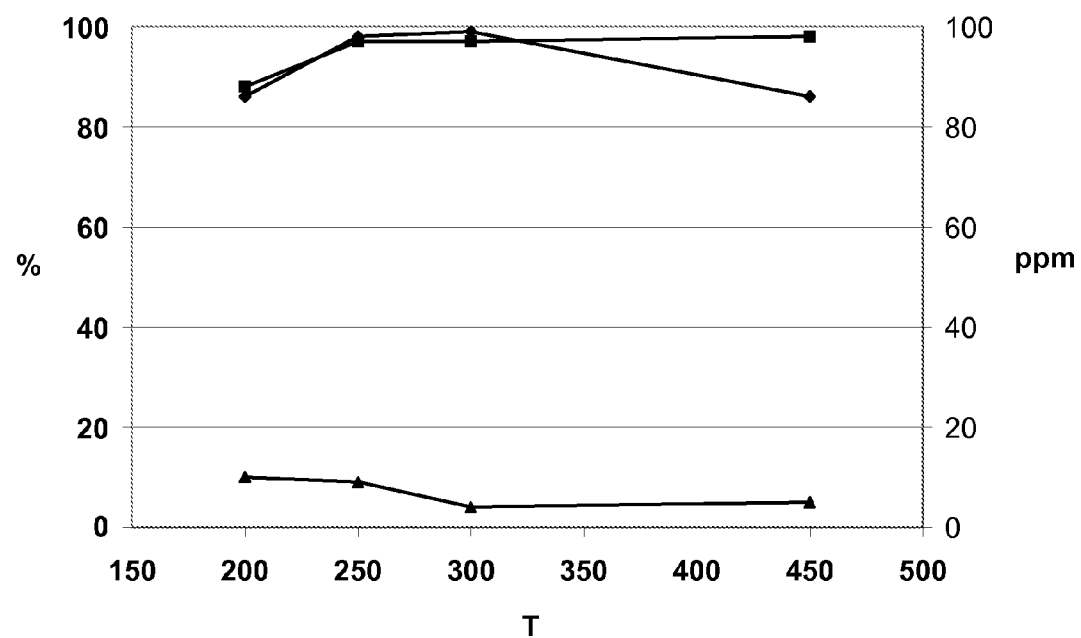

FIG. 31 shows the result of an SCR test of the material obtained according to example CE 1.3.1 according to prior art applied onto a cellular ceramic core according to CE 1.3.2 (fresh SCR catalyst CE 1.3.3). Abbreviation "T" stand for the inlet temperature in ° C., abbreviation "%" for the conversion of NOx and $NH_3$. Abbreviation "ppm" for $N_2O$ make. The symbols of the curves represent the following chemical compounds:
- ◆ NOx (conversion)
- ■ $NH_3$ (conversion)
- ▲ $N_2O$ (production)

Figure 32:
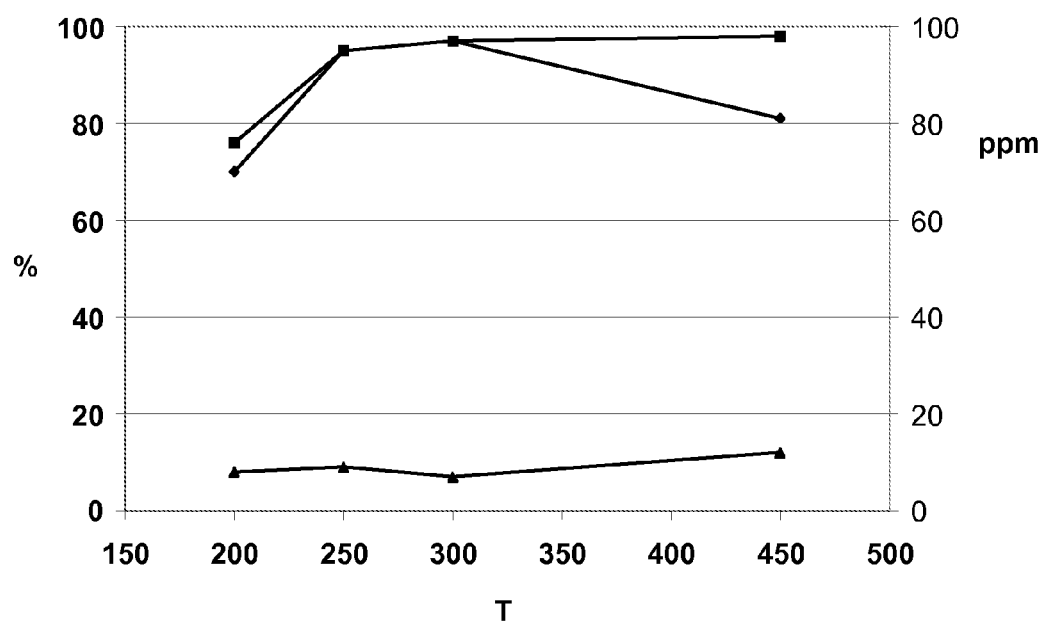

FIG. 32 shows the result of an SCR test of the material obtained according to example CE 1.3.1 according to prior art applied onto a cellular ceramic core according to CE 1.3.2 (aged SCR catalyst CE 1.3.4). Abbreviation "T" stand for the inlet temperature in ° C., abbreviation "%" for the conversion of NOx and NH$_3$. Abbreviation "ppm" for N$_2$O make. The symbols of the curves represent the following chemical compounds:
- ◆ NOx (conversion)
- ■ NH$_3$ (conversion)
- ▲ N$_2$O (production)

Figure 33:
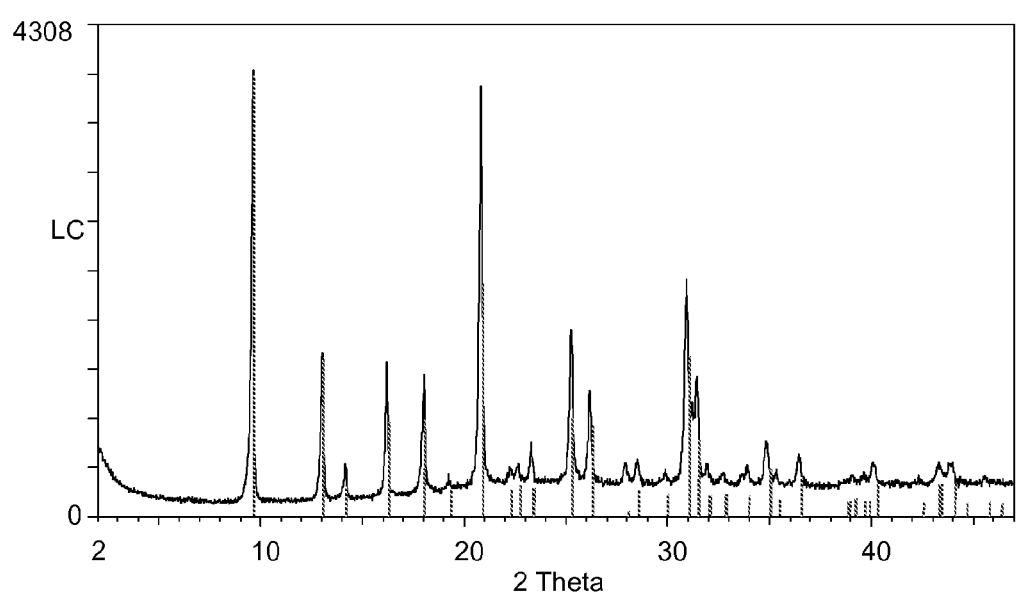

FIG. 33 shows the XRD pattern of the Cu containing calcined zeolitic material having CHA framework type according to Example 8 after 48 hrs crystallization time. As to the method of determining the XRD pattern, see description of FIG. 1 above.

Figure 34:
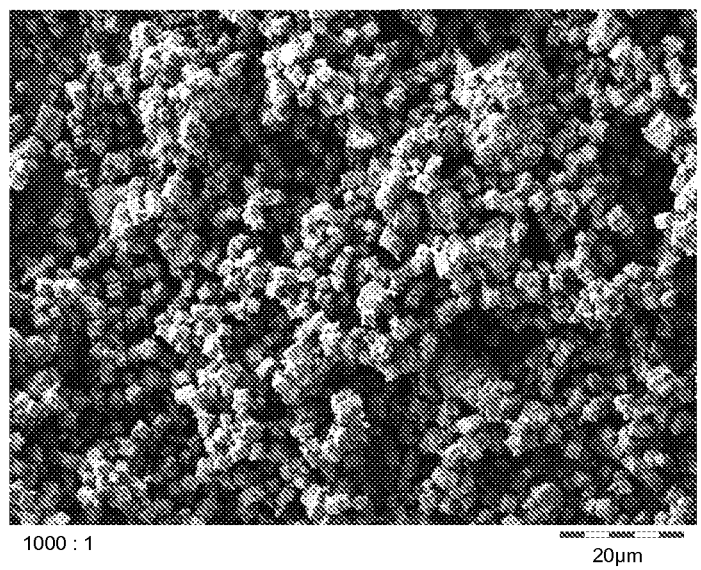

FIG. 34 shows crystallites of the Cu containing calcined zeolitic material having CHA framework type according to Example 8 after 48 hrs crystallization time, determined by SEM (Fig. with secondary electrons 5 kV; scale: 1000:1).

Figure 35:
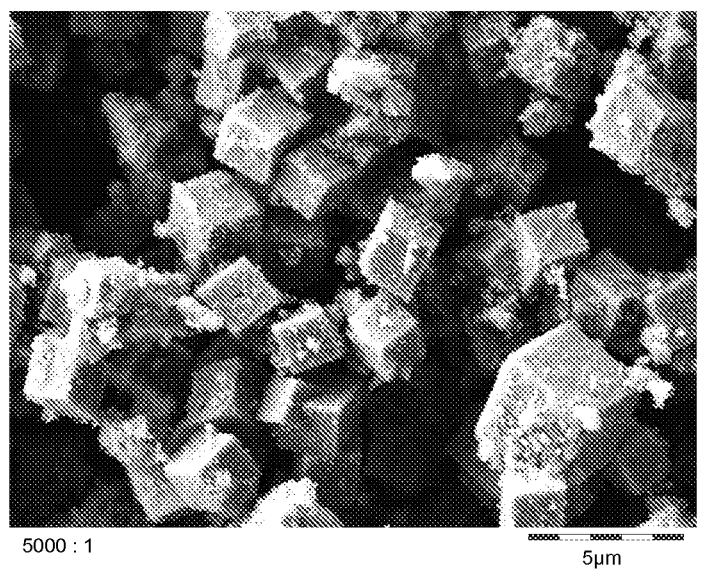

FIG. 35 shows crystallites of the Cu containing calcined zeolitic material having CHA framework type according to Example 8 after 48 hrs crystallization time, determined by SEM (Fig. with secondary electrons 5 kV; scale: 5000:1).

Figure 36:
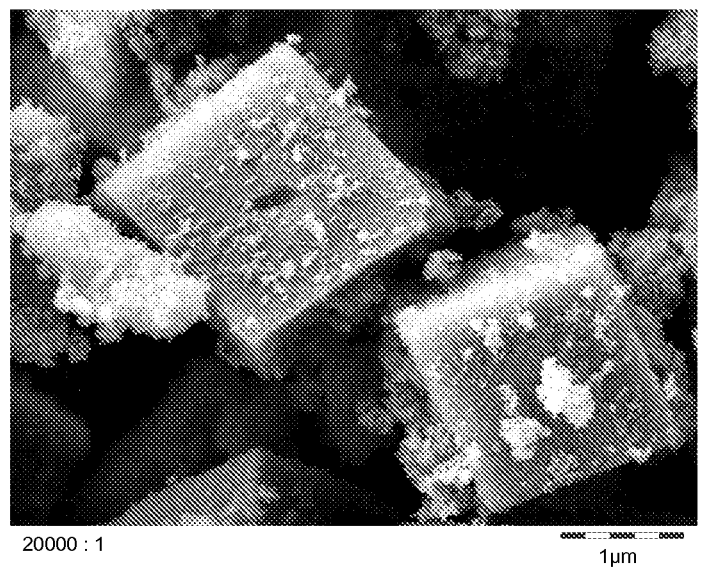

FIG. 36 shows crystallites of the Cu containing calcined zeolitic material having CHA framework type according to Example 8 after 48 hrs crystallization time, determined by SEM (Fig. with secondary electrons 5 kV; scale: 20000:1).

Figure 37:
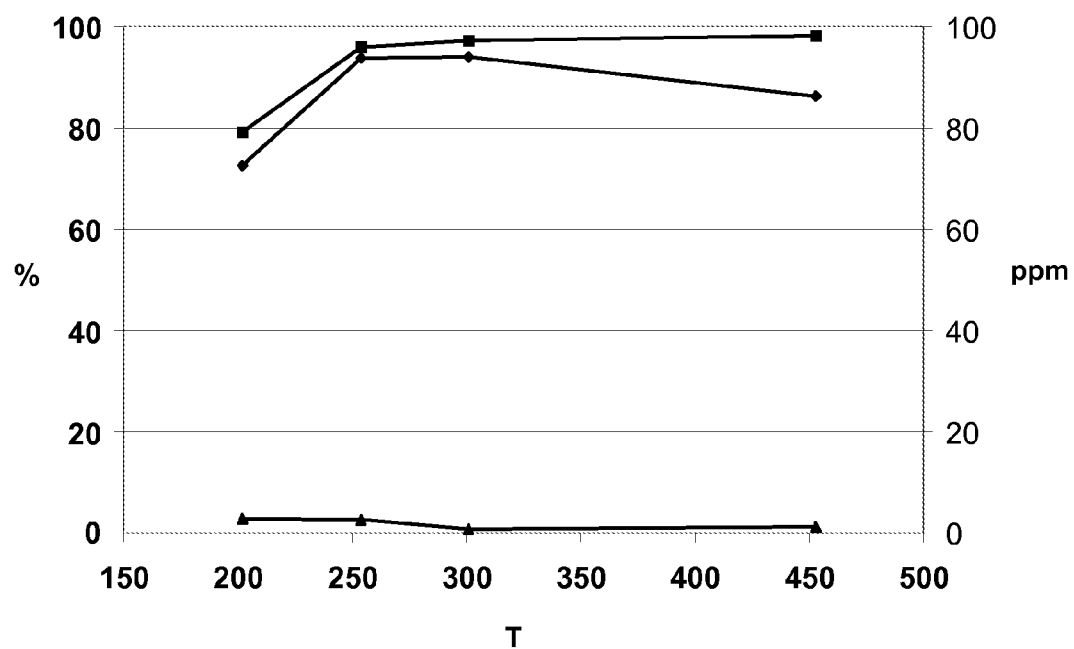

FIG. 37 shows the result of an SCR test of the material obtained according to Example 8 applied onto a cellular ceramic core according to example 9 (fresh SCR). Abbreviation "T" stand for the inlet temperature in ° C., abbreviation "%" for the conversion of NOx, and NH$_3$. Abbreviation "ppm" for N$_2$O make. The symbols of the curves represent the following chemical compounds:
- ◆ NOx (conversion)
- ■ NH$_3$ (conversion)
- ▲ N$_2$O (production)

Figure 38:
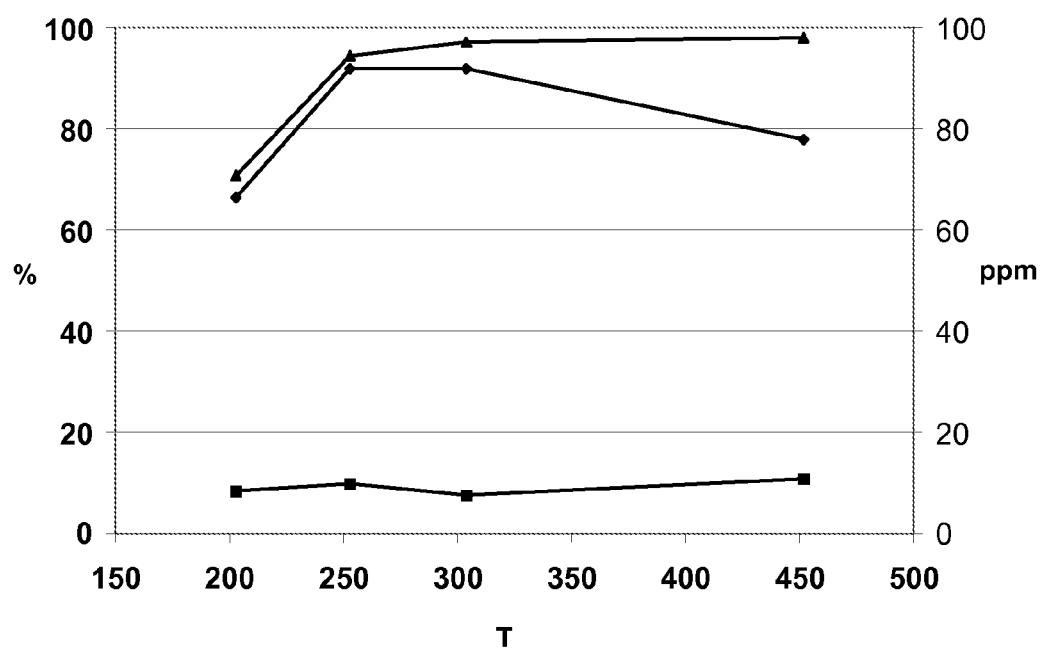

FIG. 38 shows the result of an SCR test of the material obtained according to Example 8 applied onto a cellular ceramic core according to example 9 (aged SCR). Abbreviation "T" stand for the inlet temperature in ° C., abbreviation "%" for the conversion of NOx, and NH$_3$. Abbreviation "ppm" for N$_2$O make. The symbols of the curves represent the following chemical compounds
- ◆ NOx (conversion)
- ■ NH$_3$ (conversion)
- ▲ N$_2$O (production)

Figure 39:
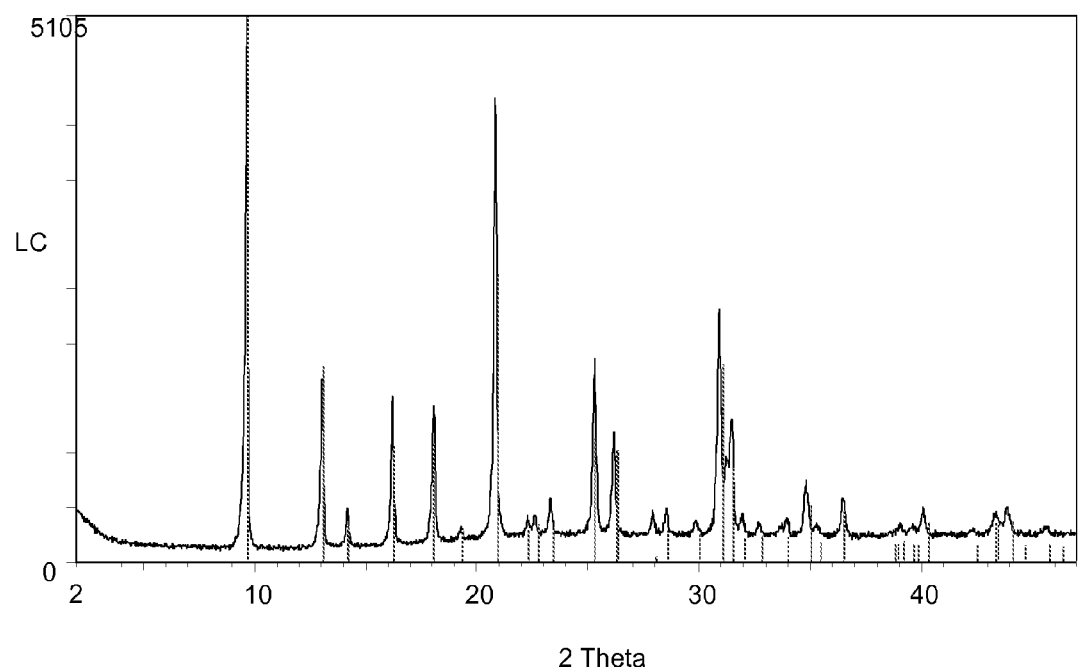

FIG. 39 shows the XRD pattern of the Cu containing calcined zeolitic material having CHA framework type according to Example 10 after 48 hrs crystallization time. As to the method of determining the XRD pattern, see description of FIG. 1 above.

Figure 40:
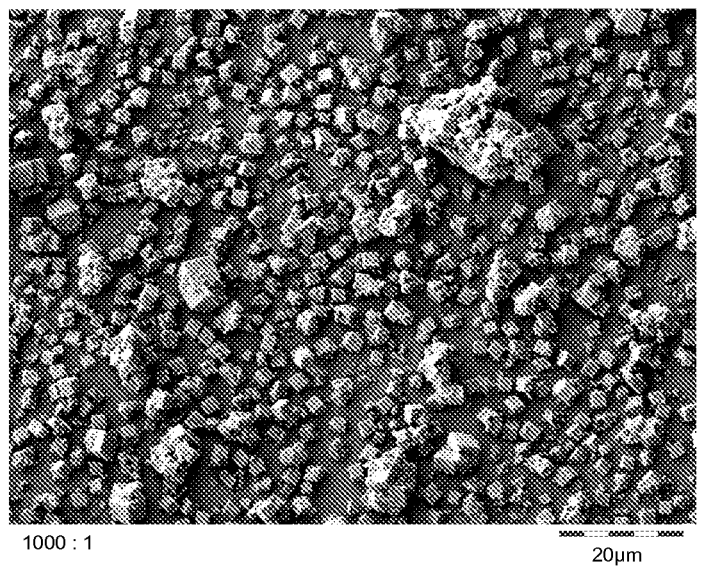

FIG. 40 shows crystallites of the Cu containing calcined zeolitic material having CHA framework type according to Example 10 after 48 hrs crystallization time, determined by SEM (Fig. with secondary electrons 5 kV; scale: 1000:1).

Figure 41:
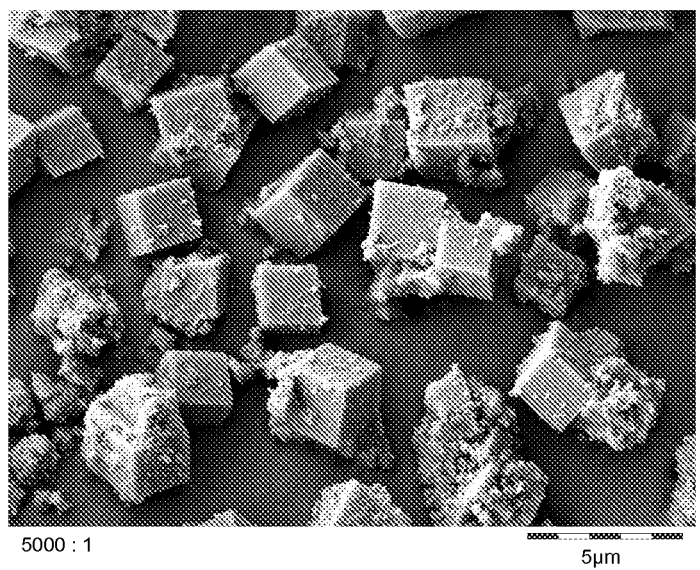

FIG. 41 shows crystallites of the Cu containing calcined zeolitic material having CHA framework type according to Example 10 after 48 hrs crystallization time, determined by SEM (Fig. with secondary electrons 5 kV; scale: 5000:1).

Figure 42:
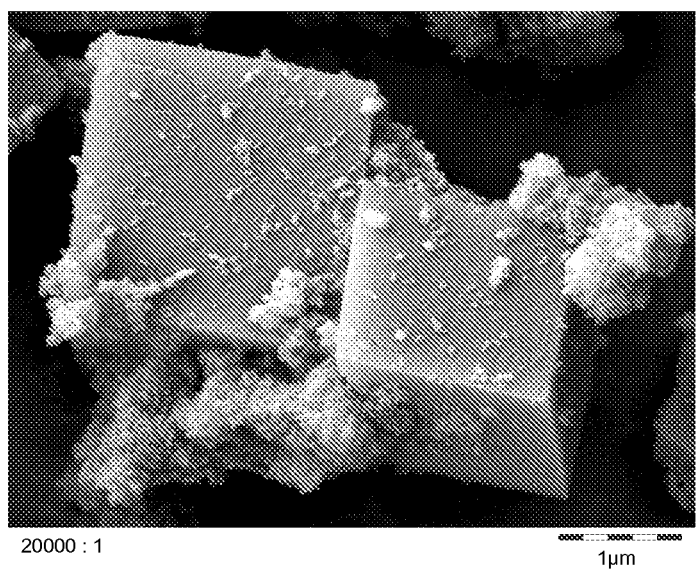

FIG. 42 shows crystallites of the Cu containing calcined zeolitic material having CHA framework type according to Example 10 after 48 hrs crystallization time, determined by SEM (Fig. with secondary electrons 5 kV; scale: 20000:1).

Figure 43:
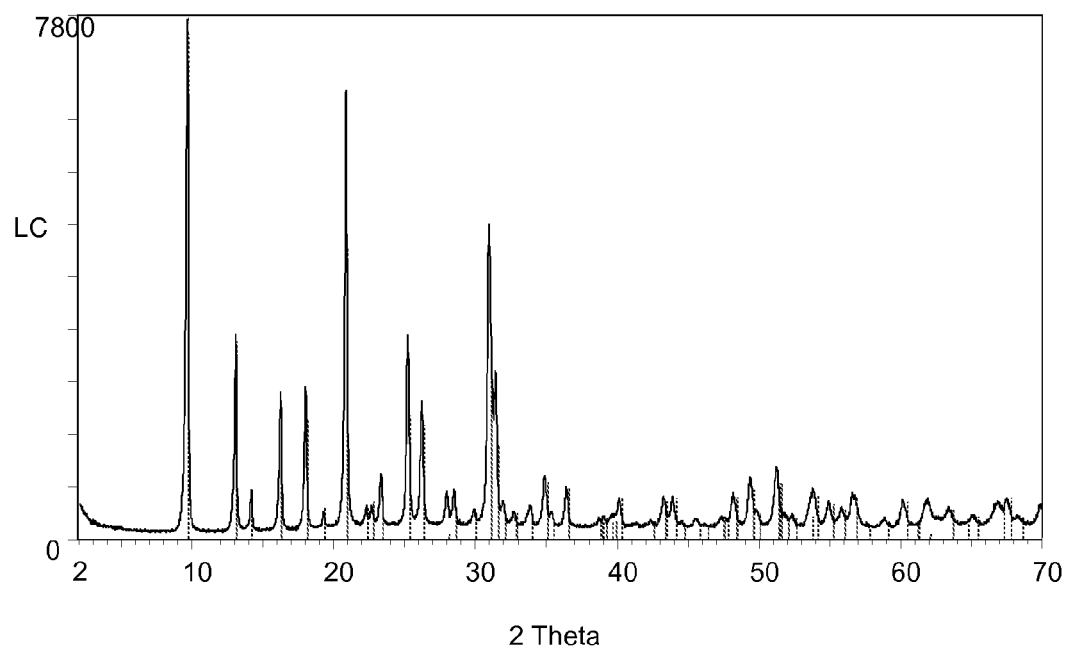

FIG. 43 shows the XRD pattern of the Cu containing calcined zeolitic material having CHA framework type according to comparative example CE 2 after 40 hrs crystallization time. As to the method of determining the XRD pattern, see description of FIG. 1 above.

Figure 44:
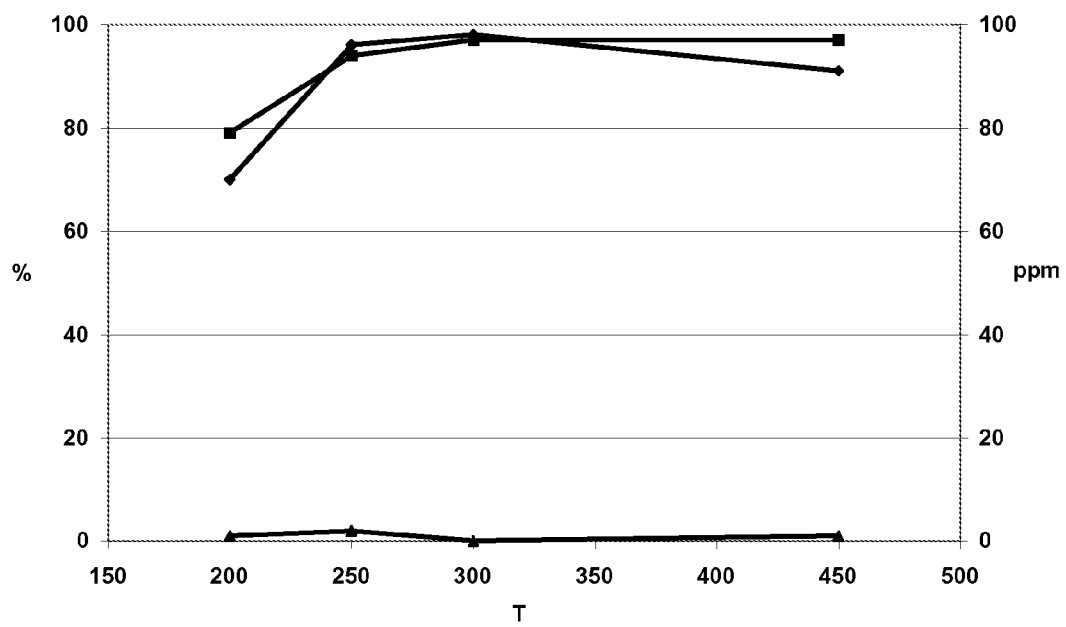

FIG. 44 shows the result of an SCR test of the material obtained according to comparative example CE 2 applied onto a cellular ceramic core according to comparative example CE 2.7.3 (fresh SCR). Abbreviation "T" stand for the inlet temperature in ° C., abbreviation "%" for the conversion of NOx, and NH$_3$. Abbreviation "ppm" for N$_2$O make. The symbols of the curves represent the following chemical compounds:
- ◆ NOx (conversion)
- ■ NH$_3$ (conversion)
- ▲ N$_2$O (production)

Figure 45:
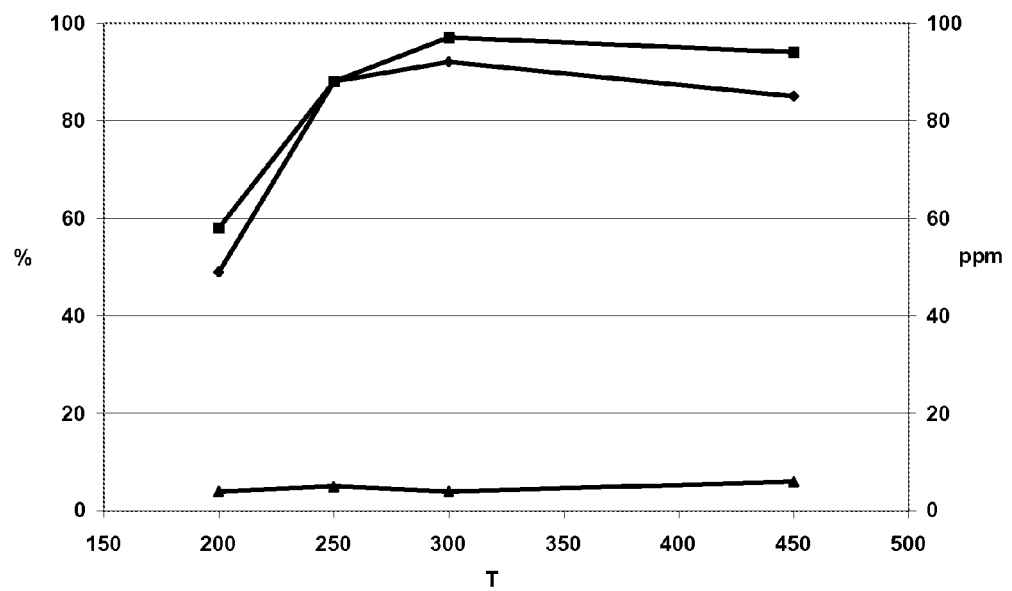

FIG. 45 shows the result of an SCR test of the material obtained according to comparative example CE 2 applied onto a cellular ceramic core according to comparative example 2.7.4 (aged SCR). Abbreviation "T" stand for the inlet temperature in ° C., abbreviation "%" for the conversion of NOx, and NH$_3$. Abbreviation "ppm" for N$_2$O make. The symbols of the curves represent the following chemical compounds
- ◆ NOx (conversion)
- ■ NH$_3$ (conversion)
- ▲ N$_2$O (production)

The invention claimed is:

1. A process for preparing a copper-containing zeolitic material having a CHA framework structure, the process comprising:
   (i) preparing an aqueous solution comprising
      at least one source for X$_2$O$_3$,
      at least one source for YO$_2$,
      at least one structure directing agent suitable for preparing a zeolitic material having a CHA framework structure, and
      at least one Cu source,
      wherein said aqueous solution does not comprise a phosphor source and has an alkali metal content of 1000 ppm or less; and
   (ii) hydrothermally crystallizing the aqueous solution of the preparing (i) which does not comprise a phosphor source, to obtain a suspension comprising the copper-containing zeolitic material having a CHA framework structure;
   wherein the structure directing agent is
      a mixture of 1-adamantyltrimethyl-ammonium hydroxide and benzyltrimethylammonium hydroxide, or
      a mixture of 1-adamantyltrimethylammonium hydroxide and tetramethylammonium hydroxide, or
      a mixture of 1-adamantyltrimethylammonium hydroxide and tetramethylammonium hydroxide, or
      a mixture of 1-adamantyltrimethylammonium hydroxide and benzyltrimethylammonium hydroxide and tetramethylammonium hydroxide,
   wherein a molar ratio of 1-adamantyltrimethylammonium hydroxide to benzyltrimethylammonium hydroxide or to tetramethylammonium hydroxide, or to a sum of benzyltrimethylammonium hydroxide and tetramethylammonium hydroxide, is in a range of from 1:5 to 1:1, and
   wherein the copper-containing zeolitic material has a composition comprising a molar ratio $(n\text{YO}_2):\text{X}_2\text{O}_3$ wherein X is a trivalent element, Y is a tetravalent element, and n is at least 10.

2. The process of claim 1, wherein X is at least one selected from the group consisting of Al, B, In, and Ga, and wherein Y is at least one selected from the group consisting of Si, Sn, Ti, Zr, and Ge.

3. The process of claim 2, wherein X is Al and Y is Si.

4. The process of claim 1, wherein an aqueous solution comprising Cu and ammonia is employed as a Cu source.

5. The process of claim 1, wherein, for the preparing (i), the at least one source for $YO_2$, the at least one source for $X_2O_3$, and the at least one Cu source are employed in such amounts that the aqueous solution obtained according to (i) exhibits a molar ratio $$(nYO_2):X_2O_3$$

wherein n is at least 10,
and a molar ratio $$(mCu):((nYO_2)+X_2O_3)$$

wherein m is at least 0.005.

6. The process of claim 1, wherein the pH of the aqueous solution subjected to the hydrothermally crystallizing (ii) is in a range of from 12 to 14.

7. The process of claim 1, wherein the hydrothermally crystallizing (ii) is carried out at a temperature in a range of from 100 to 200° C. and for a time period of from 12 to 144 h.

8. The process of claim 1, wherein the aqueous solution subjected to the hydrothermally crystallizing (ii) comprises a La source.

9. The process of claim 1, further comprising
   (iii) separating the copper-containing zeolitic material from the suspension obtained in the hydrothermally crystallizing (ii);
   (iv) drying the copper-containing zeolitic material, separated in (iii), at a temperature in a range of from 100 to 150° C.; and
   (v) calcining the copper-containing zeolitic material, dried in (iv), at a temperature in a range of from 300 to 600° C.

10. The process of claim 1, wherein, after the preparing (i), no Cu source is employed.

11. A copper-containing zeolitic material having framework structure CHA, obtained by the process of claim 1.

* * * * *